(12) United States Patent
Yasui

(10) Patent No.: US 7,710,651 B2
(45) Date of Patent: May 4, 2010

(54) CONTACTING TWO-LAYER DIFFRACTIVE OPTICAL ELEMENT

(75) Inventor: Hiroto Yasui, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 11/867,989

(22) Filed: Oct. 5, 2007

(65) Prior Publication Data

US 2008/0231956 A1  Sep. 25, 2008

(30) Foreign Application Priority Data

Mar. 23, 2007 (JP) ............................. 2007-077600
Mar. 29, 2007 (JP) ............................. 2007-086843

(51) Int. Cl.
*G02B 5/18* (2006.01)

(52) U.S. Cl. ..................... 359/576; 369/569; 369/566

(58) Field of Classification Search ....................... None
See application file for complete search history.

(56) References Cited

U.S. PATENT DOCUMENTS

| | | | |
|---|---|---|---|
| 5,044,706 A | 9/1991 | Chen | 359/357 |
| 5,790,321 A | 8/1998 | Goto | 359/742 |
| 6,157,488 A | 12/2000 | Ishii | 359/569 |
| 6,560,019 B2 | 5/2003 | Nakai | 359/569 |
| 6,781,756 B1 | 8/2004 | Ishii | 359/576 |
| 6,930,833 B2 | 8/2005 | Nakai | 359/569 |
| 7,236,302 B2 * | 6/2007 | Nakai et al. | 359/571 |
| 7,271,956 B2 | 9/2007 | Ishii | 359/569 |
| 2001/0038503 A1 | 11/2001 | Nakai | 359/869 |
| 2002/0163725 A1 | 11/2002 | Kobayashi | 359/569 |
| 2003/0161044 A1 | 8/2003 | Tokoyoda | 359/569 |
| 2005/0243423 A1 | 11/2005 | Nakai et al. | 359/566 |
| 2006/0171031 A1 | 8/2006 | Suzuki | 359/565 |
| 2006/0268414 A1 | 11/2006 | Tokoyoda | 359/569 |

FOREIGN PATENT DOCUMENTS

| | | |
|---|---|---|
| EP | 1 239 305 A1 | 9/2002 |
| EP | 1 591 806 A1 | 11/2005 |
| JP | 4-213421 | 8/1992 |
| JP | 6-324262 | 11/1994 |
| JP | 9-127322 | 5/1997 |
| JP | 2000-98118 | 4/2000 |
| JP | 2003-227913 | 8/2003 |
| JP | 2004-78166 | 3/2004 |

(Continued)

OTHER PUBLICATIONS

Feb. 21, 2008 Communication and European Search Report in European Patent Appln. No. 07 02 0072.

(Continued)

*Primary Examiner*—Arnel V Lavarias
(74) *Attorney, Agent, or Firm*—Fitzpatrick, Cella, Harper & Scinto

(57) ABSTRACT

The diffractive optical element includes two diffraction gratings made of different materials and being in contact with each other at their grating surfaces. The materials satisfy the following conditions, and the second material is obtained by mixing a resin material with a particulate material satisfying the following conditions: $nd1 \geq 1.48$, $vd1 \geq 40$, $(-1.665E-07 \times vd1^3 + 5.213E-05 \times vd1^2 - 5.656E-03 \times vd1 + 0.675) \leq \theta g$, $F1 \leq (-1.665E-07 \times vd1^3 + 5.213E-05 \times vd1^2 - 5.656E-03 \times vd1 + 0.825)$, $(-1.687E-07 \times vd1^3 + 5.702E-05 \times vd1^2 - 6.603E-03 \times vd1 + 1.400) \leq \theta g, d1 \leq (-1.687E-07 \times vd1^3 + 5.702E-05 \times vd1^2 - 6.603E-03 \times vd1 + 1.580)$, $nd2 \leq 1.6$, $vd2 \leq 30$, $\theta g, F2 \leq (-1.665E-07 \times vd2^3 + 5.213E-05 \times vd2^2 - 5.656E-03 \times vd2 + 0.675)$, $\theta g, d2 \leq (-1.687E-07 \times vd2^3 + 5.702E-05 \times vd2^2 - 6.603E-03 \times vd2 + 1.400)$, $nd1 - nd2 > 0$, $ndb2 \geq 1.70$, $vdb2 \leq 20$.

The element achieves a high diffraction efficiency in a specific diffraction order over a wide wavelength range.

11 Claims, 36 Drawing Sheets

FOREIGN PATENT DOCUMENTS

JP          2005-107298          4/2005

OTHER PUBLICATIONS

A.D. Lathman, et al., "Binary Optics in Lens Design", Proceedings of the SPIE: International Lens Design Conference, vol. 1354, Jun. 11-14, 1990, pp. 297-309.

A.P. Wood, "Using hybrid refractive-diffractive elements in infrared Petzval objectives", Proceedings of the SPIE: International Lens Design Conference, vol. 1354, Jun. 11-14, 1990, pp. 316-323.

M.W. Farn, et al., "Diffractive Doublet Corrected On-Axis at Two Wavelengths," Proceedings of the SPIE: International Lens Design Conference, vol. 1354 (Jun. 11-14, 1990), pp. 24-29.

C. Londoño, et al., "The Design of Achromatized Hybrid Diffractive Lens Systems," Proceedings of the SPIE: International Lens Design Conference, vol. 1354 (Jun. 11-14, 1990), pp. 30-37.

* cited by examiner

CONTACTING TWO-LAYER DIFFRACTIVE OPTICAL ELEMENT

BACKGROUND OF THE INVENTION

The present invention relates to a diffractive optical element for use in an optical system and an optical apparatus, and more particularly relates to a diffractive optical element configured so that diffraction gratings made of two materials are in contact with each other.

There is a method for reducing chromatic aberration by a combination of glass materials. On the other hand, other methods are disclosed for reducing chromatic aberration in SPIE Vol. 1354 International Lens Design Conference (1990), Japanese Patent Laid-Open No. 4 (1992)-213421, Japanese Patent Laid-Open No. 6 (1994)-324262 and U.S. Pat. No. 5,044,706, which provide a diffractive optical element (hereinafter, this may be called a diffraction grating) having a diffraction function at a lens surface or as a part of an optical system. Such a method utilizes a physical phenomenon that chromatic aberration occurs in opposite directions between at a refractive surface and at a diffractive surface in an optical system with respect to a light ray of a certain reference wavelength.

It is further possible to make such a diffractive optical element function as an aspheric surface by changing the period of its periodic structure, whereby aberration can be reduced remarkably.

In an optical system including a diffractive optical element, if most of light in a using wavelength range is converted to diffracted light of one specific diffraction order (hereinafter called a designed diffraction order or a designed order), the intensity of diffracted light of the other diffraction orders will be low. For instance, the intensity of 0 means the absence of the corresponding diffracted light. However, in the case where the diffracted light of the diffraction orders other than the designed diffraction order exists with some degree of intensity, an image will be formed at a place different from that for the designed diffraction order, resulting in flare light generated in the optical system.

Thus, in order to utilize the chromatic-aberration reducing function of a diffractive optical element, it is necessary that the diffraction efficiency of the diffracted light of the designed diffraction order is sufficiently high over the entire using wavelength range. To this end, it is important to consider sufficiently a spectral distribution of the diffraction efficiency in this designed diffraction order as well as the behavior of the diffracted light of the diffraction orders other than the designed diffraction order.

Herein, the diffraction efficiency of the diffracted light of a certain diffraction order refers to a ratio of the amount of the diffracted light of the diffraction order to the amount of the entire light flux transmitted through the diffractive optical element (this may be called transmittance also).

FIG. 25 shows a diffractive optical element made up of a substrate 109 and a diffraction grating 108 formed on the substrate 109 (hereinafter called a single-layer DOE). D1 is a grating thickness of the diffraction grating 108. FIG. 26 shows the diffraction-efficiency-characteristic curves in a specific and other diffraction orders when this single-layer DOE is formed at a certain surface.

In FIG. 26, the horizontal axis represents a wavelength of the incident light, and the vertical axis represents diffraction efficiency. As described above, a value of the diffraction efficiency represents the ratio of the amount of the diffracted light of each diffraction order to the amount of the entire light flux transmitted through the diffractive optical element. Herein, for the sake of brevity, light reflected by a grating interface is not taken into consideration.

As shown in FIG. 26, the single-layer DOE of FIG. 25 is designed so that the diffraction efficiency in the first diffraction order (bold solid line in the drawing) as the designed diffraction order is the highest in the using wavelength range. The diffraction efficiency in this designed diffraction order becomes the highest at a certain wavelength (hereinafter called a designed wavelength), and is gradually decreased at other wavelengths. The light corresponding to the decrease amount in this designed diffraction order becomes diffracted light of the other diffraction orders, which forms flare light. FIG. 26 shows the diffraction efficiencies in diffraction orders close to the designed diffraction order (zeroth order and second order) also as the other diffraction orders.

Various structures have been proposed for reducing the influences of the thus generated flare light.

As shown in FIG. 27, Japanese Patent Laid-Open No. 9(1997)-127322 has disclosed a diffractive optical element in which three different grating materials 110 to 112 and two different grating thicknesses d1 and d2 are selected optimally, and a plurality of diffraction gratings in close contact with each other are arranged with the same pitch distribution. Hereinafter, a diffractive optical element with such a structure will be called a contacting three-layer DOE. Thereby, as shown in FIG. 28, a high diffraction efficiency can be achieved in the designed diffraction order over the entire visible wavelength range.

A diffractive optical element 113 of FIG. 29, which is disclosed in Japanese Patent Laid-Open No. 2000-98118, is configured so that element portions 114 and 115 each including a diffraction grating are brought closer to each other with an air layer 116 interposed therebetween. Hereinafter, a diffractive optical element with such a structure will be called a stacked (multi-layer) DOE. As shown in FIG. 30A, a high diffraction efficiency can be achieved over the entire visible wavelength range by optimizing the refractive indexes of materials making up each diffraction grating, the dispersion characteristic thereof and the grating thickness of each layer. Additionally, as shown in FIG. 30B, the diffraction efficiencies of the zeroth order diffracted light and the second order diffracted light as unnecessary diffracted light can be generally suppressed (reduced).

A diffractive optical element disclosed in Japanese Patent Laid-Open No. 2004-78166 is the stacked DOE similar to the diffractive optical element disclosed in the above Japanese Patent Laid-Open No. 2000-98118. However, a mixed material of a particulate material and a resin material is used and the grating thickness of each layer is optimized, whereby as shown in FIG. 31A, a still higher diffraction efficiency can be achieved than that of the diffractive optical element of the above Japanese Patent Laid-Open No. 2000-98118. Additionally, as shown in FIG. 31B, the diffraction efficiencies of the zeroth order diffracted light and the second order diffracted light as the unnecessary order diffracted light also can be sufficiently suppressed.

A diffractive optical element 119 of FIG. 32 as disclosed in Japanese Patent Laid-Open No. 2005-107298 and Japanese Patent Laid-Open No. 2003-227913 is configured so that diffraction gratings 117 and 118 made of two different resin materials, respectively, are in close contact with each other at their grating surfaces. Hereinafter, a diffractive optical element with such a structure will be called a contacting two-layer DOE. With this structure, a diffractive optical element at a low cost can be realized, which can be manufactured easily.

According to the contacting three-layer DOE disclosed in the above Japanese Patent Laid-Open No. 9(1997)-127322 and the stacked DOEs disclosed in the above Japanese Patent Laid-Open No. 2000-98118, the diffraction efficiency in the designed diffraction order is 94% or higher over the entire using wavelength range, which is considerably improved as compared with the single-layer DOE. Unnecessary diffracted light causing flare light also can be favorably suppressed to 2% or lower.

However, in the case of an optical system mounted to an optical apparatus such as a still camera and a video camera, even small amount of remaining flare light may be a problem when a high-intensity light source is present in an image-pickup area.

In the stacked DOE disclosed in the above Japanese Patent Laid-Open No. 2004-78166 made of a mixed material of a particulate material and a resin material, the diffraction efficiency in the designed diffraction order is 99.5% or higher and the unnecessary diffracted light is 0.05% or lower over the entire using wavelength range, thus realizing higher performance more than the contacting three-layer DOE disclosed of the above Japanese Patent Laid-Open No. 9(1997)-127322 and the stacked DOEs of the above Japanese Patent Laid-Open No. 2000-98118. Thus, it is expected that flare light will be less noticeable to some extent.

However, a diffractive optical element is still required, which can be manufactured more easily than the stacked DOE disclosed in the above Japanese Patent Laid-Open No. 2004-78166 including an air layer.

Meanwhile, in the case of the contacting two-layer DOE disclosed in the above Japanese Patent Laid-Open No. 2005-107298 and Japanese Patent Laid-Open No. 2003-227913, the performance of this diffractive optical element itself, especially the diffraction efficiency of the first order diffracted light as the designed diffraction order light is about 95 to 97% over the entire using wavelength range, which is not sufficiently high. In other words, the flare light due to the unnecessary diffracted light may cause a problem. Furthermore, since the contacting two-layer DOE disclosed in the above Japanese Patent Laid-Open No. 2005-107298 includes a thick grating as much as about 20 μm or more, there is another problem of the degradation in diffraction efficiency resulting from vignetting of an obliquely incident light ray.

SUMMARY OF THE INVENTION

The present invention provides a diffractive optical element achieving a high diffraction efficiency in a specific diffraction order (designed diffraction order) over a wide wavelength range, capable of suppressing unnecessary diffracted light sufficiently, and further facilitating the manufacturing thereof.

According to an aspect, the present invention provides a diffractive optical element including two diffraction gratings made of a first material and a second material, respectively, the two diffraction gratings each having a grating surface and being in contact with each other at the grating surfaces. The first and second materials satisfy all of the following conditions, and the second material is a material obtained by mixing a resin material with a particulate material satisfying all of the following conditions:

$nd1 \geq 1.48$ $vd1 \geq 40$ $(-1.665E{-}07 \times vd1^3 + 5.213E{-}05 \times vd1^2 - 5.656E{-}03 \times vd1 + 0.675) \leq \theta g,F1 < (-1.665E{-}07 \times vd1^3 + 5.213E{-}05 \times vd1^2 - 5.656E{-}03 \times vd1 + 0.825)$ $(-1.687E{-}07 \times vd1^3 + 5.702E{-}05 \times vd1^2 - 6.603E{-}03 \times vd1 + 1.400) \leq \theta g,d1 \leq (-1.687E{-}07 \times vd1^3 + 5.702E05 \times vd1^2 6.603E03 \times vd1 + 1.580)$ $nd2 \leq 1.6$ $vd2 \leq 30$ $\theta g,F2 \leq (-1.665E{-}07 \times vd2^3 + 5.213E05 \times vd2^2 - 5.656E{-}03 \times vd2 + 0.675)$ $\theta g,d2 \leq (-1.687E{-}07 \times vd2^3 + 5.702E{-}05 \times vd2^2 - 6.603E{-}03 \times vd2 + 1.400)$ $nd1 - nd2 > 0$ $ndb2 \geq 1.70$ $vdb2 \leq 20$ where ng1, nF1, nd1, and nC1 are refractive indexes of the first material for g-line, F-line, d-line, and C-line, respectively, ng2, nF2, nd2, and nC2 are refractive indexes of the second material for g-line, F-line, d-line, and C-line, respectively, and nFb2, ndb2, and nCb2 are refractive indexes of the particulate material for F-line, d-line, and C-line, respectively, and $vd1 = (nd1-1)/(nF1-nC1)$ $vd2 = (nd2-1)/(nF2-nC2)$ $\theta g,F1 = (ng1-nF1)/(nF1-nC1)$ $\theta g,d1 = (ng1-nd1)/(nF1-nC1)$ $\theta g,F2 = (ng2-nF2)/(nF2-nC2)$ $\theta g,d2 = (ng2-nd2)/(nF2-nC2)$ $vdb2 = (ndb2-1)/(nFb2-nCb2)$.

According to another aspect, the present invention provides an optical system and an optical apparatus including the above diffractive optical element.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1:
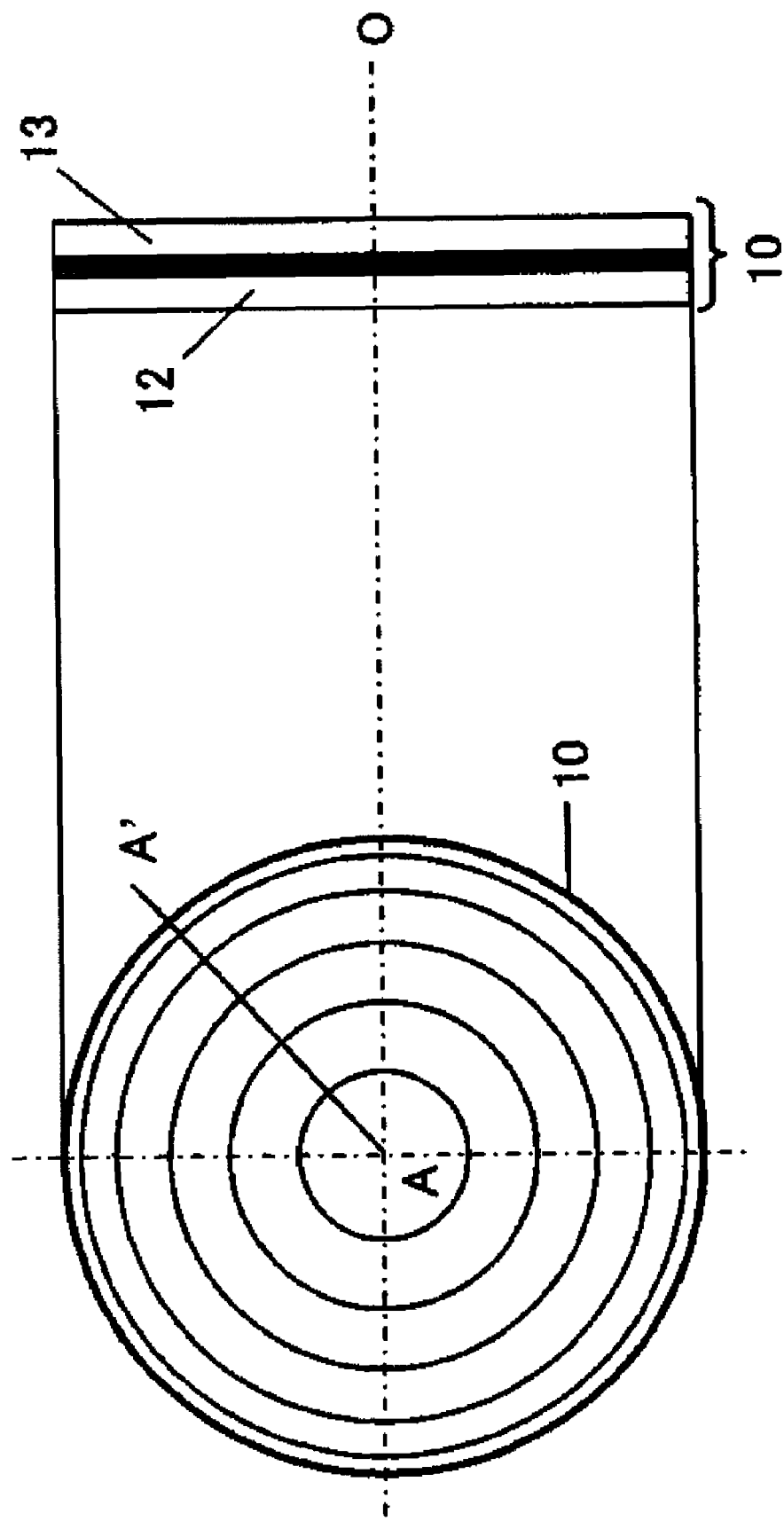
FIG. 1 is a front view as well as a side view showing a diffractive optical element that is embodiments (Embodiments 1 to 5) of the present invention.
Figure 2:
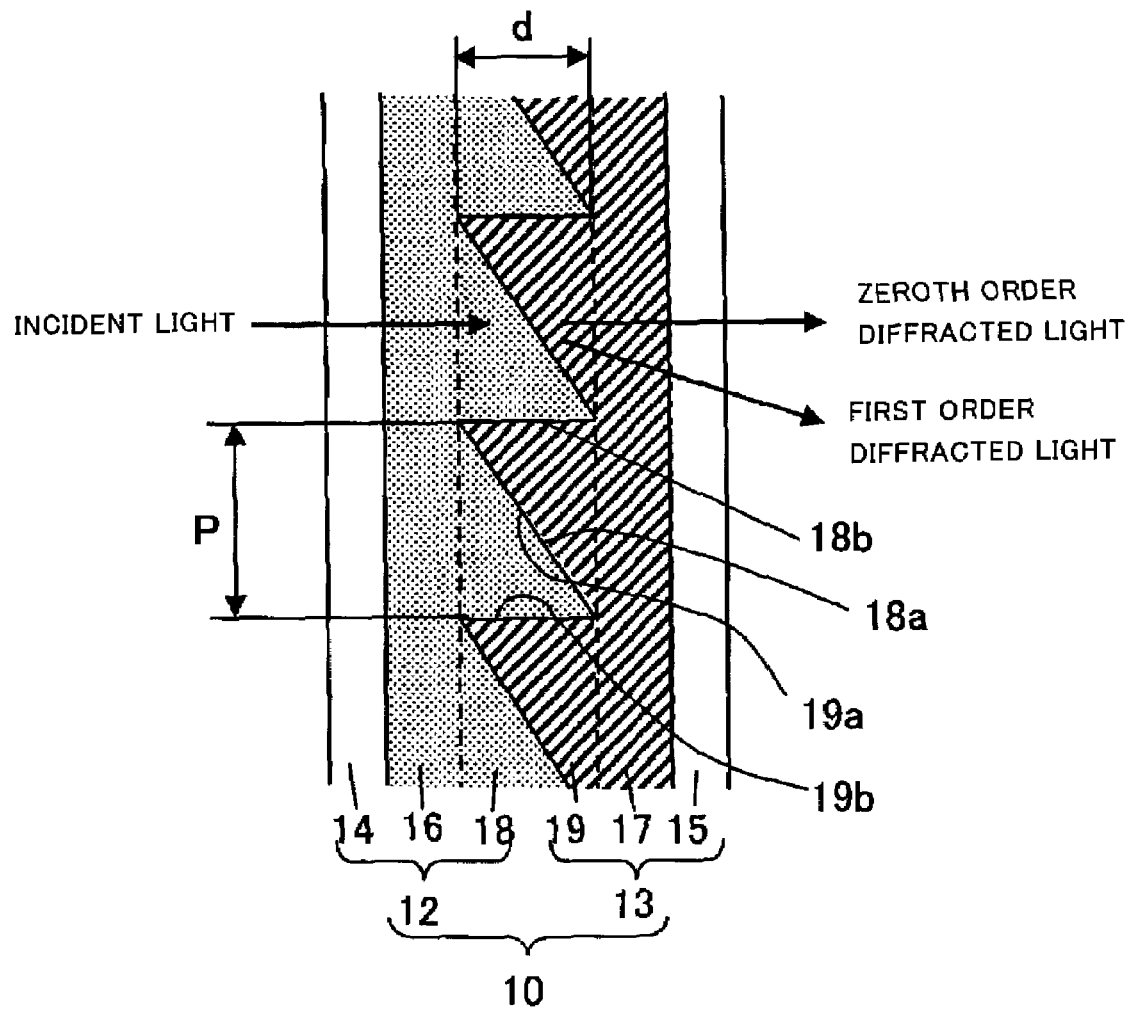
FIG. 2 is a partially cross-sectional view showing the diffractive optical element of Embodiments 1 to 5.

FIG. 1 is a front view (left drawing) as well as a side view (right drawing) of a diffractive optical element that is an embodiment (Embodiment 1) of the present invention. In FIG. 1, the character O represents a center axis of the diffractive optical element. FIG. 2 is a partially enlarged view showing the diffractive optical element of FIG. 1 in cross section taken along the line A-A' in FIG. 1. It should be noted here that FIG. 2 is not drawn to scale in the grating depth direction.

As shown in these drawings, a diffractive optical element 10 includes a first element portion 12 and a second element portion 13. The first element portion 12 includes a first transparent substrate 14 and a first grating-forming layer made up of a grating base portion 16 provided on the first transparent substrate 14 and a first diffraction grating 18 integrally formed with the grating base portion 16. The second element portion 13 includes a second transparent substrate 15 and a second grating-forming layer made up of a grating base portion 17 provided on the second transparent substrate 15 and a second diffraction grating 19 integrally formed with the grating base portion 17.

The first and second diffraction gratings 18 and 19 have the same grating shape (periodic structure), which means that they have a distribution of the same grating thickness d and the same grating pitch p. In other words, their grating shape has the same pattern. The grating shape refers to a shape where a convex portion (hereinafter called a peak) and a concave portion (hereinafter called a valley) are provided alternately.

The first and second element portions 12 and 13 are configured so that grating surfaces 18a and 19a (corresponding to inclined surfaces of the gratings) of the first and second diffraction gratings 18 and 19 are in contact with grating wall portions 18b and 19b thereof without a gap therebetween, i.e., without an air layer intervening therebetween. The first and second element portions 12 and 13 as a whole function as one diffractive optical element.

The first and second diffraction gratings 18 and 19 have a concentric grating shape, which function as a lens because their grating pitch varies in the radial direction.

In this embodiment, the wavelength range of light incident on the diffractive optical element 10, i.e., the using wavelength range is a visible wavelength range (e.g., 400 to 700 nm). Materials of the first and second diffraction gratings 18 and 19 and their grating thickness are selected so that the diffraction efficiency becomes the highest for the first order diffracted light as the designed diffraction order light over the entire visible wavelength range.

Figure 25:
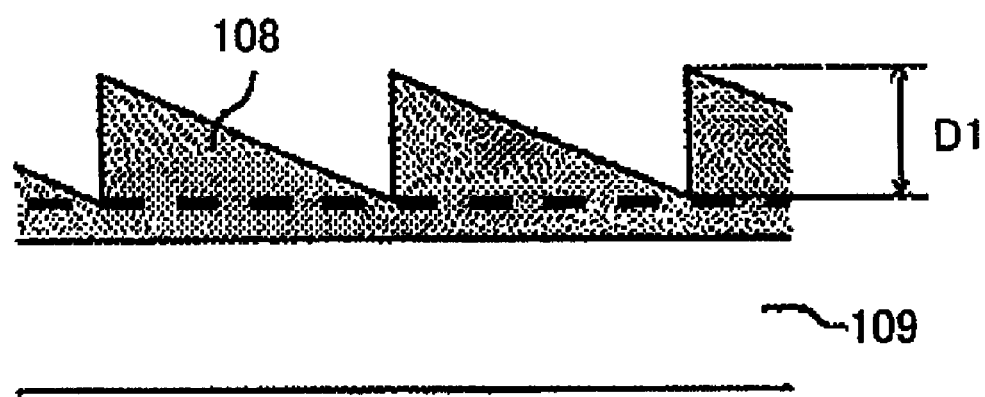
FIG. 25 is a partially cross-sectional view showing a conventional single-layer diffractive optical element.
Figure 26:
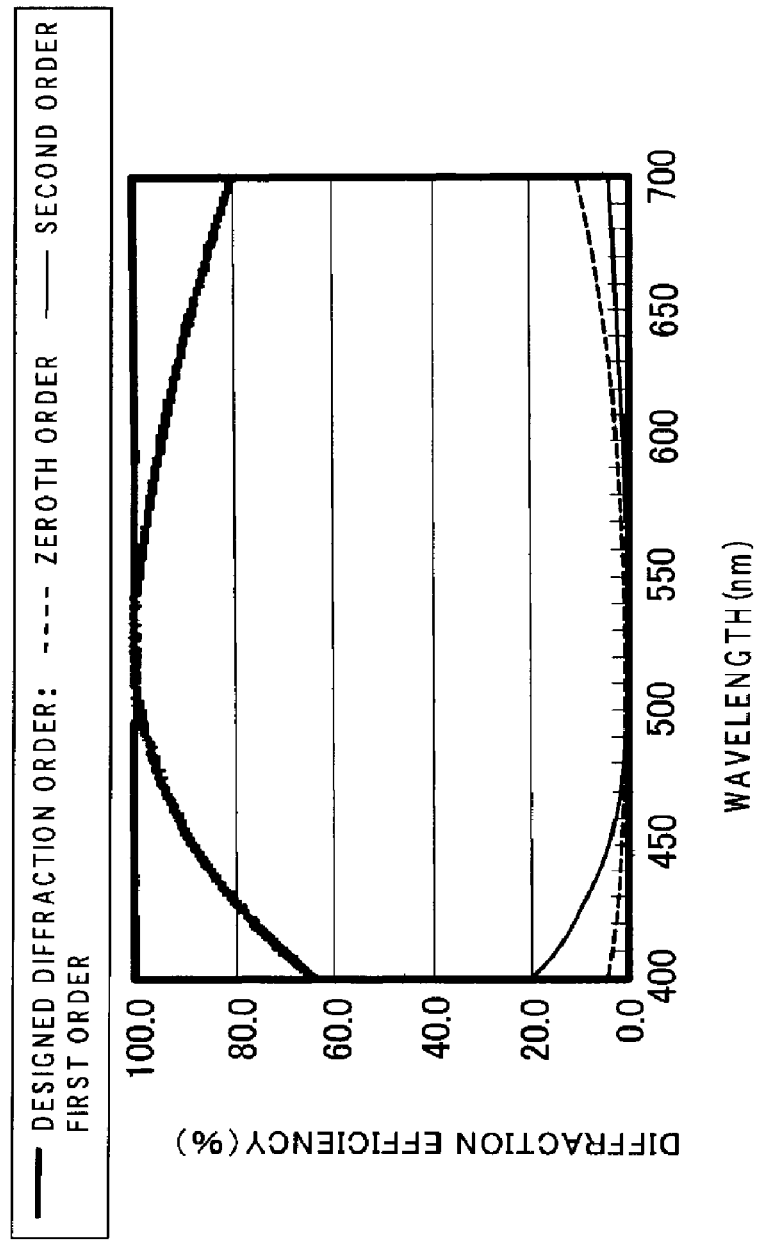
FIG. 26 is a graph showing the diffraction efficiency characteristics in the designed diffraction order as well as in the designed diffraction order±one diffraction orders of a conventional single-layer diffractive optical element.
Figure 27:
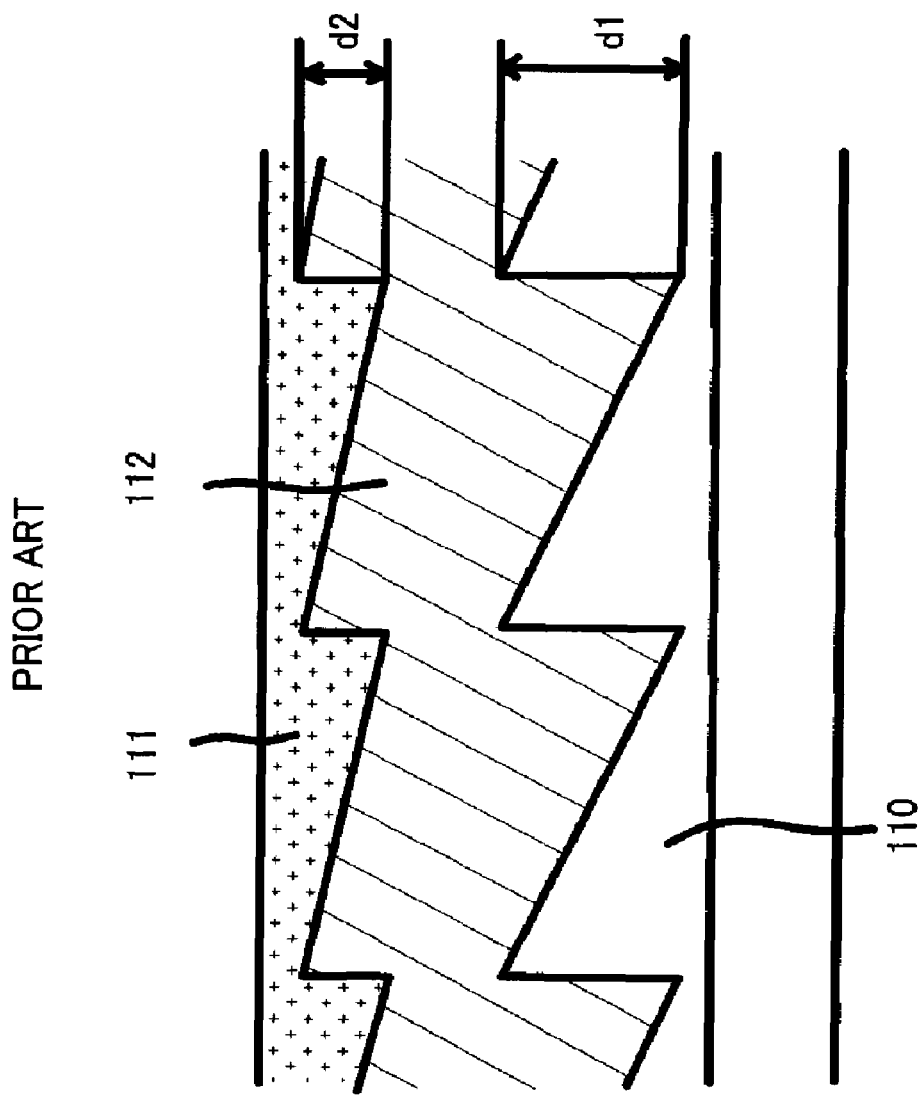
FIG. 27 is a partially cross-sectional view showing a conventional contacting three-layer diffractive optical element.
Figure 28:
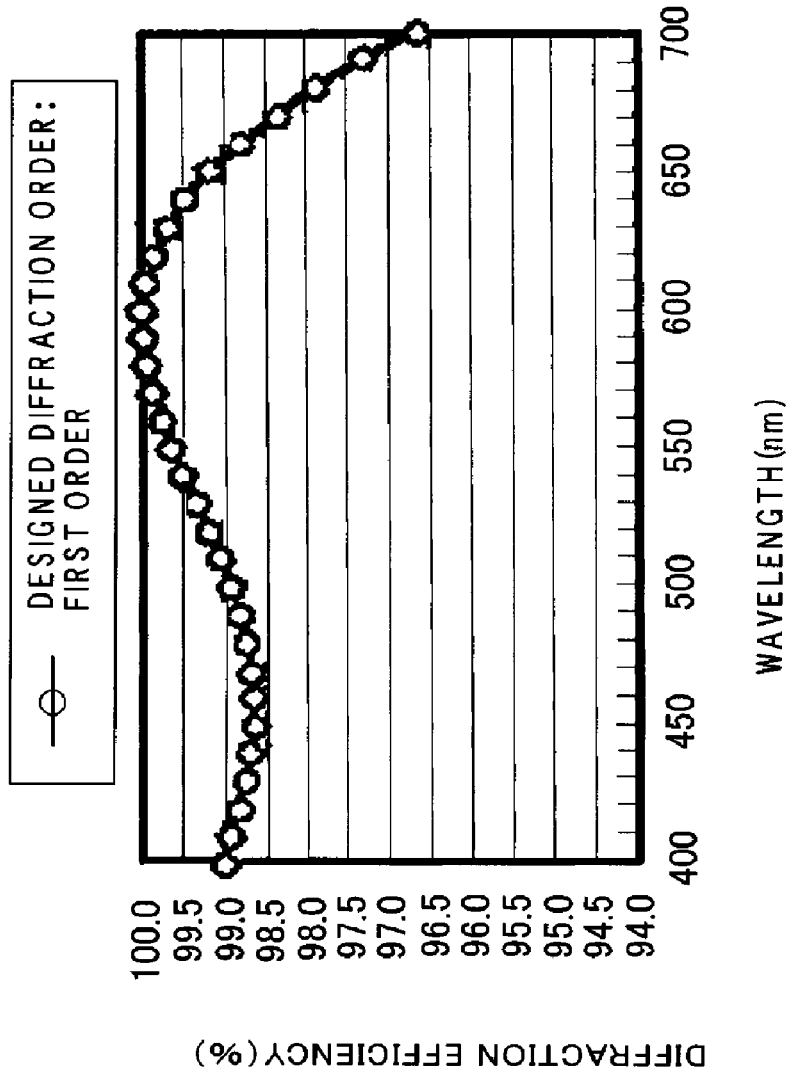
FIG. 28 is a graph showing the diffraction efficiency characteristic in the designed diffraction order of a conventional contacting three-layer diffractive optical element.
Figure 29:
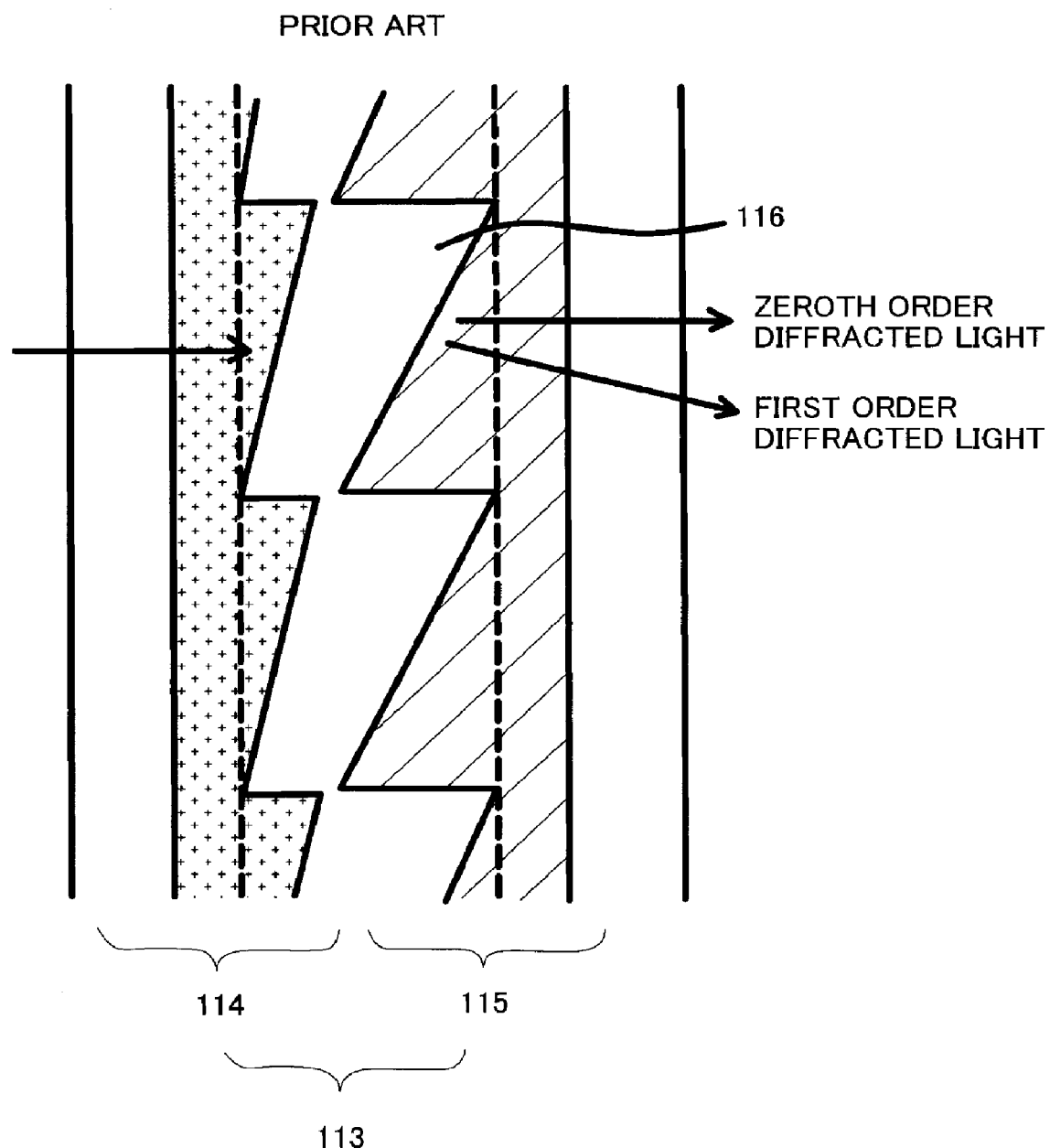
FIG. 29 is a partially cross-sectional view showing a conventional stacked diffractive optical element.
Figure 30A:
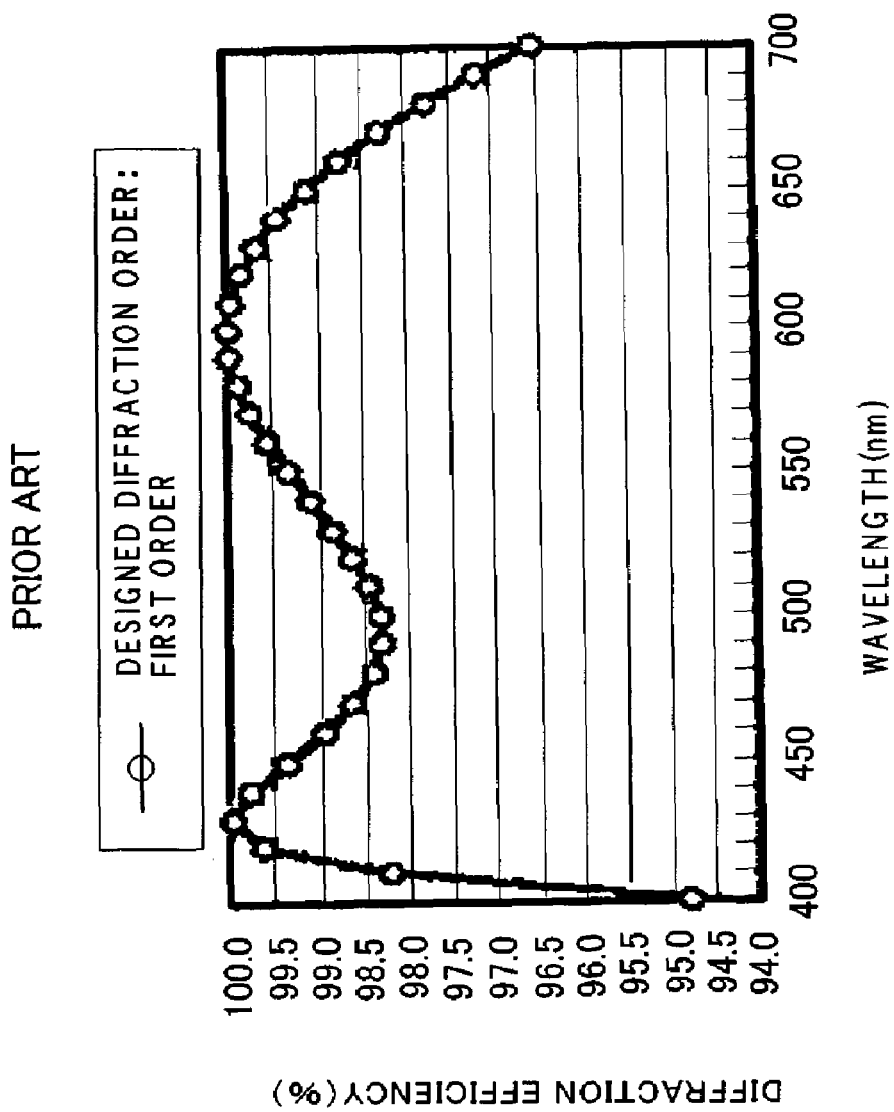
FIG. 30A is a graph showing the diffraction efficiency characteristic in the designed diffraction order of a conventional stacked diffractive optical element.
Figure 30B:
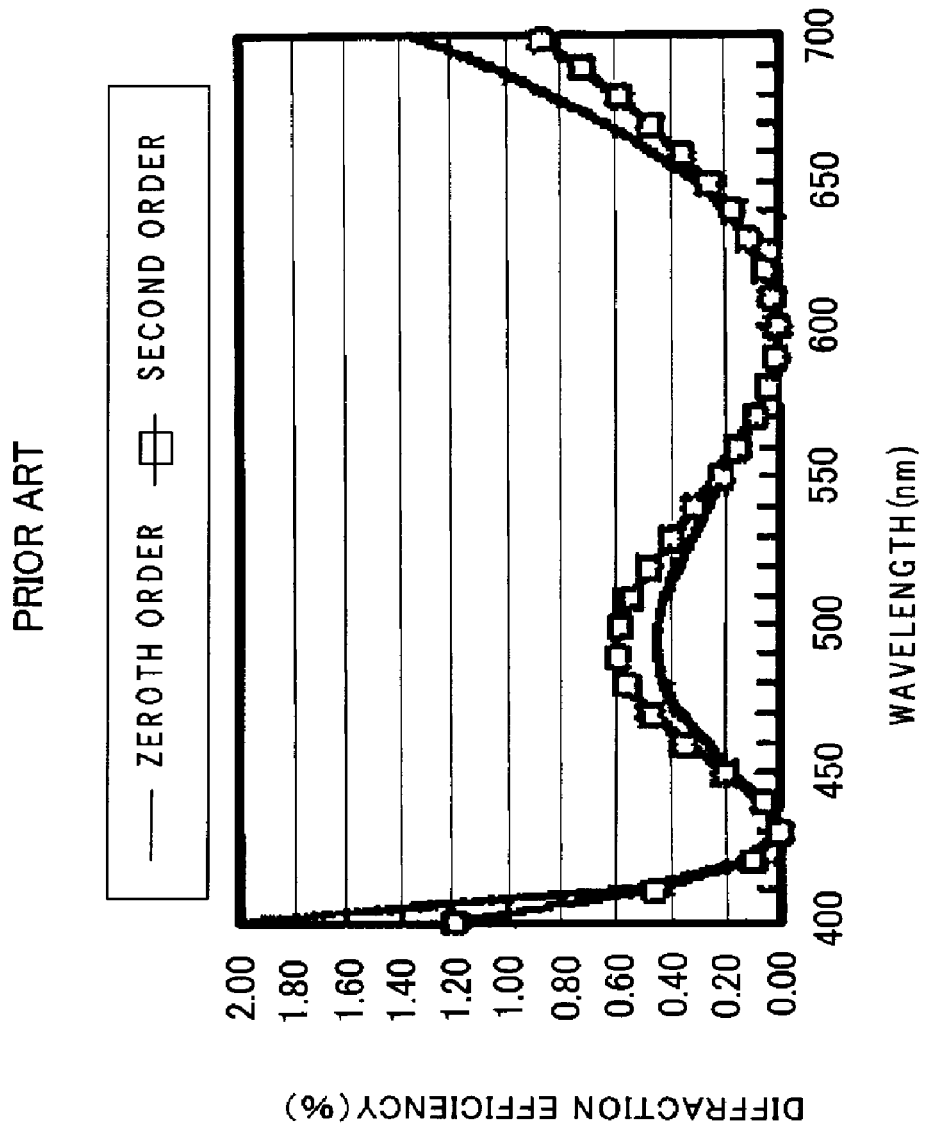
FIG. 30B is a graph showing the diffraction efficiency characteristics in the designed diffraction order±one diffraction orders of a conventional stacked diffractive optical element.
Figure 31A:
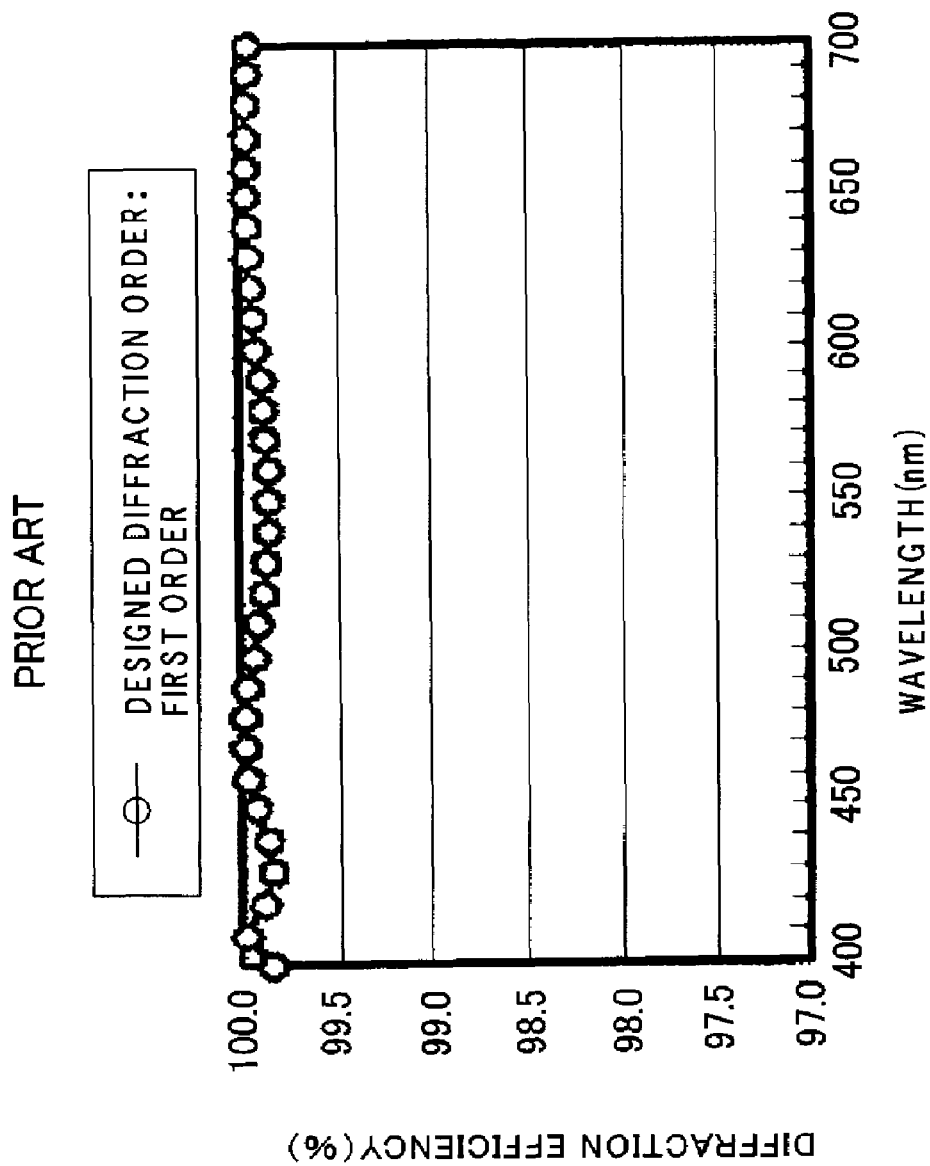
FIG. 31A is a graph showing the diffraction efficiency characteristic in the designed diffraction order of a conventional stacked diffractive optical element.
Figure 31B:
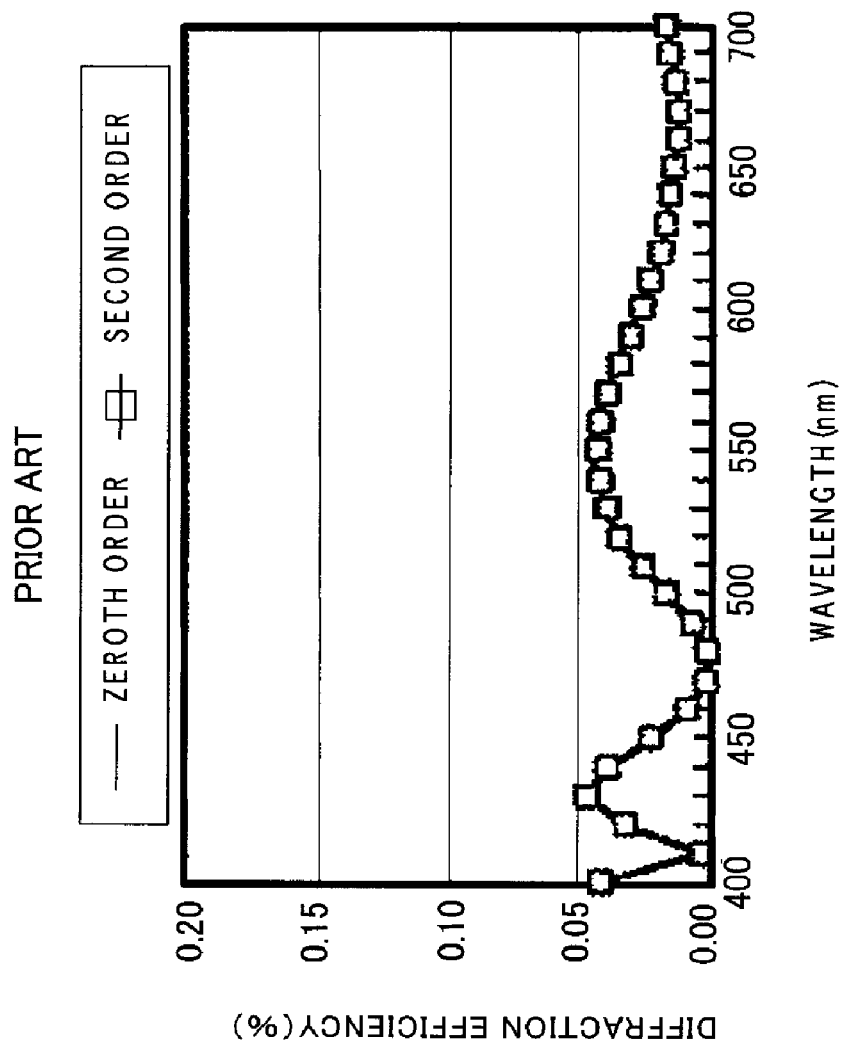
FIG. 31B is a graph showing the diffraction efficiency characteristics in the designed diffraction order±one diffraction orders of a conventional stacked diffractive optical element.
Figure 32:
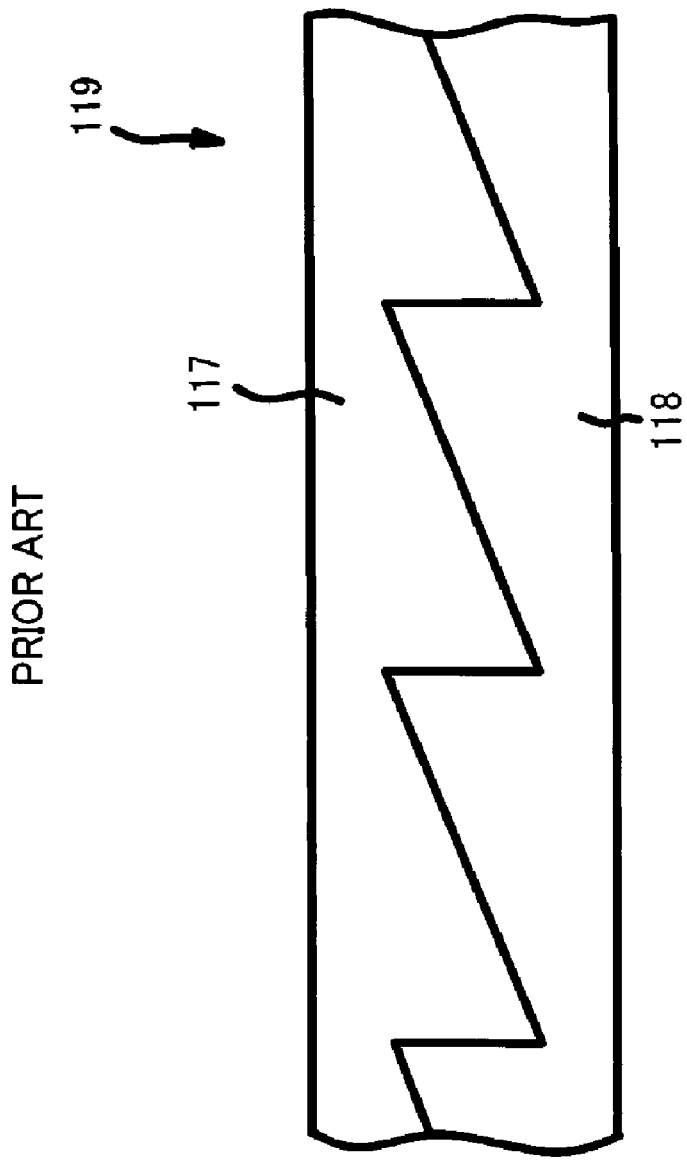
FIG. 32 is a partially cross-sectional view showing a conventional contacting two-layer diffractive optical element.

The following describes the diffraction efficiency of the diffractive optical element 10 of this embodiment. In the case of the conventional single-layer DOE of FIG. 25, the condition for maximizing diffraction efficiency of diffracted light of a certain diffraction order is as follows, where λ0 is the designed wavelength.

In the case where light flux impinges on the diffractive optical element 10 perpendicularly to a base surface (indicated by a broken line in FIG. 25) of the diffraction grating, if the difference in optical path length between the peak and the valley of the diffraction grating (i.e., the difference in optical path length between a light ray passing through the peak and a light ray passing through the valley) becomes an integer multiple of the wavelength, the diffraction efficiency for the diffracted light will be maximized. This can be represented by the following expression:

$$(n01-1) \times d = m \times \lambda 0 \quad (20)$$

where n01 is a refractive index of the material of the diffraction grating for the light with the wavelength of λ0, d is a grating thickness and m is a diffraction order.

Since expression (20) includes a term of a wavelength, the expression is satisfied only for the designed wavelength at a given order, and the diffraction efficiency will decrease from the maximum value at wavelengths other than the designed wavelength.

The diffraction efficiency η(λ) at any wavelength λ can be represented by the following expression (21):

$$\eta(\lambda) = \mathrm{sinc}^2 [\pi \times \{m - (n1(\lambda) - 1) \times d/\lambda\}] \quad (21),$$

where m is a diffraction order, n1(λ) is a refractive index of the material of the diffraction grating for the light with the wavelength of λ, and sinc² (a) is a function represented by $\{\sin(a)/a\}^2$.

Basically, the same goes for a diffractive optical element having a stacked structure of two or more layers as in this embodiment, and in order to make the layers as a whole function as one diffractive optical element, the element is configured as follows. The difference in optical path length is determined between the peak and the valley of the diffraction grating formed at the border of the materials making up the layers. This difference in optical path length is added over the entire diffraction grating. Then, the dimensions of the grating shape are determined so that the value obtained by adding the differences in optical path length becomes an integer multiple of the wavelength.

Consequently, in the diffractive optical element 10 shown in FIG. 2, the condition for maximizing the diffraction efficiency of the m-th order diffracted light can be represented by the following expression, where λ0 is the designed wavelength:

$$\pm(n01 - n02) \times d = \lambda 0 \quad (22)$$

where n01 is a refractive index of the material making up the first diffraction grating 18 of the first element portion 12 for the light with the wavelength of λ0, n02 is a refractive index of the material making up the second diffraction grating 19 of the second element portion 13 for the light with the wavelength of λ0, and d is the grating thickness common to the diffraction gratings 18 and 19.

Diffraction orders of light diffracted obliquely downward with respect to the zeroth order diffracted light in FIG. 2 are defined as positive diffraction orders, whereas diffraction orders of light diffracted obliquely upward with respect to the zeroth order diffracted light are defined as negative diffraction orders. In this case, the sign ± in expression (22) will be positive in the case of a diffraction grating having a grating shape with a thickness increasing from top to bottom in FIG. 2, and conversely, will be negative in the case of a diffraction grating having a grating shape with a thickness decreasing from top to bottom in FIG. 2.

In the structure shown in FIG. 2, the diffraction efficiency η(λ) at the wavelength of λ other than the designed diffraction order λ0 can be represented by the following expression:

$$\eta(\lambda) = \mathrm{sinc}^2(\pi \times [m - \{\pm(n1(\lambda) - n2(\lambda)) \times d/\lambda\}]) \quad (23)$$
$$= \mathrm{sinc}^2(\pi \times (m - \phi(\lambda)/\lambda))$$
$$\phi(\lambda) = \pm(n1(\lambda) - n2(\lambda)) \times d \quad (24)$$

where m is a diffraction order, n1(λ) is a refractive index of the material making up the first diffraction grating 18 at the wavelength of λ, n2(λ) is a refractive index of the material making up the second diffraction grating 19 at the wavelength of λ, d is the grating thickness common to the diffraction gratings 18 and 19, and sinc² (a) is a function represented by $\{\sin(a)/a\}^2$.

The following is an explanation of the conditions for obtaining a high diffraction efficiency in the diffractive optical element 10 of this embodiment.

In order to obtain a high diffraction efficiency over the entire using wavelength range, the value η(λ) defined by expression (23) should be close to 1 over the entire using wavelength range. In other words, in order to improve the diffraction efficiency in the designed diffraction order m, $\phi(\lambda)/\lambda$ should be close to m in expression (23). For example, when the designed diffraction order m is the first order, $\phi(\lambda)/\lambda$ should be close to 1.

Moreover, it can be seen from the above relationship that the optical-path-length difference $\phi(\lambda)$ obtained based on the grating shape needs to change linearly in proportion to the wavelength $\lambda$, which means that the value on the right side of expression (24) should have linearity. That is to say, a ratio of the change in refractive index of the material making up the second diffraction grating 19 in accordance with the wavelength to the change in refractive index of the material making up the first diffraction grating 18 in accordance with the wavelength needs to be constant over the entire using wavelength range.

The following describes a more specific embodiment with a structure satisfying the above-stated relationships.

In the diffractive optical element 10 of FIG. 2, the first diffraction grating 18 is made of a mixed material (nd=1.542, vd=53.2) of acrylic resin and $Al_2O_3$ particles (particulate material). The second diffraction grating 19 is made of a mixed material (nd=1.491, vd=19.8) of fluorine resin and ITO particles (particulate material). The grating thickness d common to the first and second diffraction gratings 18 and 19 is 11.4 μm.

Figure 3A:
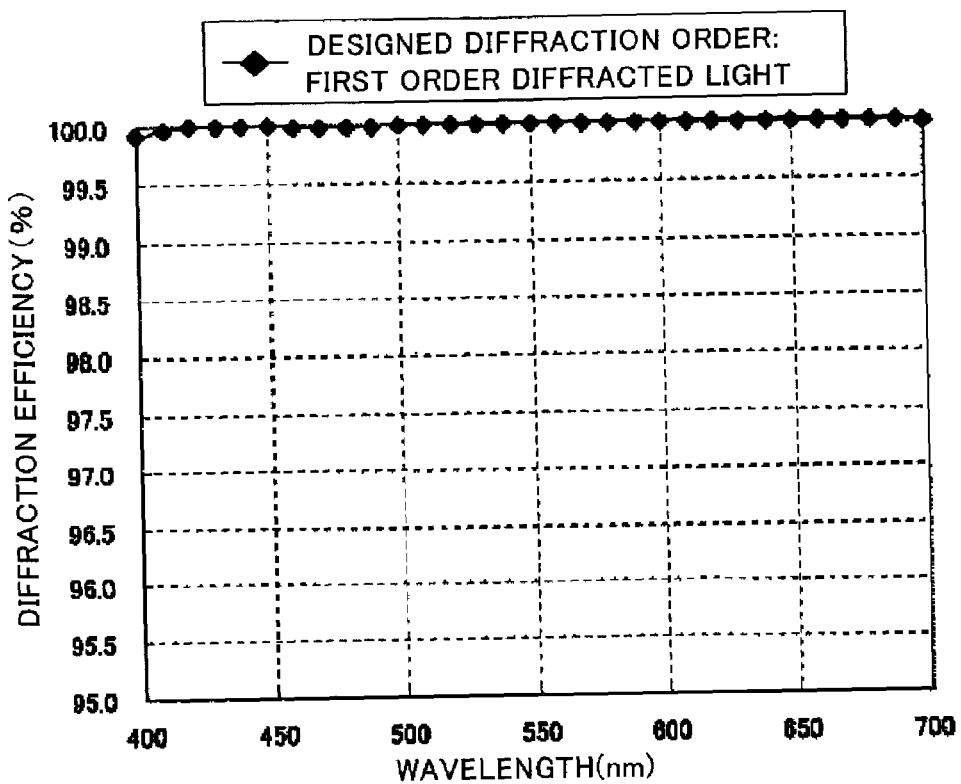
FIG. 3A is a graph showing the diffraction efficiency characteristic in the designed diffraction order of the diffractive optical element of Embodiment 1.
Figure 3B:
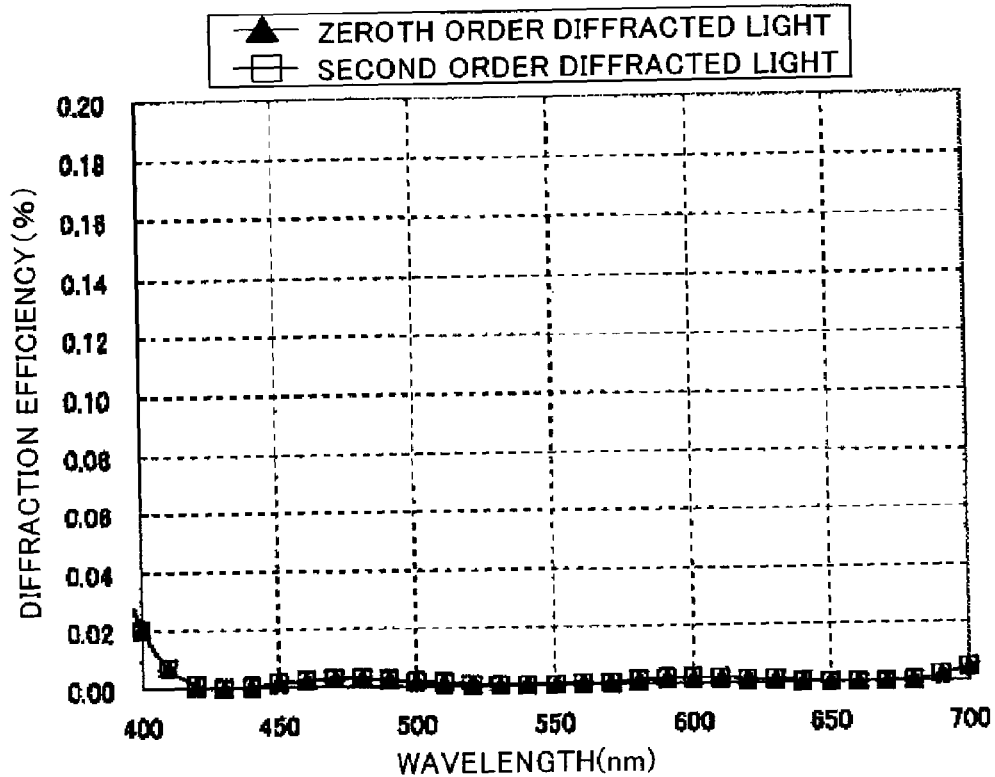
FIG. 3B is a graph showing the diffraction efficiency characteristics in the designed diffraction order±one diffraction orders of the diffractive optical element of Embodiment 1.

FIG. 3A shows the diffraction efficiency of the first order diffracted light in the diffractive optical element 10 of this embodiment. The designed diffraction order of the diffractive optical element 10 is the first order. FIG. 3B shows the diffraction efficiencies of the diffracted lights of the designed diffraction order±one diffraction orders (zeroth order and second order). In these drawings, the vertical axis represents diffraction efficiency (%), and the horizontal axis represents wavelength (nm). The same goes for the following embodiments.

As can be seen from these drawings, the diffractive optical element 10 of this embodiment shows an improved diffraction efficiency of the first order diffracted light as the designed order diffracted light as compared with those of the diffractive optical elements disclosed in the above Japanese Patent Laid-Open No. 9(1997)-127322, Japanese Patent Laid-Open No. 2000-98118 and Japanese Patent Laid-Open No. 2005-107298. Furthermore, according to the diffractive optical element 10 of this embodiment, the diffraction efficiencies of the zeroth order diffracted light and the second order diffracted light as the unnecessary order diffracted light are further reduced, so that less flare light is produced.

The diffractive optical element 10 of this embodiment has an overall grating thickness (the total sum of the thicknesses of two diffraction grating layers and an air layer in the stacked DOE) smaller than that of the conventional diffractive optical element disclosed in Japanese Patent Laid-Open No. 2004-78166. Nevertheless, the diffractive optical element 10 achieves performances as well as or better than the conventional diffractive optical element for the designed order diffracted light (first order diffracted light) and the unnecessary order diffracted light (zeroth order diffracted light and second order diffracted light). Moreover, the diffractive optical element 10 of this embodiment achieves a diffraction efficiency of the first order diffracted light of 99.9% or higher over the entire visible wavelength range, and sufficiently suppresses the diffraction efficiency of the unnecessary order diffracted light (zeroth order diffracted light and second order diffracted light) to be 0.02% or lower.

In the above description, the diffraction efficiency of the unnecessary diffracted light is only evaluated for zeroth order diffracted light and second order diffracted light that are diffracted lights of the designed diffraction order±one diffraction orders. This is because as a diffraction order is away from the designed diffraction order, the contribution to the flare light will decrease. That is, a reduction in flare light due to zeroth order and second order diffracted light accordingly brings a reduction in flare light due to the other order diffracted light. The reason is as follows. In a diffractive optical element designed so that the diffracted light of the designed diffraction order is mainly diffracted, as a diffraction order is away from the designed diffraction order, the diffraction efficiency of the light is decreased, and an image formed by the light of such a diffraction order blurs considerably on the imaging plane, thus making it unnoticeable as flare.

Figure 4:
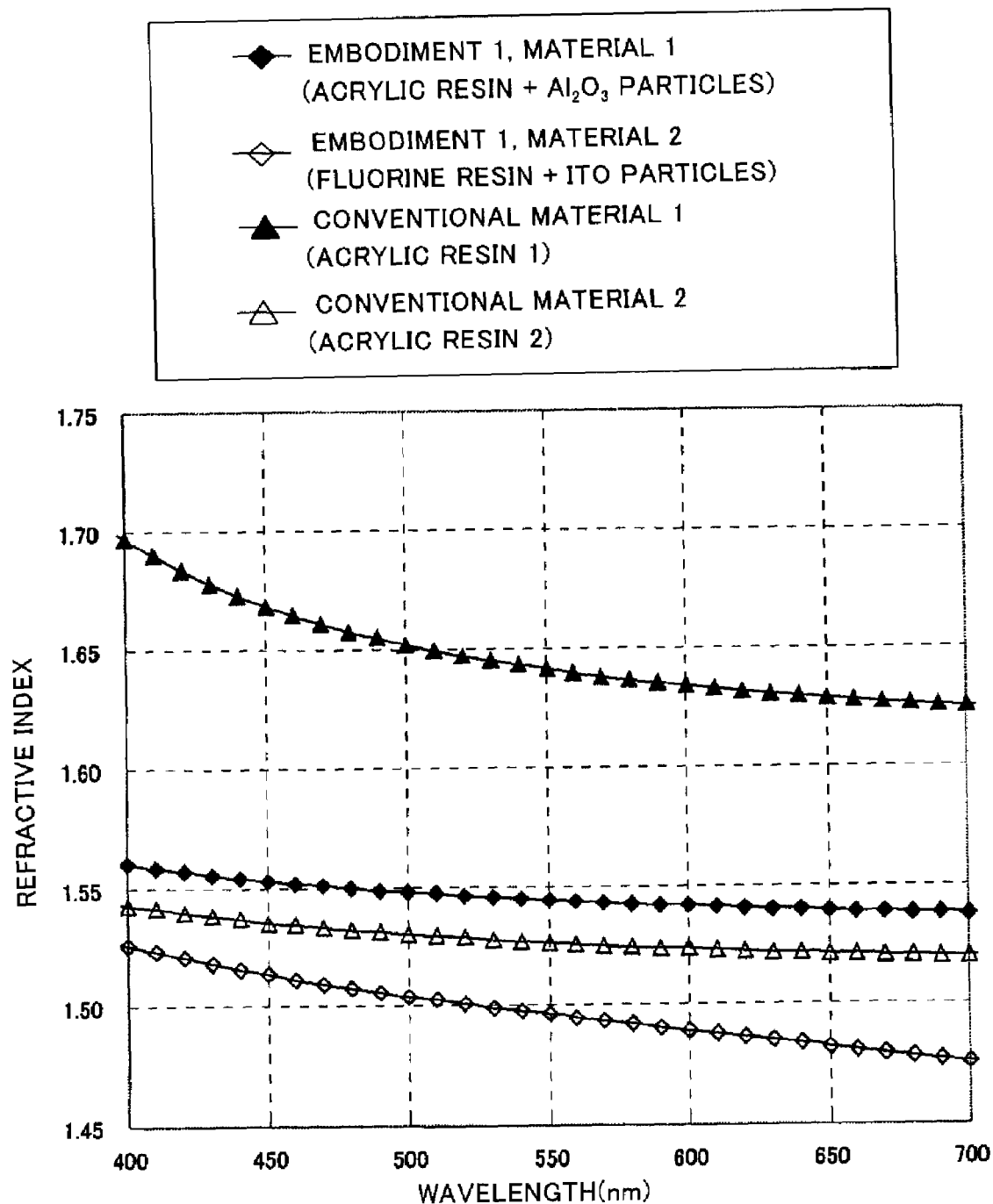
FIG. 4 is a graph showing the refractive index characteristics (n-λ characteristics) of materials making up the diffractive optical element of Embodiment 1.

FIG. 4 shows the refractive index characteristics in the visible wavelength range of the materials used in this embodiment that is obtained by mixing acrylic resin with $Al_2O_3$ particles (material 1) and by mixing fluorine resin with ITO particles (material 2) as well as those of the material disclosed in the above Japanese Patent Laid-Open No. 2000-98118. The materials disclosed in Japanese Patent Laid-Open No. 2000-98118 are acrylic resin 1 (nd=1.523, vd=51.1) and acrylic resin 2 (nd=1.636, vd=23.0).

In FIG. 4, the slopes of the refractive-index characteristic graphs appear to be different between material 1 and material 2 used in this embodiment. However, the refractive indexes of these materials change substantially constantly with respect to a change of the wavelength. On the other hand, although the refractive index of acrylic resin 1 of Japanese Patent Laid-Open No. 2000-98118 changes substantially constantly with respect to a change of the wavelength, the rate of the change of that of acrylic resin 2 is larger in the shorter wavelength side.

This results from the fact that Japanese Patent Laid-Open No. 2000-98118 merely refers to vd(nd−1)/(nF−nC) as the material properties, where nF, nd and nC are refractive indexes for F-line, d-line and C-line, respectively, and vd is a value merely defining the average slope of a change in refractive index near d-line. In the case of the stacked diffractive optical element, the nd characteristic is the evaluation scale suitable for improving the diffraction efficiency compared to that of the single-layer DOE while maintaining a small grating thickness of the stacked diffractive optical element.

However, this embodiment is aimed to improve the diffraction efficiency further as compared with that of the diffractive optical element of Japanese Patent Laid-Open No. 2000-98118. Therefore, the vd characteristic simply representing the average change in refractive index is insufficient as the evaluation scale.

In contrast, a partial dispersion ratio θg,F for g-line and F-line as well as a partial dispersion ratio θg,d for g-line and d-line are employed as new evaluation scales. When nF, nC and ng are refractive indexes for F-line, C-line and g-line, respectively, the partial dispersion ratio θg,F can be represented as θg, F=(ng−nF)/(nF−nC). When nF, nd, nC and ng are refractive indexes for F-line, d-line, C-line and g-line, respectively, the partial dispersion ratio θg,d can be represented as θg,d=(ng−nd)/(nF−nC). These expressions represent a ratio between a refractive index change in a short-wavelength side and a refractive index change in a long-wavelength side.

Material 1 of this embodiment has θg,F=0.55 and Θg,d=1.25. Whereas, material 2 has ηg,F=0.41, θg,d=1.04, which are smaller than those of material 1. Meanwhile, acrylic resin 1 of Japanese Patent Laid-Open No. 2000-98118 has θg,F=0.58, θg,d=1.28, and acrylic resin 2 has θg,F=0.68, θg,d=1.40. Although θg,F and θg,d of acrylic resin 1 are not so much different from those of material 1 of this embodiment, θg,F and θg,d of acrylic resin 2 are greater than those of material 2 of this embodiment. Therefore, it can be said that the combination of the materials of this embodiment keeps a change in refractive index of a respective material with respect to a change of wavelength more constant over the entire using wavelength range, and provides a higher diffraction efficiency.

Unlike the above Japanese Patent Laid-Open No. 9(1997)-127322, Japanese Patent Laid-Open No. 2000-98118, Japanese Patent Laid-Open No. 2004-78166 and Japanese Patent Laid-Open No. 2005-107298, this embodiment employs the above-stated materials 1 and 2, and can realize a contacting two-layer DOE in which the first and second diffraction gratings 18 and 19 having the same grating pattern are in contact with each other at their grating surfaces, while maintaining a high diffraction efficiency. Thereby, there is no need to align these diffraction gratings 18 and 19 with high accuracy, thus facilitating the manufacturing thereof.

The above-stated embodiment describes the diffractive optical element provided with the diffraction gratings 18 and 19 on the transparent substrates 14 and 15 in a flat plate form as shown in FIGS. 1 and 2. However, instead of the flat transparent substrate, a lens may be used, and a diffraction grating may be provided on a curved surface of the lens such as a convex surface or a convex surface, from which similar effects to this embodiment can be obtained.

Although this embodiment describes the diffractive optical element where the designed diffraction order is the first order, the designed diffraction order is not limited to the first order. Even in the case of diffracted light in the second order, the third order or the like other than the first order, similar effects to that of this embodiment can be obtained by setting a synthetic value of the optical-path-length differences of the diffraction gratings so as to correspond to a desired designed wavelength in a desired designed diffraction order.

Embodiment 2

The following describes Embodiment 2 of the present invention. A diffractive optical element of this embodiment has basically the same configuration as that of Embodiment 1. That is, the element has the structure shown in FIGS. 1 and 2. Therefore, the same reference numerals will be assigned to the components common to those of Embodiment 1, their detailed explanations will be omitted and only differences will be focused on the following description.

In the diffractive optical element 10 of this embodiment, a first diffraction grating 18 shown in FIG. 2 is made of a mixed material (nd=1.611, vd=45.5) of acrylic resin and $ZrO_2$ particles. A second diffraction grating 19 is made of a mixed material (nd=1.567, vd=21.7) of acrylic resin and ITO particles. The grating thickness d common to the first and second diffraction gratings 18 and 19 is 13.3 μm.

Figure 5A:
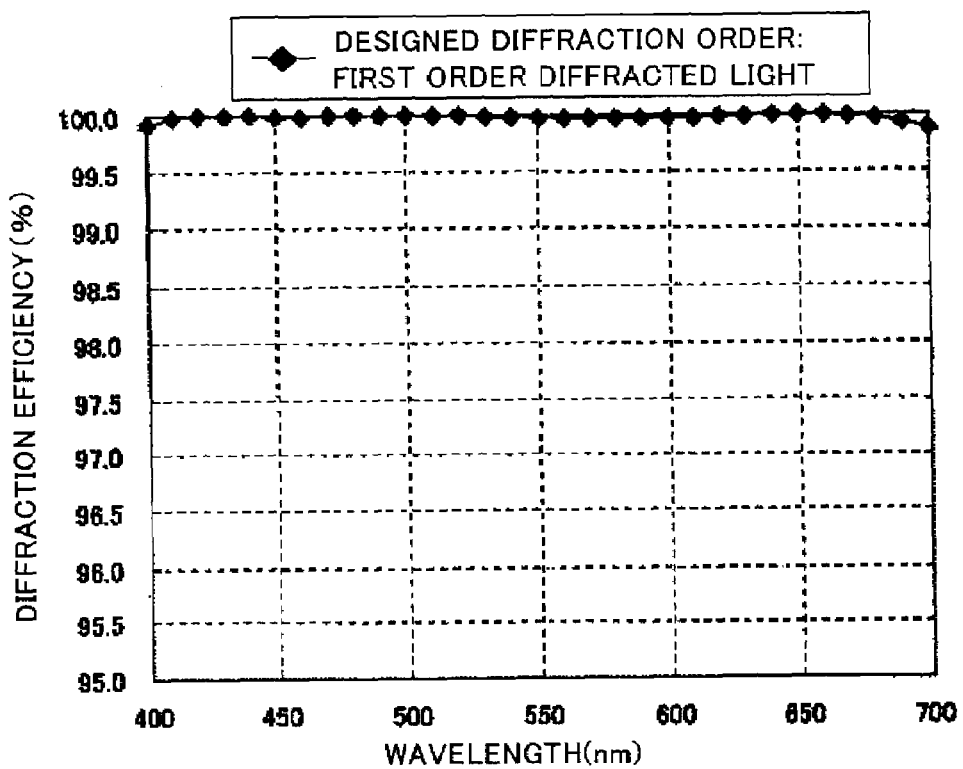
FIG. 5A is a graph showing the diffraction efficiency characteristic in the designed diffraction order of a diffractive optical element of Embodiment 2.
Figure 5B:
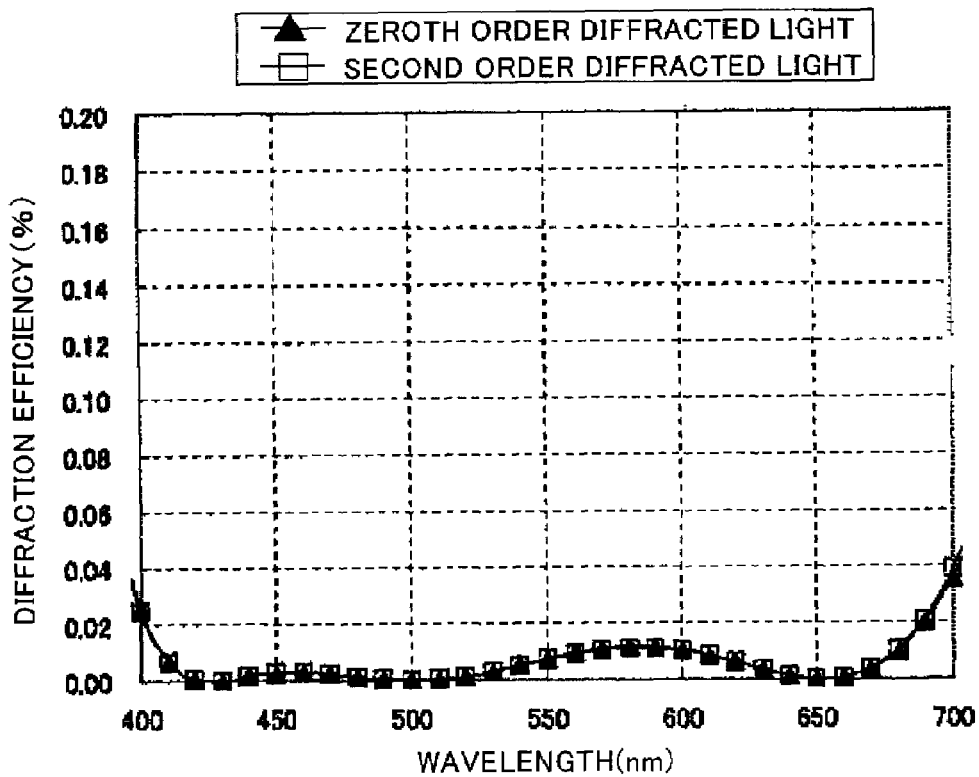
FIG. 5B is a graph showing the diffraction efficiency characteristics in the designed diffraction order±one diffraction orders of the diffractive optical element of Embodiment 2.

FIG. 5A shows the diffraction efficiency of the first order diffracted light in the diffractive optical element 10 of this embodiment. The designed diffraction order is the first order. FIG. 5B shows the diffraction efficiencies of the diffracted lights of the designed diffraction order±one diffraction orders (zeroth order diffracted light and second order diffracted light). Similarly to the diffractive optical element 10 of Embodiment 1, the diffractive optical element 10 of this embodiment shows an improved diffraction efficiency of the first order diffracted light as the designed order diffracted light, and can reduce the diffraction efficiencies of the zeroth order diffracted light and the second order diffracted light as the unnecessary diffracted light, so that less flare light is produced.

More specifically, the diffraction efficiency of the first order diffracted light is 99.8% or higher over the entire visible wavelength range, and the diffraction efficiency of the unnecessary diffraction order light (zeroth order diffracted light and second order diffracted light) is sufficiently suppressed to be 0.04% or lower.

Embodiment 3

The following describes Embodiment 3 of the present invention. A diffractive optical element of this embodiment has basically the same configuration as that of Embodiment 1. That is, the element has the structure shown in FIGS. 1 and 2. Therefore, the same reference numerals will be assigned to the components common to those of Embodiment 1, their detailed explanations will be omitted and only differences will be focused on the following description.

In the diffractive optical element 10 of this embodiment, a first diffraction grating 18 shown in FIG. 2 is made of a mixed material (nd=1.594, vd=58.0) of acrylic resin and $Al_2O_3$ particles. A second diffraction grating 19 is made of a mixed material (nd=1.519, vd=16.5) of fluorine resin and ITO particles. The grating thickness d common to the first and second diffraction gratings 18 and 19 is 7.8 μm.

Figure 6A:
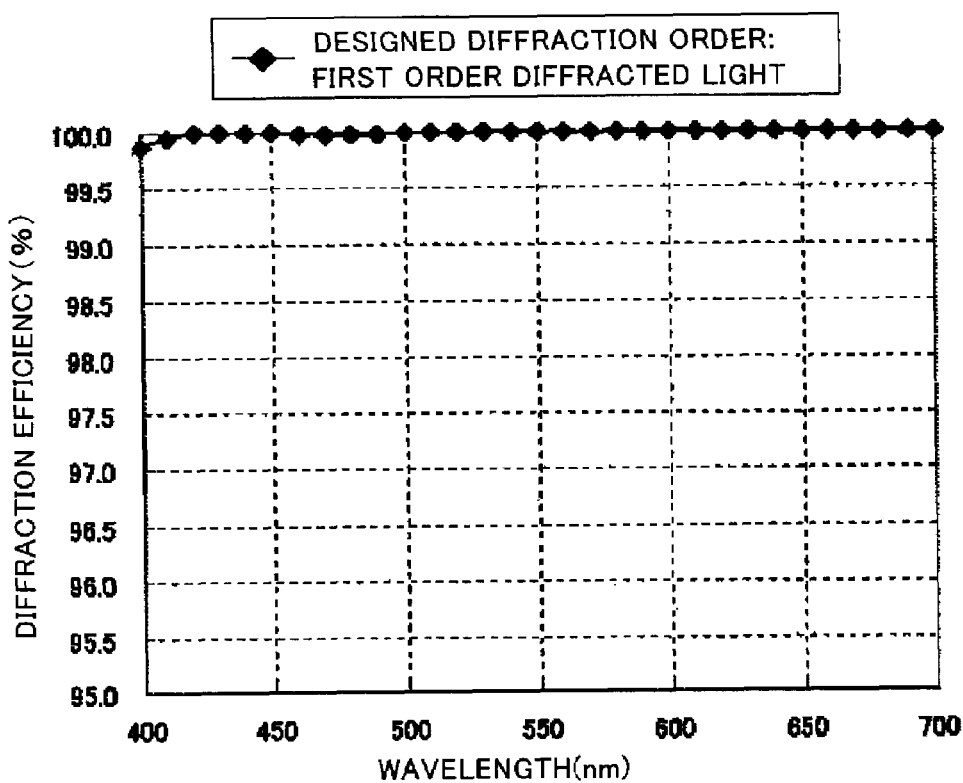
FIG. 6A is a graph showing the diffraction efficiency characteristic in the designed diffraction order of a diffractive optical element of Embodiment 3.
Figure 6B:
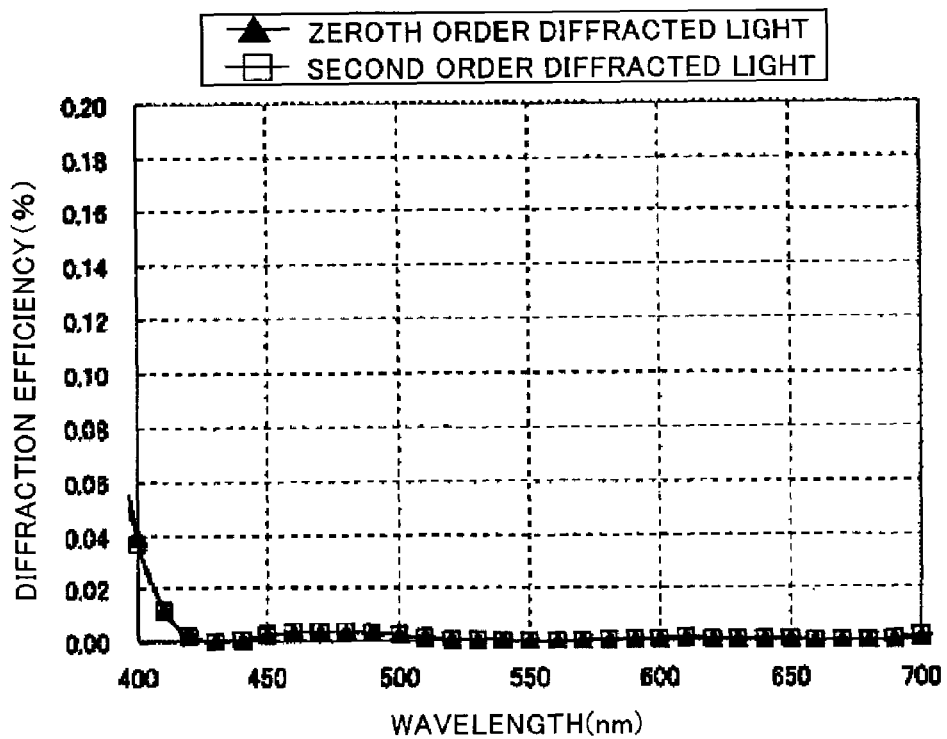
FIG. 6B is a graph showing the diffraction efficiency characteristics in the designed diffraction order±one diffraction orders of the diffractive optical element of Embodiment 3.

FIG. 6A shows the diffraction efficiency of the first order diffracted light in the diffractive optical element 10 of this embodiment. The designed diffraction order is the first order. FIG. 6B shows the diffraction efficiencies of the diffracted lights of the designed diffraction order±one diffraction orders (zeroth order diffracted light and second order diffracted light). Similarly to the diffractive optical elements 10 of Embodiments 1 and 2, the diffractive optical element 10 of this embodiment shows an improved diffraction efficiency of the first order diffracted light as the designed order diffracted light, and can reduce the diffraction efficiencies of the zeroth order diffracted light and the second order diffracted light as the unnecessary diffracted light, so that less flare light is produced.

More specifically, the diffraction efficiency of the first order diffracted light is 99.8% or higher over the entire visible wavelength range, and the diffraction efficiency of the unnecessary order diffracted light (zeroth order diffracted light and second order diffracted light) is sufficiently suppressed to be 0.04% or lower.

Embodiment 4

The following describes Embodiment 4 of the present invention. A diffractive optical element of this embodiment has basically the same configuration as that of Embodiment 1. That is, the element has the structure shown in FIGS. 1 and 2. Therefore, the same reference numerals will be assigned to the components common to those of Embodiment 1, their detailed explanations will be omitted and only differences will be focused on the following description.

In the diffractive optical element 10 of this embodiment, a first diffraction grating 18 shown in FIG. 2 is made of a mixed material (nd=1.556, vd=55.4) of acrylic resin and $Al_2O_3$ particles. A second diffraction grating 19 is made of a mixed material (nd=1.469, vd=12.1) of an optical material and ITO particles. The grating thickness d common to the first and second diffraction gratings 18 and 19 is 6.0 μm.

Figure 7A:
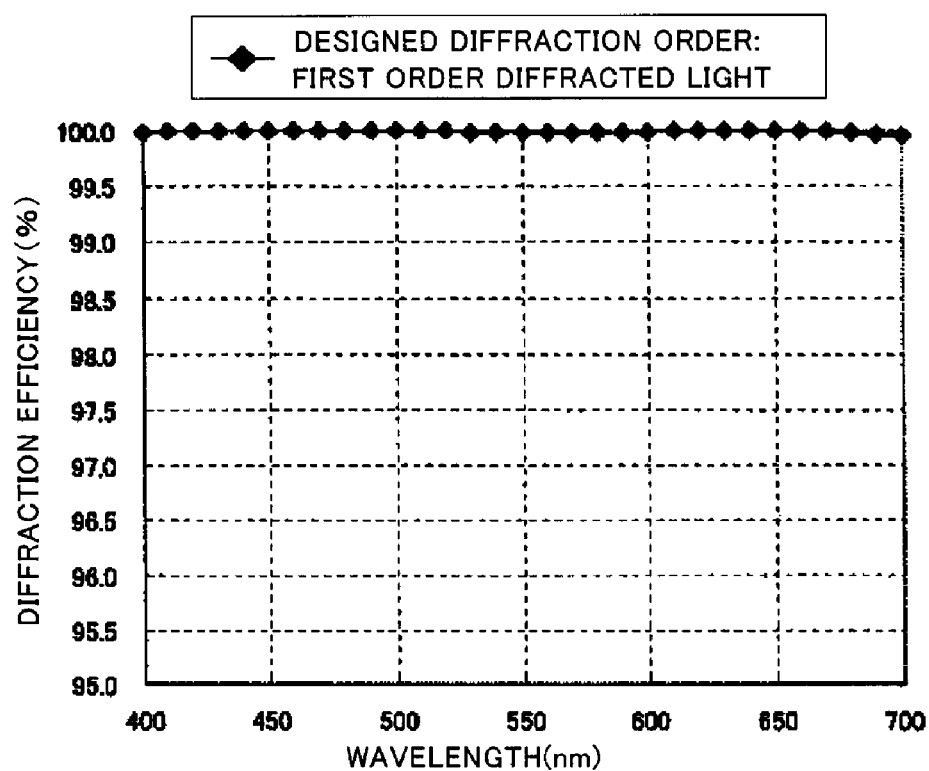
FIG. 7A is a graph showing the diffraction efficiency characteristic in the designed diffraction order of a diffractive optical element of Embodiment 4.
Figure 7B:
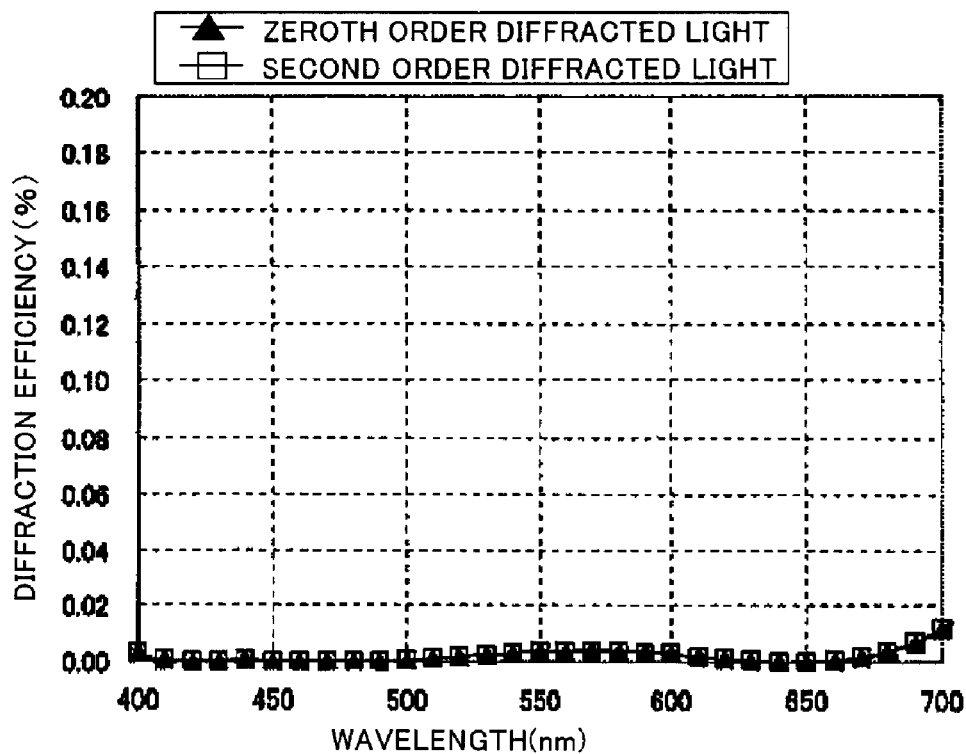
FIG. 7B is a graph showing the diffraction efficiency characteristics in the designed diffraction order±one diffraction orders of the diffractive optical element of Embodiment 4.

FIG. 7A shows the diffraction efficiency of the first order diffracted light in the diffractive optical element 10 of this embodiment. The designed diffraction order is the first order. FIG. 7B shows the diffraction efficiencies of the diffracted lights of the designed diffraction order±one diffraction orders (zeroth order diffracted light and second order diffracted light). Similarly to the diffractive optical elements 10 of Embodiments 1 to 3, the diffractive optical element 10 of this embodiment shows an improved diffraction efficiency of the first order diffracted light as the designed order diffracted light, and can reduce the diffraction efficiencies of the zeroth order diffracted light and the second order diffracted light as the unnecessary diffracted light, so that less flare light is produced.

More specifically, the diffraction efficiency of the first order diffracted light is 99.9% or higher over the entire visible wavelength range, and the diffraction efficiency of the unnecessary order diffracted light (zeroth order diffracted light and second order diffracted light) is sufficiently suppressed to be 0.02% or lower.

Embodiment 5

The following describes Embodiment 5 of the present invention. A diffractive optical element of this embodiment has basically the same configuration as that of Embodiment 1. That is, the element has the structure shown in FIGS. 1 and 2. Therefore, the same reference numerals will be assigned to the components common to those of Embodiment 1, their detailed explanations will be omitted and only differences will be focused on the following description.

In a diffractive optical element 10 of this embodiment, a first diffraction grating 18 shown in FIG. 2 is made of an acrylic resin material (nd=1.552, vd=51.3). Note that unlike Embodiments 1 to 4, the material of the first diffraction grating of this embodiment is just acrylic resin without particulate materials mixed therein. On the other hand, a second diffraction grating 19 is made of a mixed material (nd=1.480, vd=21.3) of fluorine resin and ITO particles. The grating thickness d common to the first and second diffraction gratings 18 and 19 is 13.9 μm.

Figure 8A:
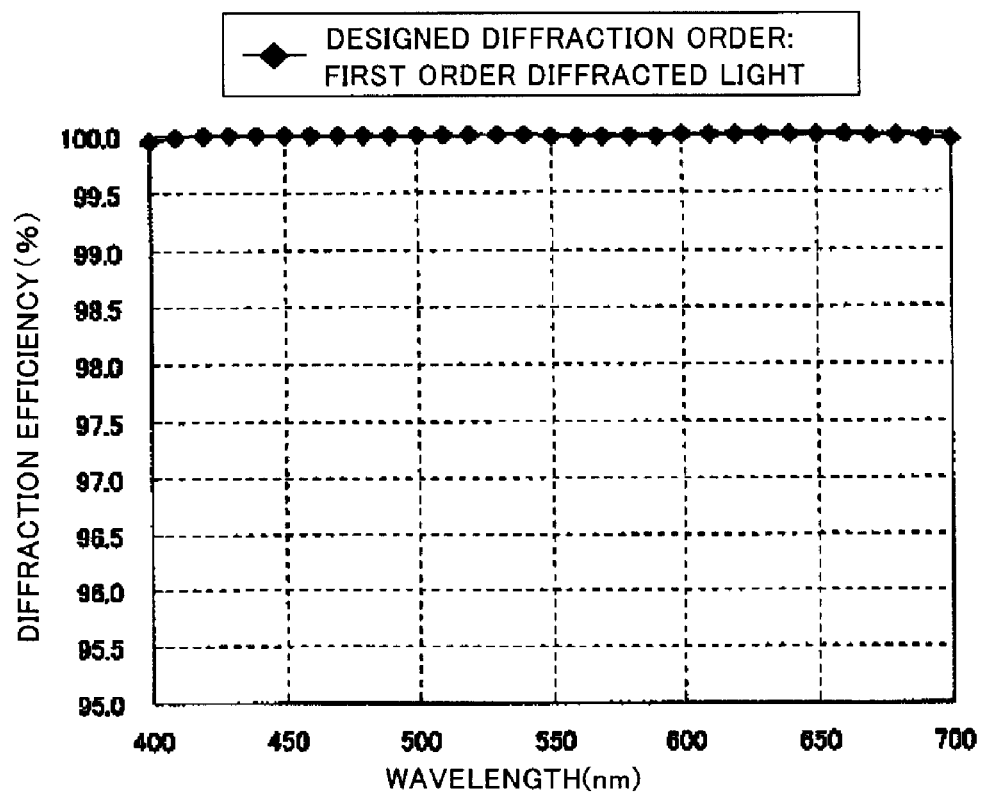
FIG. 8A is a graph showing the diffraction efficiency characteristic in the designed diffraction order of a diffractive optical element of Embodiment 5.
Figure 8B:
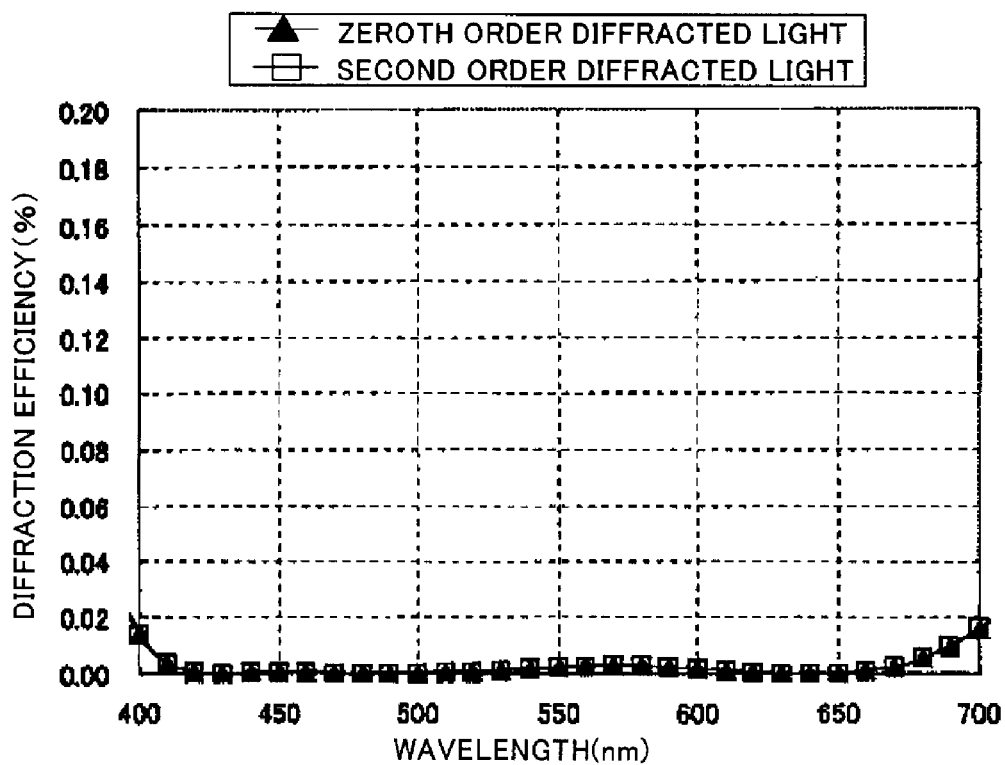
FIG. 8B is a graph showing the diffraction efficiency characteristics in the designed diffraction order±one diffraction orders of the diffractive optical element of Embodiment 5.

FIG. 8A shows the diffraction efficiency of the first order diffracted light in the diffractive optical element 10 of this embodiment. The designed diffraction order is the first order. FIG. 8B shows the diffraction efficiencies of the diffracted lights of the designed diffraction order±one diffraction orders (zeroth order diffracted light and second order diffracted light). Similarly to the diffractive optical elements 10 of Embodiments 1 to 4, the diffractive optical element 10 of this embodiment shows an improved diffraction efficiency of the first order diffracted light as the designed order diffracted light, and can reduce the diffraction efficiencies of the zeroth order diffracted light and the second order diffracted light as the unnecessary diffracted light, so that less flare light is produced.

More specifically, the diffraction efficiency of the first order diffracted light is 99.9% or higher over the entire visible wavelength range, and the diffraction efficiency of the unnecessary order diffracted light (zeroth order diffracted light and second order diffracted light) is sufficiently suppressed to be 0.02% or lower.

The following describes the conditions to be satisfied in the first and second diffraction gratings 18 and 19 of the above embodiments.

In the diffractive optical elements 10 of Embodiments 1 to 5, the first material and the second material (hereinafter called material 1 and material 2, respectively) making up the first and second diffraction gratings satisfy the following conditions. Material 2 is a mixed material of a resin material and a particulate material satisfying the following conditions.

In the following expressions, $ng1$, $nF1$, $nd1$ and $nC1$ are refractive indexes of material 1 for g-line, F-line, d-line and C-line, respectively, and $ng2$, $nF2$, $nd2$ and $nC2$ are refractive indexes of material 2 for g-line, F-line, d-line and C-line, respectively. $nFb2$, $ndb2$, and $nCb2$ are refractive indexes of the particulate material for F-line, d-line and C-line, respectively. $vd1$, $vd2$ and $vdb2$ are Abbe numbers for d-line of material 1, material 2 and the particulate material, respectively. "E-b" means "$\times 10^{-b}$".

Further, they have the following relationships:

$$vd1 = (nd1-1)/(nF1-nC1)$$

$$vd2 = (nd2-1)/(nF2-nC2)$$

$$\theta g,F1 = (ng1-nF1)/(nF1-nC1)$$

$$\theta g,d1 = (ng1-nd1)/(nF1-nC1)$$

$$\theta g,F2 = (ng2-nF2)/(nF2-nC2)$$

$$\theta g,d2 = (ng2-nd2)/(nF2-nC2)$$

$$\mu db2 = (ndb2-1)/(nFb2-nCb2).$$

Then, the following conditions are to be satisfied:

Material 1:

$$nd1 \geq 1.48 \tag{1}$$

$$vd1 \geq 40 \tag{2}$$

$$(-1.665E{-}07 \times vd1^3 + 5.213E{-}05 \times vd1^2 - 5.656E{-}03 \times vd1 + 0.675) \leq \theta g,F1 < (-1.665E{-}07 \times vd1^3 + 5.213E{-}05 \times vd1^2 - 5.656E{-}03 \times vd1 + 0.825) \tag{3}$$

$$(-1.687E{-}07 \times vd1^3 + 5.702E{-}05 \times vd1^2 - 6.603E{-}03 \times vd1 + 1.400) \leq \theta g,d1 \leq (-1.687E{-}07 \times vd1^3 + 5.702E{-}05 \times vd1^2 - 6.603E{-}03 \times vd1 + 1.580) \tag{4}$$

Material 2:

$$nd2 < 1.6 \tag{5}$$

$$vd2 < 30 \tag{6}$$

$$\theta g,F2 < (-1.665E{-}07 \times vd2^3 + 5.213E{-}05 \times vd2^2 - 5.656E03 \times vd2 + 0.675) \tag{7}$$

$$\theta g,d2 < (-1.687E{-}07 \times vd2^3 + 5.702E{-}05 \times vd2^2 - 6.603E{-}03 \times vd2 + 1.400) \tag{8}$$

Material 1 and material 2:

$$nd1 - nd2 > 0 \tag{9}$$

Particulate Material:

$$ndb2 > 1.70 \tag{10}$$

$$vdb2 < 20 \tag{11}.$$

Figure 10:
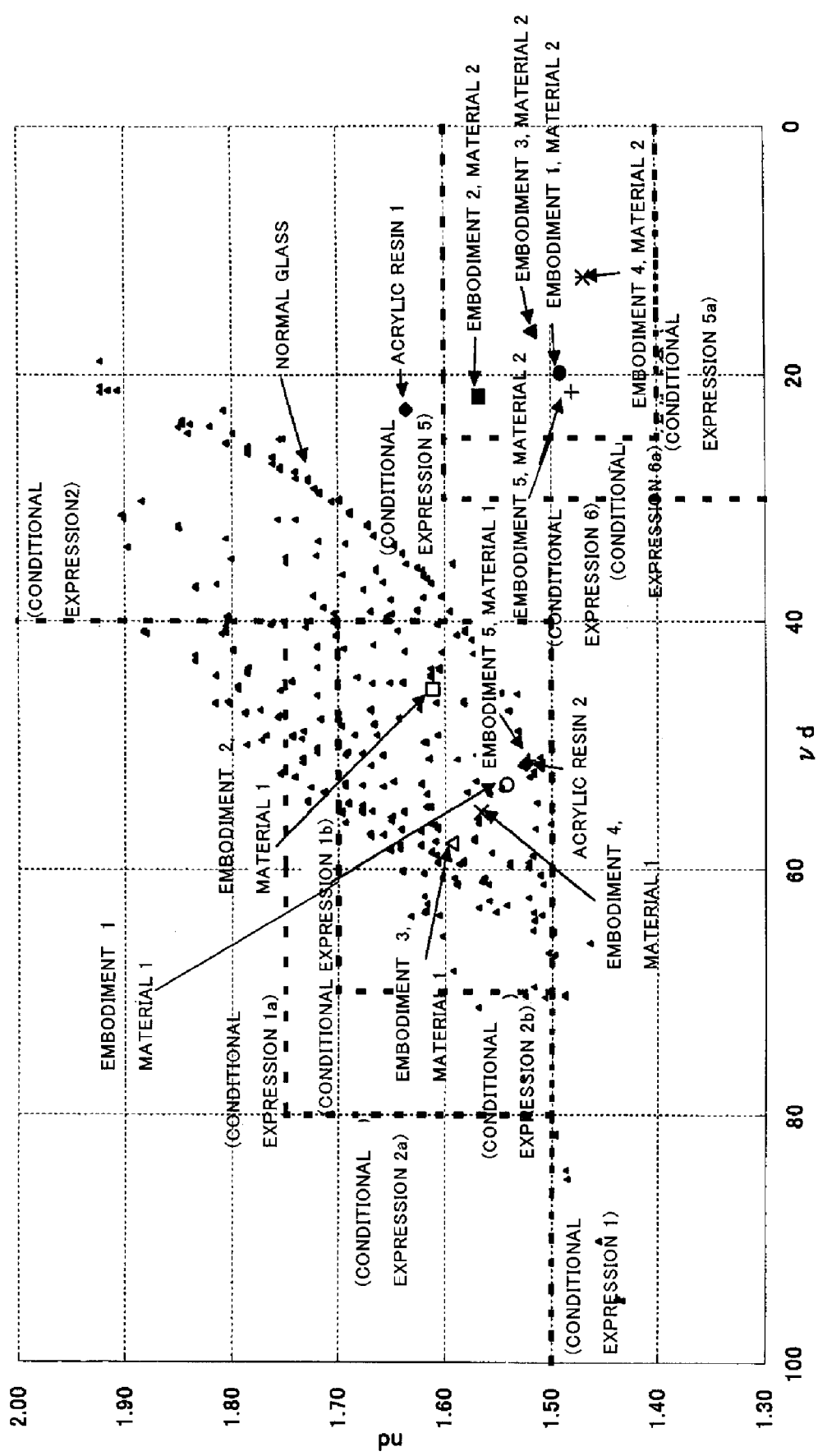
FIG. 10 is a graph showing the refractive index characteristics (nd-vd characteristics) of materials making up the diffractive optical element of Embodiments 1 to 5.
Figure 11:
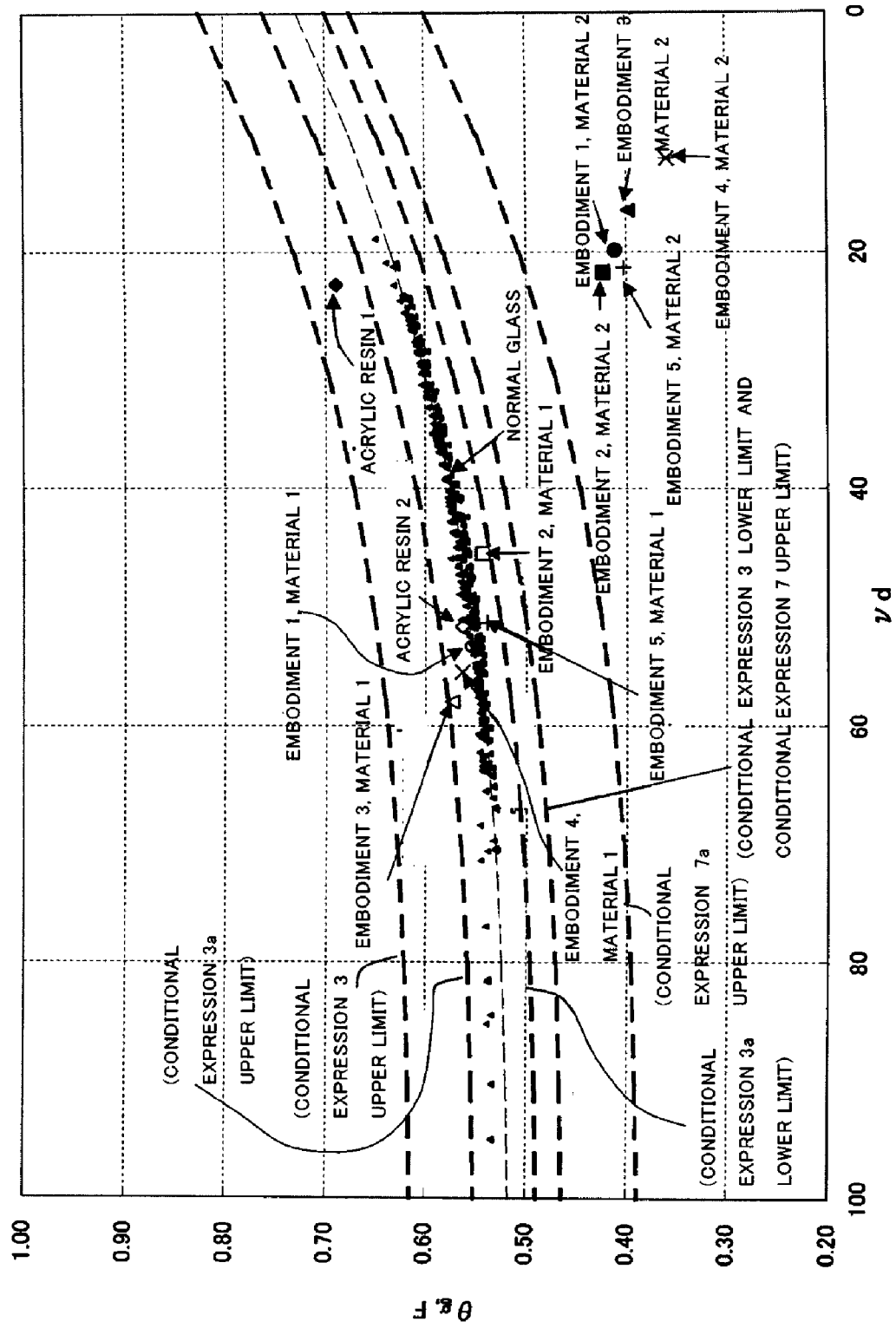
FIG. 11 is a graph showing the refractive index characteristics (θg,F-vd characteristics) of materials making up the diffractive optical element of Embodiments 1 to 5.
Figure 12:
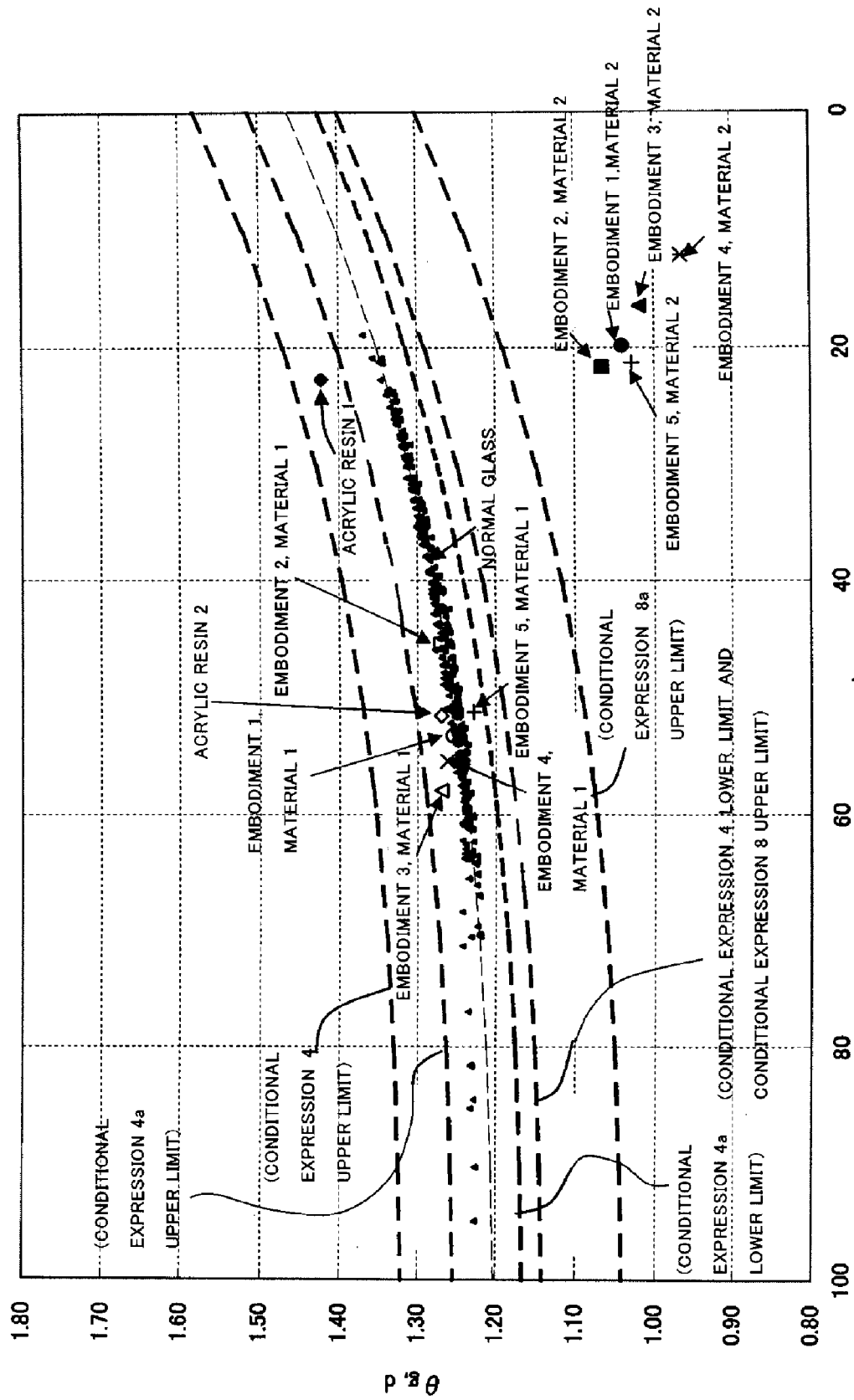
FIG. 12 is a graph showing the refractive index characteristics (θg,d-vd characteristics) of materials making up the diffractive optical element of Embodiments 1 to 5.

Conditional expressions (1) to (4) define the properties of material 1. That is, material 1 has to satisfy all of the conditional expressions (1) to (4). Now, FIGS. 10 to 12 will be referred to for easy understanding of the relationships among the respective conditions. FIG. 10 shows the relationship between nd and vd, FIG. 11 shows the relationship between $\theta g,F$ and vd, and FIG. 12 shows the relationship between $\theta g,d$ and vd. In these drawings, the horizontal axes represent nd, $\theta g,F$, and $\theta g,d$, respectively, and the vertical axis represents vd. Note that in FIGS. 10 to 12 the numbers of the conditional expressions are indicated by numbers surrounded with circles.

As shown in FIG. 10, the conditional expressions (1) and (2) define the range of nd1 and vd1 of material 1 in order to realize the diffractive optical elements of the embodiments. If the values of nd1 and vd1 are lower than the lower limits of the conditional expressions (1) and (2), material 2 realizing the (contacting two-layer) diffractive optical elements of the embodiments, i.e., material 2 satisfying the conditional expressions (5) to (8) will not exist.

As shown in FIG. 11, the conditional expression (3) defines the range of $\theta g, F1$ and vd1 of material 1 in order to realize the diffractive optical elements of the embodiments. As described above, this conditional expression (3) should be satisfied based on the satisfaction of the conditional expressions (1) and (2). If the value of $\theta g, F1$ is lower than the lower limit of the conditional expression (3), the grating thicknesses of the diffractive optical elements of the embodiments will be increased, and therefore the diffraction efficiency for a light ray obliquely incident on the diffractive optical element (hereinafter called obliquely incident light) will be degraded. If the value of $\theta g, F1$ is higher than the upper limit of the conditional expression (3), material 2 obtaining a high diffraction efficiency with the structure (contacting two-layer structure) of the diffractive optical elements of the embodiments, i.e., material 2 satisfying the conditional expressions (5) to (8) will not exist.

As shown in FIG. 12, the conditional expression (4) defines the range of $\theta g, d1$ and vd1 of material 1 in order to realize the diffractive optical elements of the embodiments. In this case also, this conditional expression (4) should be satisfied based on the satisfaction of the conditional expressions (1) to (3). If the value of $\theta g, d1$ is lower than the lower limit of the conditional expression (4), the grating thicknesses of the diffractive optical elements of the embodiments will be increased, and therefore the diffraction efficiency for the obliquely incident light will be degraded. If the value of $\theta g, d1$ is higher than the upper limit of the conditional expression (4), material 2 for obtaining a high diffraction efficiency with the structure (contacting two-layer structure) of the diffractive optical elements of the embodiments, i.e., material 2 satisfying the conditional expressions (5) to (8) will not exist.

In order to realize a higher diffraction efficiency while making the gratings thinner, it is preferable that material 1 satisfies the following conditional expressions in view of the conditions for allowing material 2 to exist. Letter 'a' assigned to the numbers of the following conditional expressions indicates that such a conditional expression with 'a' is preferable to the original conditional expression. Letter 'b' indicates that such a conditional expression with 'b' is preferable to the corresponding conditional expression with 'a'. The same goes for the other conditional expressions described later:

$$1.48 \leq nd1 \leq 1.75 \tag{1a}$$

$$1.48 \leq nd1 \leq 1.70 \tag{1b}$$

$$40 \leq vd1 < 80 \tag{2a}$$

$$40 \leq vd1 < 70 \tag{2b}$$

$$(-1.665E-07 \times vd1^3 + 5.213E-05 \times vd1^2 - 5.656E-03 \times vd1 + 0.700) \leq \theta g, F1 < (-1.665E-07 \times vd1^3 + 5.213E-05 \times vd1^2 - 5.656E-03 \times vd1 + 0.662) \tag{3a}$$

$$(-1.687E-07 \times vd1^3 + 5.702E-05 \times vd1^2 - 6.603E-03 \times vd1 + 1.425) \leq \theta g, d1 \leq (-1.687E-07 \times vd1^3 + 5.702E-05 \times vd1^2 - 6.603E-03 \times v1 + 1.513) \tag{4a}$$

The conditional expressions (5) to (8) define the properties of material 2. With material 1 satisfying all of the conditional expressions (1) to (4), material 2 has to satisfy the conditional expressions (5) to (8). FIGS. 10 to 12 will be referred to again for easy understanding of the relationships among the respective conditions.

As shown in FIG. 10, the conditional expressions (5) and (6) define the range of nd2 and vd2 of material 2 in order to realize the diffractive optical elements of the embodiments. If the values of nd2 and vd2 are higher than the upper limits of the conditional expressions (5) and (6), material 1 realizing the diffractive optical elements of the embodiments (contacting two-layer), i.e., material 1 satisfying the conditional expressions (1) to (4) will not exist.

As shown in FIG. 11, the conditional expression (7) defines the range of $\theta g, F2$ and vd2 of material 2 in order to realize the diffractive optical elements of the embodiments. As described above, this conditional expression (7) should be satisfied based on the satisfaction of the conditional expressions (5) and (6). If the value of $\theta g, F2$ is higher than the upper limit of the conditional expression (7), material 1 for obtaining a high diffraction efficiency with the structure (contacting two-layer structure) of the diffractive optical elements of the embodiments, i.e., material 1 satisfying the conditional expressions (1) to (4) will not exist.

As shown in FIG. 12, the conditional expression (8) defines the range of $\theta g, d2$ and vd2 of material 2 in order to realize the diffractive optical elements of the embodiments. In this case also, this conditional expression (8) should be satisfied based on the satisfaction of the conditional expressions (5) and (6). If the value of $\theta g, d2$ is higher than the upper limit of the conditional expression (8), material 1 for obtaining a high diffraction efficiency with the structure (contacting two-layer structure) of the diffractive optical elements of the embodiments, i.e., material 1 satisfying the conditional expressions (1) to (4) will not exist.

In order to realize a higher diffraction efficiency while making the gratings thinner, it is preferable that material 2 satisfies the following conditional expressions in view of the conditions for allowing material 1 to exist:

$$1.4 \leq nd2 < 1.6 \tag{5a}$$

$$vd2 \leq 25 \tag{6a}$$

$$\theta g, F2 \leq (-1.665E-07 \times vd2^3 + 5.213E-05 \times vd2^2 - 5.656E-03 \times vd2 + 0.600) \tag{7a}$$

$$\theta g, d2 \leq (-1.687E-07 \times vd2^3 + 5.702E-05 \times vd2^2 - 6.603E-03 \times vd2 + 1.300) \tag{8a}$$

The conditional expression (9) represents the magnitude relationship between the refractive indexes of material 1 and material 2 in the diffractive optical elements of the embodiments. A desired diffraction efficiency cannot be obtained unless this conditional expression is satisfied.

The conditional expressions (10) and (11) define a range of material properties of the particulate material for allowing material 2 to satisfy the above conditional expressions (5) to (8) in the diffractive optical elements of the above embodiments. The particulate material satisfying the conditional expressions (10) and (11) includes an inorganic particulate material that is any one of ITO, Ti, Nr, Cr, an oxide thereof, a composite thereof and a mixture thereof. In the embodiments, ITO (ndb2=1.77, vdb2=6.8) is used as one example. If the value of ndb2 is lower than the lower limit of the conditional expression (10) or if the value of vdb2 is higher than the upper limit of the conditional expression (11), material 2 cannot satisfy the conditional expressions (5) to (8).

Herein, the particulate material used is not limited to those in the above-described embodiments, insofar as it satisfies the conditional expressions (10) and (11).

Furthermore, the particulate material preferably satisfies the following conditions:

$$ndb2 \geq 1.75 \tag{10a}$$

$$vdb2 \leq 18 \tag{11a}$$

The diffractive optical element 10 of the above embodiments preferably satisfies the following conditions in addition to the above conditional expressions (1) to (11). $\lambda F$, $\lambda d$ and $\lambda C$ are wavelengths of F-line, d-line and C-line, respectively.

$m(\lambda F)$ is a value obtained by dividing the difference in optical path length between the convex portion (peak) and the concave portion (valley) of each diffraction grating for the m-th order (designed order) diffracted light at the wavelength of F-line by that wavelength. $m(\lambda d)$ is a value obtained by dividing the difference in optical path length between the convex portion and the concave portion of each diffraction grating for the m-th order diffracted light at the wavelength of d-line by that wavelength. Further, $m(\lambda C)$ is a value obtained by dividing the difference in optical path length between the convex portion and the concave portion of each diffraction grating for the m-th order diffracted light at the wavelength of C-line by that wavelength.

d (μm) is a grating thickness:

$$m(\lambda F) = \{d \times (nF1 - nF2)\}/\lambda F \tag{12}$$

$$m(\lambda d) = \{d \times (nd1 - nd2)\}/\lambda d \tag{13}$$

$$m(\lambda C) = \{d \times (nC1 - nC2)\}/\lambda C \tag{14}$$

$$d \leq 20 \tag{15}$$

$$0.92 \leq \{m(\lambda F) + m(\lambda d) + m(\lambda C)\}/3 \leq 1.08 \tag{16}$$

These conditional expressions (12) to (16) define the diffraction efficiency of the contacting two-layer DOE formed with materials 1 and 2 according to the embodiments. If the value of d is higher than the upper limit of the conditional expression (15), the diffraction efficiency for the obliquely incident light may be degraded considerably. If the conditional expression (16) is not satisfied, desired diffraction efficiency may not be obtained.

In order to realize a still higher diffraction efficiency, it is preferable to satisfy the following conditional expressions. Letter 'c' assigned to the number of the following conditional expression indicates that such a conditional expression with 'c' is preferable to the conditional expression with 'b':

$$d \leq 15 \tag{15a}$$

$$0.93 \leq \{m(\lambda F) + m(\lambda d) + m(\lambda C)\}/3 \leq 1.07 \tag{16a}$$

$$0.94 \leq \{m(\lambda F) + m(\lambda d) + m(\lambda C)\}/3 \leq 1.06 \tag{16b}$$

$$0.96 \leq \{m(\lambda F) + m(\lambda d) + m(\lambda C)\}/3 \leq 1.04 \tag{16c}$$

In Embodiments 1 to 4, material 1 is preferably mixed with a particulate material satisfying all of the following conditions. Herein, nfb1, ndb1 and nCb1 are refractive indexes of the particulate material for F-line, d-line and C-line, respectively. Further, $vdb1 = (ndb1 - 1)/(nFb1 - nCb1)$:

$$ndb1 > 1.65 \tag{17}$$

$$vdb1 > 35 \tag{18}$$

The conditional expressions (17) and (18) define properties of the particulate material mixed in material 1. The particulate material satisfying the conditional expressions (17) and (18) includes an inorganic particulate material that is any one of Al, Zr, Y, an oxide thereof, a composite thereof and a mixture thereof. In the embodiments, $Al_2O_3$ (ndb1=1.71, vd=68.0) or $ZrO_2$ (ndb1=1.87, vd=39.4) is used as one example. If the values of ndb1 and vdb1 are lower than the lower limits of the conditional expressions (17) and (18), material 1 satisfying the conditional expressions (1) to (4) may not be realized.

Herein, the particulate material used is not limited to the above-described example, insofar as it satisfies the conditional expressions (17) and (18).

Instead of the material mixed with particles, a general ultraviolet curing resin may be used, for example. However, since the use of a material with a particulate material mixed (dispersed) therein as both of material 1 and material 2 can reduce the grating thickness as described in Embodiments 1 to 4, such a material is preferably used as a countermeasure for the degradation in diffraction efficiency for the obliquely incident light.

The particulate material preferably satisfies the following conditions:

$$ndb1 > 1.70 \tag{17a}$$

$$vdb1 > 38 \tag{18a}$$

The average particle diameter of the particulate material is preferably ¼ or less of the wavelength (using wavelength or designed wavelength) of light incident on the diffractive optical element. In the case of the particle diameter larger than this range, the scattering of the light may be large when such a particulate material is mixed in a resin material.

The resin material for mixing the above particulate material therein includes an ultraviolet curing resin that is any one of acrylic, fluorine, vinyl, epoxy organic resin. In the embodiments, acrylic resin or fluorine resin is used as one example.

As the final condition, when the grating pitch of the diffraction grating of FIG. 2 is P and the grating thickness is d, the diffractive optical element of the embodiments preferably satisfies the following condition:

$$d/P < 1/7 \tag{19}$$

The conditional expression (19) defines the shape (grating pitch and grating thickness) of the diffraction grating making up the diffractive optical element. If the value of d/P is higher than the upper limit of the conditional expression (19), the diffraction efficiency for the obliquely incident light may be degraded because the grating pitch becomes too minute. The satisfaction of the conditional expression (19) leads to the advantage of facilitating the machining of the grating shape in a die for forming (resin molding) the diffractive optical element.

Table 1 shows numerical values of the conditional expressions (1) to (19) of the diffractive optical elements described in Embodiments 1 to 5.

As described above, in the above embodiments, the partial dispersion ratio θg,F for g-line and F-line and the partial dispersion ratio θg,d for g-line and d-line of material 1 and material 2 are appropriately set, and such material 1 and material 2 are used to make up a contacting two-layer DOE. Thereby, a diffractive optical element capable of keeping a high diffraction efficiency for the diffracted light of a specific diffraction order (designed diffraction order) over the entire wavelength range (using wavelength range) of the incident light, while capable of sufficiently suppressing the unnecessary diffracted light causing flare light can be realized. Moreover, owing to the configuration as the contacting two-layer DOE, the element can be manufactured easily at a lower cost.

It should be noted here that the shape of the diffractive optical element of FIGS. 1 and 2, especially the shape of the grating portion is illustrative only, and other shapes can be employed as well.

Embodiment 6

The following describes a diffractive optical element that is an embodiment (Embodiment 6) of the present invention.

A diffractive optical element of this embodiment is configured so that a first diffraction grating made of a first material and a second diffraction grating made of a second material are laminated so as to be in contact with each other at their grating surfaces.

The first material and the second material (hereinafter they may be called material 1 and material 2, respectively) making up the grating portions of the first and second diffraction gratings satisfy conditional expressions described later. Particularly, material 2 is made of a mixed material of a resin material and a particulate material. The same goes for the following embodiments.

Figure 13:
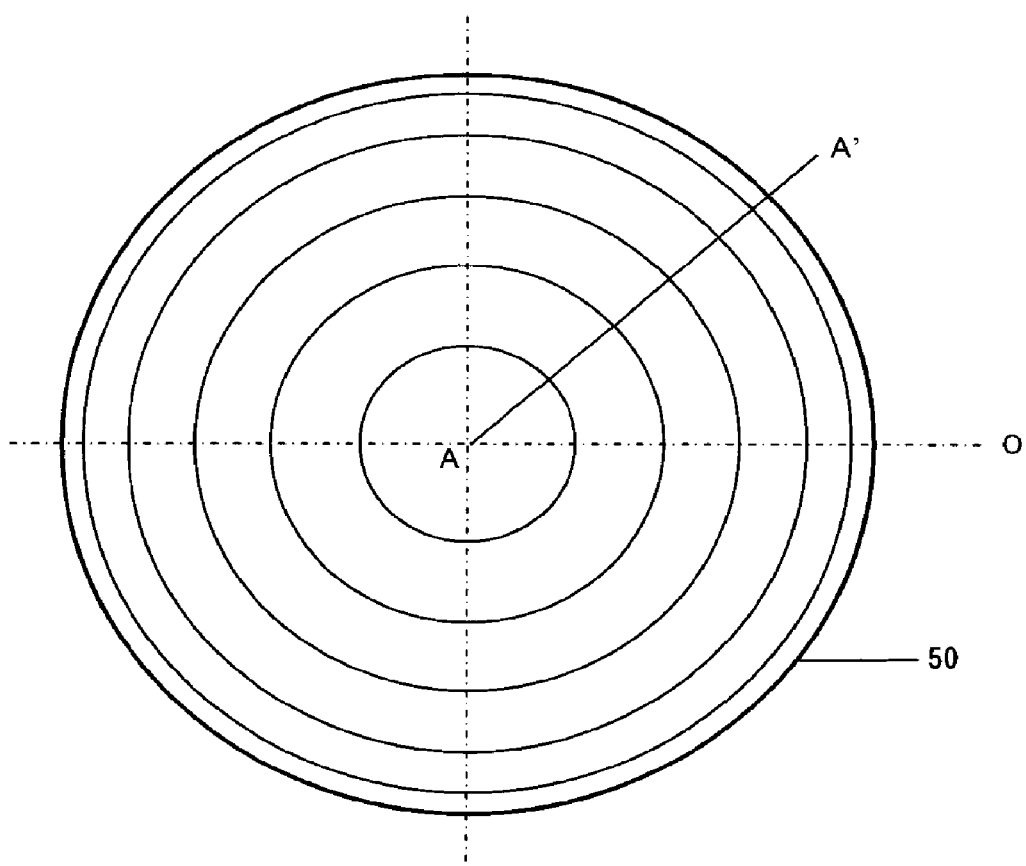
FIG. 13 is a front view of a diffractive optical element that is embodiments (Embodiments 6 to 9) of the present invention.
Figure 14:
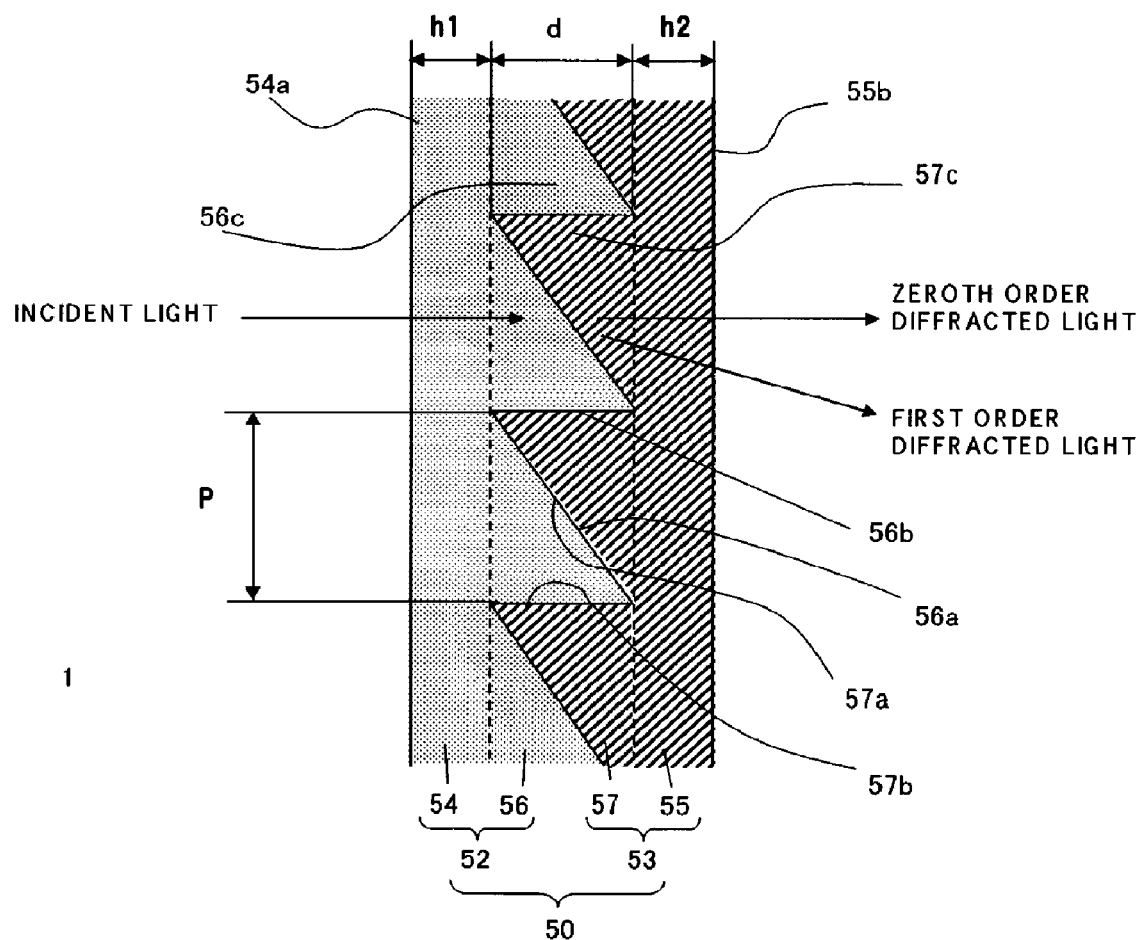
FIG. 14 is a partially cross-sectional view showing a diffractive optical element of Embodiments 6 to 9.

FIG. 13 is a front view showing a major part of the diffractive optical element of this embodiment. In FIG. 13, reference numeral 50 denotes the diffractive optical element, and the character O represents a center axis of the diffractive optical element. FIG. 14 is a partially enlarged view showing the diffractive optical element of FIG. 13 in cross section taken along the line A-A' in FIG. 13. It should be noted here that FIG. 14 is not drawn to scale in the grating depth direction of the diffraction grating.

As shown in FIG. 14, the diffractive optical element 50 includes a first element portion 52 and a second element portion 53. The first element portion 52 includes a first grating-forming layer made up of a first grating base portion 54 and a first diffraction grating 56 integrally formed with the first grating base portion 54. The second element portion 53 includes a second grating-forming layer made up of a second grating base portion 55 and a second diffraction grating 57 integrally formed with the second grating base portion 55.

Reference numerals 56c and 57c denote grating portions making up the first diffraction grating 56 and the second diffraction grating 57, respectively. The first and second diffraction gratings 56 and 57 have the grating portions with the same grating shape (periodic structure), which means that they have a plurality of grating portions 56c and 57c with a distribution of the same grating thickness d and the same grating pitch p. In other words, they have the grating portions with the same pattern. The grating portions 56c and 57c have a grating shape where a convex portion (hereinafter called a peak) and a concave portion (hereinafter called a valley) are provided alternately. The grating base portions 54 and 55 of the first and second element portions 52 and 53 have thicknesses of h1 and h2, respectively.

The first and second element portions 52 and 53 are configured so that grating surfaces 56a and 57a (corresponding to inclined surfaces of the grating portions 56c and 57c) of the grating portions 56c and 57c are in contact with grating wall portions 56b and 57b without a gap therebetween in the first and second diffraction gratings 56 and 57.

That is, the grating surfaces of the grating portions 56c and 57c are in close contact with each other without an air layer intervening therebetween. The first and second element portions 52 and 53 as a whole function as one diffractive optical element 50.

The first and second diffraction gratings 56 and 57 have the grating portions 56c and 57c in a concentric grating shape, which function as a lens because the grating pitch of the grating portions 56c and 57c varies in the radial direction.

A surface 54a on the light incident side of the first grating base portion 54 and a surface 55b on the light emergent side of the second grating base portion 55 are configured to be a flat surface or a curved surface.

Alternatively, another diffraction grating may be formed on at least one of these surfaces 54a and 55b.

In this embodiment, the wavelength range of light incident on the diffractive optical element 50, i.e., the using wavelength range is a visible wavelength range (e.g., 400 to 700 nm). Materials of the grating portions 56c and 57c making up the first and second diffraction gratings 56 and 57 and their grating thickness are selected so that the diffraction efficiency becomes the highest in the first order diffracted light as the designed diffraction order over the entire visible wavelength range.

The diffraction efficiency of the diffractive optical element of this embodiment and the following embodiments is considered in the same manner as described referring to expressions (20) to (24) in Embodiment 1.

The following describes features of the diffractive optical element of this embodiment and the following embodiments.

A first material making up the first diffraction grating 56 is a glass material.

The glass material referred to herein is a glass material for glass molding.

Herein, the glass material for glass molding refers to low-melting glass with a deformation point of 600° C. or lower.

The second material making up the second diffraction grating 57 is a mixed material of a resin material and a particulate material.

The second material includes a resin material containing inorganic particles that are any one of ITO, Ti, Nr and Cr or any one of an oxide, a composite, and a mixture of at least one of ITO, Ti, Nr and Cr.

The resin material as the second material for mixing inorganic particles therein includes an ultraviolet curing resin that is any one of acrylic, fluorine, vinyl, epoxy organic resin.

The average particle diameter of the particulate material is preferably ¼ or less of the wavelength (using wavelength or designed wavelength) of light incident on the diffractive optical element.

A refractive index for d-line, an Abbe number for d-line, a partial dispersion ratio for g-line and F-line and a partial dispersion ratio for g-line and d-line of the first material are nd1, νd1, θg,F1 and θg,d1, respectively.

A refractive index for d-line, an Abbe number for d-line, a partial dispersion ratio for g-line and F-line and a partial dispersion ratio for g-line and d-line of the second material are nd2, νd2, θg,F2 and θg,d2, respectively.

A refractive index for d-line and an Abbe number of the particulate material are ndb2 and νdb2, respectively. Then, the materials 1 and 2 and the particulate material satisfy the following conditions:

$$nd1 \geq 1.48 \tag{31}$$

$$\nu d1 \geq 40 \tag{32}$$

$$(-1.665E{-}07{\times}\nu d1^3 + 5.213E{-}05{\times}\nu d1^2 - 5.656E{-}03{\times}\nu d1 + 0.700) \leq \theta g,F1 < (-1.665E{-}07{\times}\nu d1^3 + 5.213E{-}05{\times}\nu d1^2 - 5.656E03{\times}\nu d1 + 0.662) \tag{33}$$

$$(-1.687E{-}07{\times}\nu d1^3 + 5.702E{-}05{\times}\nu d1^2 - 6.603E{-}03{\times}\nu d1 + 1.425) \leq \theta g,d1 < (-1.687E{-}07{\times}\nu d1^3 + 5.702E{-}05{\times}\nu d1^2 - 6.603E{-}03{\times}\nu d1 + 1.513) \tag{34}$$

$$nd2 \leq 1.6 \tag{35}$$

$$vd2 \leq 30 \tag{36}$$

$$\theta g, F2 \leq (-1.665E-07 \times vd2^3 + 5.213E-05 \times vd2^2 - 5.656E-03 \times vd2 + 0.675) \tag{37}$$

$$\theta g, d2 \leq (-1.687E-07 \times vd2^3 + 5.702E-05 \times vd2^2 - 6.603E-03 \times vd2 + 1.400) \tag{38}$$

$$nd1 - nd2 > 0 \tag{39}$$

$$ndb2 \geq 1.70 \tag{40}$$

$$vdb2 \leq 20 \tag{41}$$

Refractive indexes of the first material for g-line, F-line, d-line and C-line are ng1, nF1, nd1 and nC1, respectively.

Refractive indexes of the second material for g-line, F-line, d-line and C-line are ng2, nF2, nd2 and nC2, respectively.

Refractive indexes of the particulate material included in the second material for F-line, d-line and C-line are nFb2, ndb2 and nCb2, respectively.

At this time, the Abbe number vd1 and the partial dispersion ratios $\theta g, F1$ and $\theta g, d1$ of the first material, the Abbe number vd2 and the partial dispersion ratios $\theta g, F2$ and $\theta g, d2$ of the second material, and the Abbe number vdb2 of the particulate material are as follows:

$$vd1 = (nd1-1)/(nF1-nC1)$$

$$vd2 = (nd2-1)/(nF2-nC2)$$

$$\theta g, F1 = (ng1-nF1)/(nF1-nC1)$$

$$\theta g, d1 = (ng1-nd1)/(nF1-nC1)$$

$$\theta g, F2 = (ng2-nF2)/(nF2-nC2)$$

$$\theta g, d2 = (ng2-nd2)/(nF2-nC2)$$

$$vdb2 = (ndb2-1)/(nFb2-nCb2).$$

The following describes the conditional expressions (31) to (41).

The conditional expressions (31) to (34) define the properties of material 1 (first material). Material 1 preferably satisfies all of the conditional expression (31) to (34) at the same time.

Figure 22:
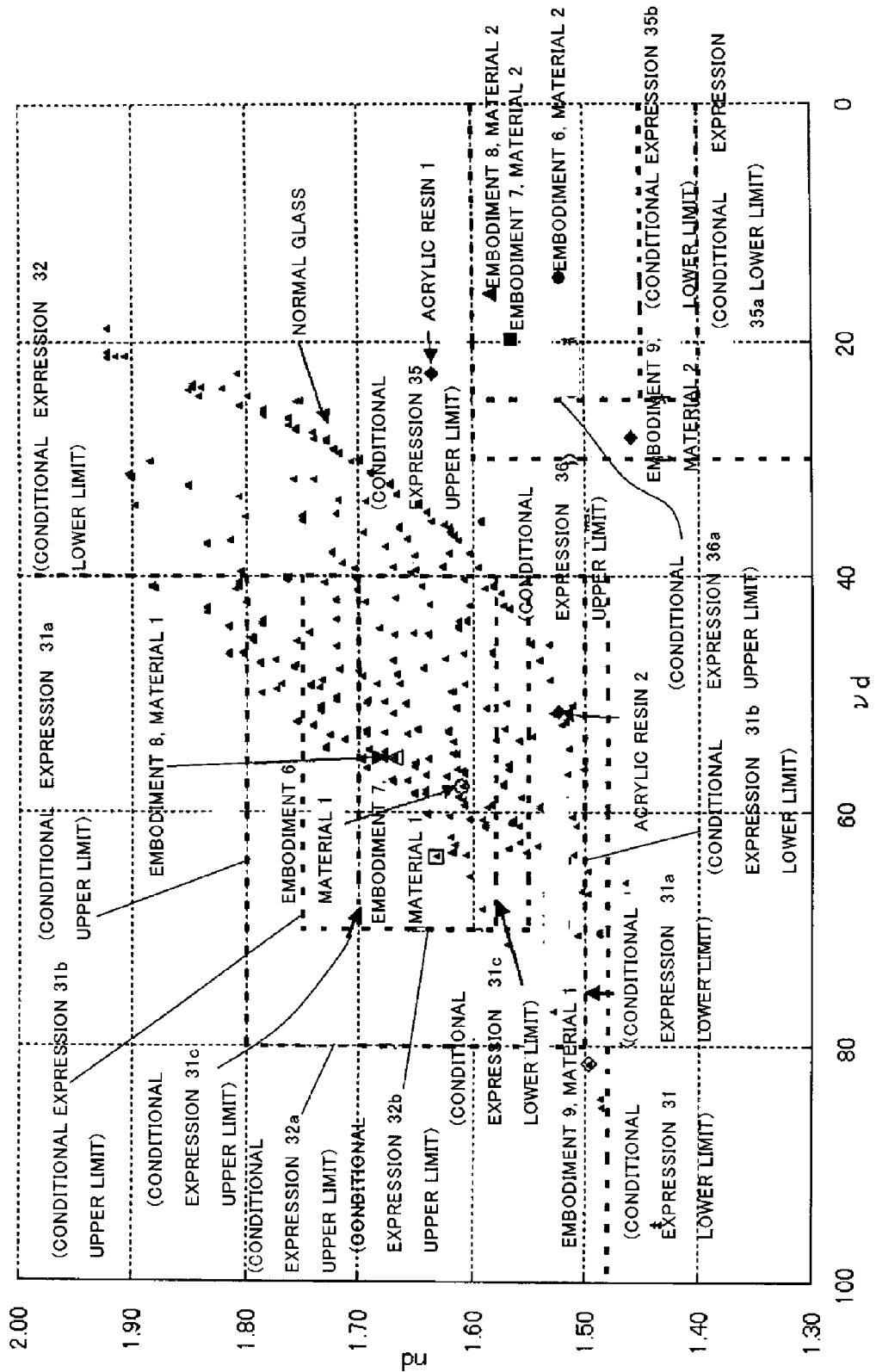
FIG. 22 is a graph showing the refractive index characteristics (nd-vd characteristics) of materials making up the diffractive optical element of Embodiments 6 to 9.

Now, FIGS. 22 to 24 will be referred below to for easy understanding of the relationships among the respective conditions. FIG. 22 shows the relationship between refractive index nd and Abbe number vd.

Figure 23:
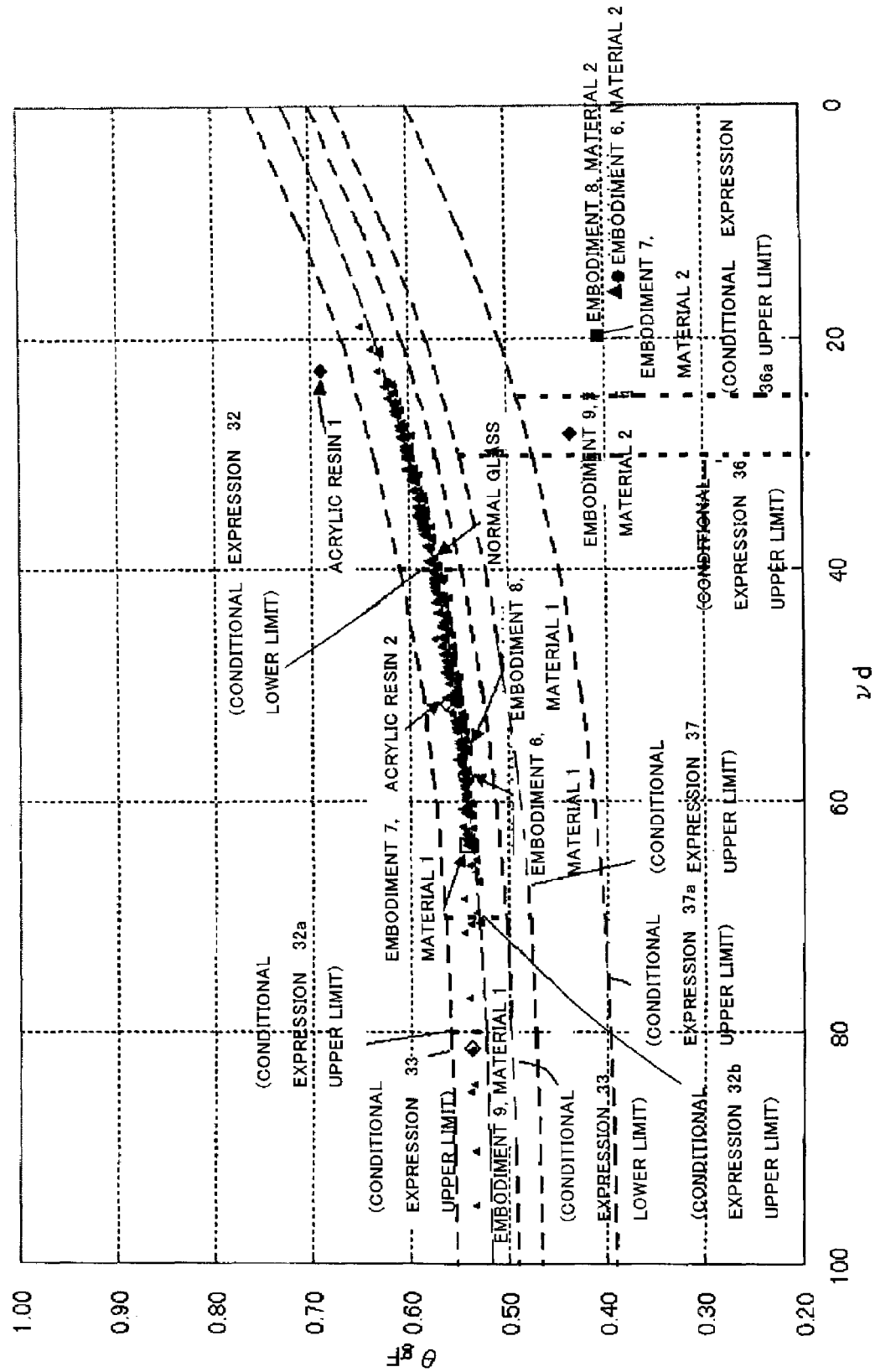
FIG. 23 is a graph showing the refractive index characteristics (θg,F-vd characteristics) of materials making up the diffractive optical element of Embodiments 6 to 9.
Figure 24:
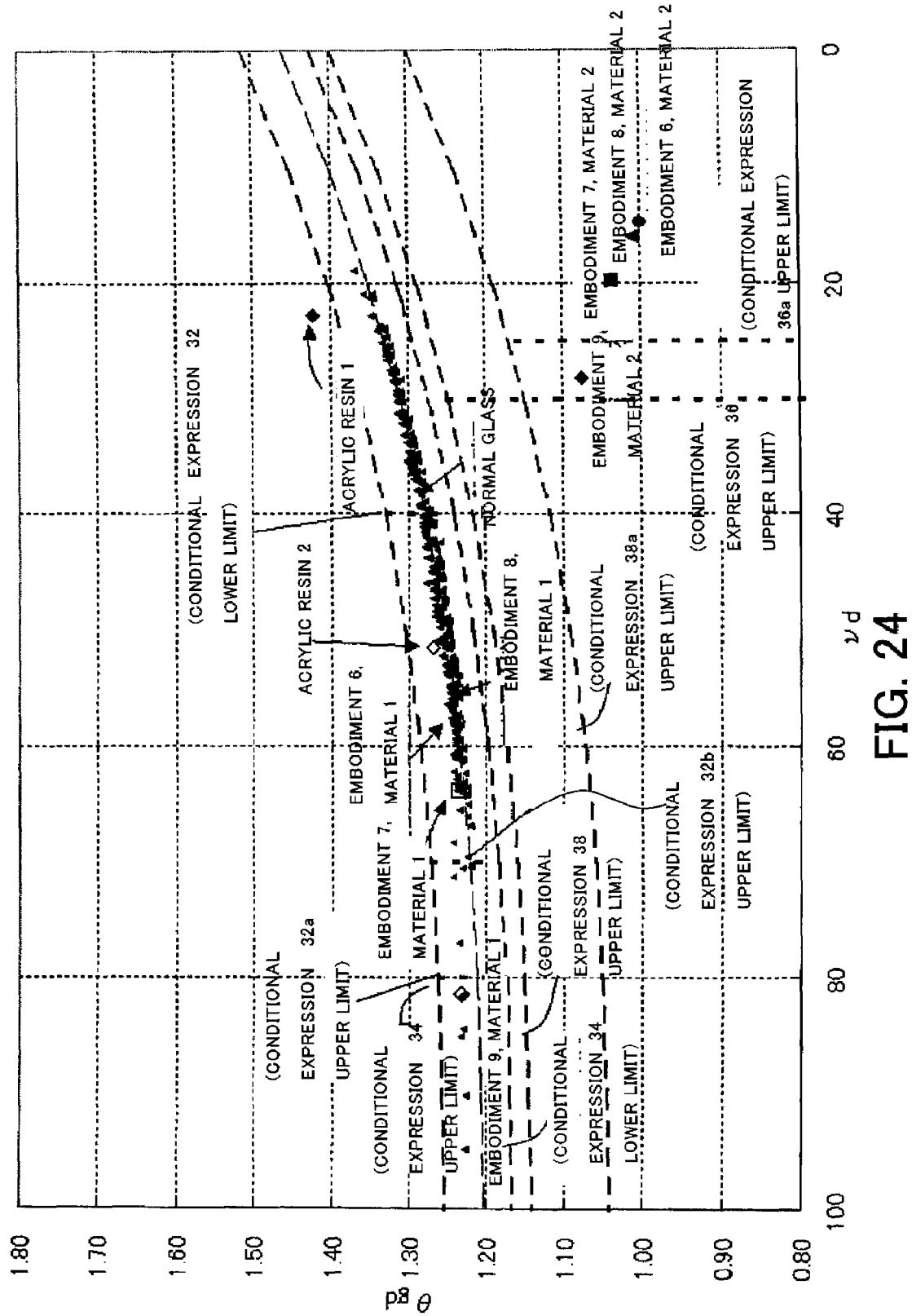
FIG. 24 is a graph showing the refractive index characteristics (θg,d-vd characteristics) of materials making up the diffractive optical element of Embodiments 6 to 9.

FIG. 23 shows the relationship between the partial dispersion ratio $\theta g, F$ and the Abbe number vd, and FIG. 24 shows the relationship between the partial dispersion ratio $\theta g, d$ and the Abbe number vd.

In these drawings, the horizontal axes represent the refractive index nd, the partial dispersion ratios $\theta g, F$, and the $\theta g, d$, respectively, and the vertical axis represents the Abbe number vd.

Note that in FIGS. 22 to 24 the numbers of the conditional expressions are indicated by numbers surrounded with circles.

As shown in FIG. 22, the conditional expressions (31) and (32) define the range of the refractive index nd and the Abbe number vd of material 1 making up the diffractive optical element.

If the values of nd1 and vd1 are lower than the lower limits of the conditional expressions (31) and (32), it is difficult to obtain material 2 (second material) allowing the structure (contacting two-layer structure) of the diffractive optical element, i.e., material 2 satisfying the conditional expressions (35) to (38).

As shown in FIG. 23, the conditional expression (33) defines the range of the partial dispersion ratio $\theta g, F$ and the Abbe number vd of material 1 making up the diffractive optical element. As described above, this conditional expression is preferably satisfied based on the satisfaction of the conditional expressions (31) and (32).

If the value of $\theta g, F1$ is lower than the lower limit of the conditional expression (33), the grating thickness of the diffraction grating of the diffractive optical element will be increased, and therefore the diffraction efficiency for a light ray obliquely incident on the diffractive optical element (hereinafter called obliquely incident light) will be degraded.

If the value of $\theta g, F1$ is higher than the upper limit of the conditional expression (33), it is difficult to obtain material 2 for obtaining a high diffraction efficiency in the contacting two-layer diffractive optical element, i.e., material 2 satisfying the conditional expressions (35) to (38).

As shown in FIG. 24, the conditional expression (34) defines the range of the partial dispersion ratio $\theta g, d$ and the Abbe number vd of material 1 making up the diffractive optical element.

This conditional expression also is preferably satisfied based on the satisfaction of the conditional expressions (31) to (33). If the value of $\theta g, d1$ is lower than the lower limit of the conditional expression (34), the grating thickness of the grating portion of the diffractive optical element will be increased, and therefore the diffraction efficiency for the obliquely incident light will be degraded. If the value of $\theta g, d1$ is higher than the upper limit of the conditional expression (34), it is difficult to obtain material 2 for obtaining a high diffraction efficiency in the contacting two-layer diffractive optical element, i.e., material 2 satisfying the conditional expressions (35) to (38).

In order to realize a higher diffraction efficiency while making the gratings thinner, it is preferable that material 1 satisfies the following conditional expressions in view of the conditions for allowing material 2 to exist.

Letter 'a' assigned to the numbers of the following conditional expressions (31) and (32) indicates that such a conditional expression with 'a' is preferable to the original conditional expression.

Letter 'b' indicates that such a conditional expression with 'b' is preferable to the corresponding conditional expression with 'a'. Letter 'c' indicates that such a conditional expression with 'c' is preferable to the corresponding conditional expression with 'b'. The same goes for the other conditional expressions described later.

$$1.50 \leq nd1 \leq 1.80 \tag{31a}$$

$$1.55 \leq nd1 \leq 1.75 \tag{31b}$$

$$1.58 \leq nd1 \leq 1.70 \tag{31c}$$

$$40 \leq vd1 \leq 80 \tag{32a}$$

$$40 \leq vd1 \leq 70 \tag{32b}$$

The conditional expressions (35) to (38) define the properties of material 2. Material 2 preferably satisfies all of the conditional expressions (35) to (38) with material 1 satisfying all of the conditional expressions (31) to (34). Now, FIGS. 22 to 24 will be referred to again for easy understanding of the relationships among the respective conditions.

As shown in FIG. 22, the conditional expressions (35) and (36) define the range of the refractive index nd2 and the Abbe number νd2 of material 2 making up the diffractive optical element.

If the values of nd2 and νd2 are higher than the upper limits of the conditional expressions (35) and (36), it is difficult to obtain material 1 allowing the structure (contacting two-layer structure) of the diffractive optical element, i.e., material 1 satisfying the conditional expressions (31) to (34).

As shown in FIG. 23, the conditional expression (37) defines the range of the partial dispersion ratio θg,F2 and the Abbe number νd2 of material 2 making up the diffractive optical element.

As described above, this conditional expression is preferably satisfied based on the satisfaction of the conditional expressions (35) and (36).

If the value θg,F2 is higher than the upper limit of the conditional expression (37), it is difficult to obtain material 1 for obtaining a high diffraction efficiency in the contacting two-layer diffractive optical element, i.e., material 1 satisfying the conditional expressions (31) to (34).

As shown in FIG. 24, the conditional expression (38) defines the range of the partial dispersion ratio θg,d2 and the Abbe number νd2 of material 2 making up the diffractive optical element. This relationship also is preferably satisfied based on the satisfaction of the conditional expressions (31) to (34).

If the value of θg,d2 is higher than the upper limit of the conditional expression (38), it is difficult to obtain material 1 for obtaining a high diffraction efficiency in the contacting two-layer diffractive optical element, i.e., material 1 satisfying the conditional expressions (31) to (34).

In order to realize a higher diffraction efficiency while making the gratings thinner, as for the conditional expressions (35) to (38) concerning material 2, it is preferable to satisfy the following conditional expressions in view of the conditions for allowing material 1 to exist:

$$1.4 \leq nd2 \leq 1.6 \tag{35a}$$

$$1.45 \leq nd2 \leq 1.6 \tag{35b}$$

$$\nu d2 \leq 25 \tag{36a}$$

$$\theta gF2 \leq (-1.665E{-}07 \times \nu d2^3 + 5.213E{-}05 \times \nu d2^2 - 5.656E{-}03 \times \nu d2 + 0.600) \tag{37a}$$

$$\theta gd2 \leq (-1.687E{-}07 \times \nu d2^3 + 5.702E{-}05 \times \nu d2^2 - 6.603E{-}03 \times \nu d2 + 1.300) \tag{38a}$$

The conditional expression (39) represents the magnitude relationship between the refractive indexes of material 1 and material 2 in the diffractive optical element. It is difficult to obtain a desired diffraction efficiency unless this conditional expression is satisfied.

The conditional expressions (40) and (41) define the range of material properties of the particulate material for allowing material 2 to satisfy the above conditional expressions (35) to (38) in the diffractive optical element. The particulate material satisfying the conditional expressions (40) and (41) includes an inorganic particulate material that is any one of ITO, Ti, Nr, Cr, an oxide thereof, a composite thereof and a mixture thereof. In this embodiment, ITO (ndb2=1.77, νd=6.8) is used as one example.

If the value of ndb2 is lower than the lower limit of the conditional expression (40) or if the value of νdb2 is higher than the upper limit of the conditional expression (41), it is difficult for material 2 to satisfy the conditional expressions (35) to (38).

Herein, the particulate material used is not limited to the above-described examples, insofar as it satisfies the conditional expressions (40) and (41).

Furthermore, the numerical values of the conditional expressions (40) and (41) concerning the particulate material are preferably set as follows:

$$ndb2 \geq 1.75 \tag{40a}$$

$$\nu db2 \leq 18 \tag{41a}$$

The diffractive optical element 50 of this embodiment preferably satisfies the following conditions in addition to the above conditional expressions (31) to (41).

$\lambda F$, $\lambda d$ and $\lambda C$ are wavelengths of F-line, d-line and C-line, respectively.

$m(\lambda F)$ is a value obtained by dividing the difference in optical path length between the convex portion (peak) and the concave portion (valley) of each of the first and second diffraction gratings for the m-th order (designed order) diffracted light at the wavelength of F-line by that wavelength. $m(\lambda d)$ is a value obtained by dividing the difference in optical path length between the convex portion and the concave portion of each of the first and second diffraction gratings for the m-th order diffracted light at the wavelength of d-line by that wavelength. Further, $m(\lambda C)$ is a value obtained by dividing the difference in optical path length between the convex portion and the concave portion of each of the first and second diffraction gratings for the m-th order diffracted light at the wavelength of C-line by that wavelength.

d (μm) is the grating thickness of the grating portion of the diffraction grating, then:

$$d \leq 20 (\mu m) \tag{42}$$

$$0.92 \leq \{m(\lambda F) + m(\lambda d) + m(\lambda C)\}/3 \leq 1.08 \tag{43}$$

Herein, $m(\lambda F)$, $m(\lambda d)$ and $m(\lambda C)$ are as follows:

$$m(\lambda F) = \{d \times (nF1 - nF2)\}/\lambda F$$

$$m(\lambda d) = \{d \times (nd1 - nd2)\}/\lambda d$$

$$m(\lambda C) = \{d \times (nC1 - nC2)\}/\lambda C$$

In the above expressions, nF1, nd1 and nC1 are the refractive indexes of material 1 for F-line, d-line and C-line, respectively, and nF2, nd2 and nC2 are the refractive indexes of material 2 for F-line, d-line and C-line of material 2, respectively. d is the grating thickness common to material 1 and material 2.

The conditional expressions (42) and (43) are for improving the diffraction efficiency in the contacting two-layer DOE made of material 1 and material 2.

When the value of d is higher than the upper limit of the conditional expression (42), the degradation in diffraction efficiency for the obliquely incident light will be increased. If the conditional expression (43) is not satisfied, a desired diffraction efficiency cannot be obtained over the entire visible wavelength range.

To realize a still higher diffraction efficiency, the numerical values of the conditional expressions (42) and (43) are preferably set as follows:

$$d \leq 15 (\mu m) \tag{42a}$$

$$d \leq 12.5 (\mu m) \tag{42b}$$

$$d \leq 10 (\mu m) \tag{42c}$$

$$0.93 \leq \{m(\lambda F) + m(\lambda d) + m(\lambda)\}/3 \leq 1.07 \tag{43a}$$

$$0.94 \leq \{m(\lambda F)+m(\lambda d)+m(\lambda)\}/3 \leq 1.06 \tag{43b}$$

$$0.96 \leq \{m(\lambda)+m(\lambda d)+m(\lambda C)\}/3 \leq 1.04 \tag{43c}$$

In the diffractive optical element 50, the following conditions are preferably satisfied in addition to the above-stated conditional expressions (31) to (43).

$\lambda 1$, $\lambda 2$, and $\lambda 3$ are wavelengths of 450 nm, 550 nm, and 650 nm, respectively.

$\eta(\lambda 1)$, $\eta(\lambda 2)$, and $\eta(\lambda 3)$ are diffraction efficiencies at the wavelengths of $\lambda 1$, $\lambda 2$, and $\lambda 3$, respectively.

$T1(\lambda 1)$, $T1(\lambda 2)$, and $T1(\lambda 3)$ are internal transmittances of the first material at the wavelengths of $\lambda 1$, $\lambda 2$, and $\lambda 3$, respectively.

$T2(\lambda 1)$, $T2(\lambda 2)$, and $T2(\lambda 3)$ are internal transmittances of the second material at the wavelengths of $\lambda 1$, $\lambda 2$, and $\lambda 3$, respectively.

Then, $$(T1(\lambda 1) \times T2(\lambda 1) \times \eta(\lambda 1) + T1(\lambda 2) \times T2(\lambda 2) \times \eta(\lambda 2) + T1(\lambda 3) \times T2(\lambda 3) \times \eta(\lambda 3))/3 \geq 0.70 \tag{44}$$

Herein, the internal transmittances $T(\lambda)$ of the first and second materials at the wavelengths of $\lambda 1$, $\lambda 2$, and $\lambda 3$ are as follows.

$K1(\lambda 1)$ and $K2(\lambda 1)$ are absorption coefficients of the first and second materials at the wavelength of $\lambda 1$, respectively.

$K1(\lambda 2)$ and $K2(\lambda 2)$ are absorption coefficients of the first and second materials at the wavelength of $\lambda 2$, respectively.

$K1(\lambda 3)$ and $K2(\lambda 3)$ are absorption coefficients of the first and second materials at the wavelength of $\lambda 3$, respectively.

h1 and h2 are thicknesses of the grating base portions of the first and second diffraction gratings, respectively.

Assume that d is a grating thickness of the grating portions of the first and second diffraction gratings. Then, $$T1(\lambda 1) = \exp(-K1(\lambda 1) \times (d+h1))$$

$$T2(\lambda 1) = \exp(-K2(\lambda 1) \times (d+h2))$$

$$T1(\lambda 2) = \exp(-K1(\lambda 2) \times (d+h1))$$

$$T2(\lambda 2) = \exp(-K2(\lambda 2) \times (d+h2))$$

$$T1(\lambda 3) = \exp(-K1(\lambda 3) \times (d+h1))$$

$$T2(\lambda 3) = \exp(-K2(\lambda 3) \times (d+h2)).$$

The conditional expression (44) defines the internal transmittances of material 1 and material 2. If the internal transmittances are lower than the lower limit of the conditional expression (44), the transmittance will be too low. Then, such a diffractive optical element is not favorably used to an optical system and an optical apparatus described later.

In order to realize a still higher internal transmittance, the numerical value range of the conditional expression (44) is preferably set as follows:

$$(T1(\lambda 1) \times T2(\lambda 1) \times \eta(\lambda 1) + T1(\lambda 2) \times T2(\lambda 2) \times \eta(\lambda 2) + T1(\lambda 3) \times T2(\lambda 3) \times \eta(\lambda 3))/3 \geq 0.75 \tag{44a}$$

$$(T1(\lambda 1) \times T2(\lambda 1) \times \eta(\lambda 1) + T1(\lambda 2) \times T2(\lambda 2) \times \eta(\lambda 2) + T1(\lambda 3) \times T2(\lambda 3) \times \eta(\lambda 3))/3 \geq 0.80 \tag{44b}$$

$$(T1(\lambda 1) \times T2(\lambda 1) \times \eta(\lambda 1) + T1(\lambda 2) \times T2(\lambda 2) \times \eta(\lambda 2) + T1(\lambda 3) \times T2(\lambda 3) \times \eta(\lambda 3))/3 \geq 0.85 \tag{44c}$$

The average particle diameter of the particulate material is preferably ¼ or less (200 nm or less) of the wavelength (using wavelength or designed wavelength) of light incident on the diffractive optical element. In the case of the particle diameter larger than this range, the scattering of the light may be large when such a particulate material is mixed in a resin material.

The resin material for mixing the above particulate material therein includes an ultraviolet curing resin that is any one of acrylic, fluorine, vinyl, epoxy organic resin.

In this embodiment, acrylic resin or fluorine resin is used as one example.

When the grating pitch of the grating portions of the first and second diffraction gratings of FIG. 14 is P and their grating thickness is d, the following condition is preferably satisfied:

$$d/P < 1/7 \tag{45}.$$

The conditional expression (45) defines the shape (grating pitch and grating thickness) of the grating portion making up the diffractive optical element. If the value of d/P is higher than the upper limit of the conditional expression (45), the diffraction efficiency for the obliquely incident light may be degraded because the grating pitch becomes too minute.

The satisfaction of the conditional expression (45) leads to the advantage of facilitating the machining of the grating shape in a die for forming the diffractive optical element.

More preferably, d/P satisfies the following condition:

$$d/P < 1/15 \tag{45a}$$

As stated above, according to this embodiment, two diffraction gratings with an appropriate grating thickness are made of a particle dispersion material and a glass material, whereby a high diffraction efficiency can be obtained for diffracted light of a specific diffraction order (designed diffraction order) over a wide wavelength range. Furthermore, a diffractive optical element capable of sufficiently suppressing the unnecessary diffracted light can be realized.

Internal transmittances thereof also can be improved as compared with a diffractive optical element having performances and a shape (grating thickness) of the same level.

Moreover, owing to the configuration as the contacting two-layer DOE, the element can be manufactured easily. When such a diffractive optical element is used, an optical system or an optical apparatus having good optical performances with less flare light can be realized.

The following describes a more specific embodiment of the diffractive optical element with the structure satisfying the above-stated relationships.

In the diffractive optical element 50 shown in FIG. 14, the first diffraction grating 56 is made of a glass material for glass molding (produced by Sumita Optical Glass, Inc., K-VC79 (nd=1.6097, vd=57.8)). The second diffraction grating 57 is made of a mixed material (nd=1.5215, vd=14.6) of a fluorine resin and ITO particles (particulate material). The grating thickness d of the grating portions of the first and second diffraction gratings 56 and 57 is 6.65 μm. This example is designed so that the grating pitch P of the grating portions 56c and 57c of FIG. 14 is 200 μm and light impinges on the diffractive optical element 50 perpendicularly to the first grating base portion 54.

Figure 15A:
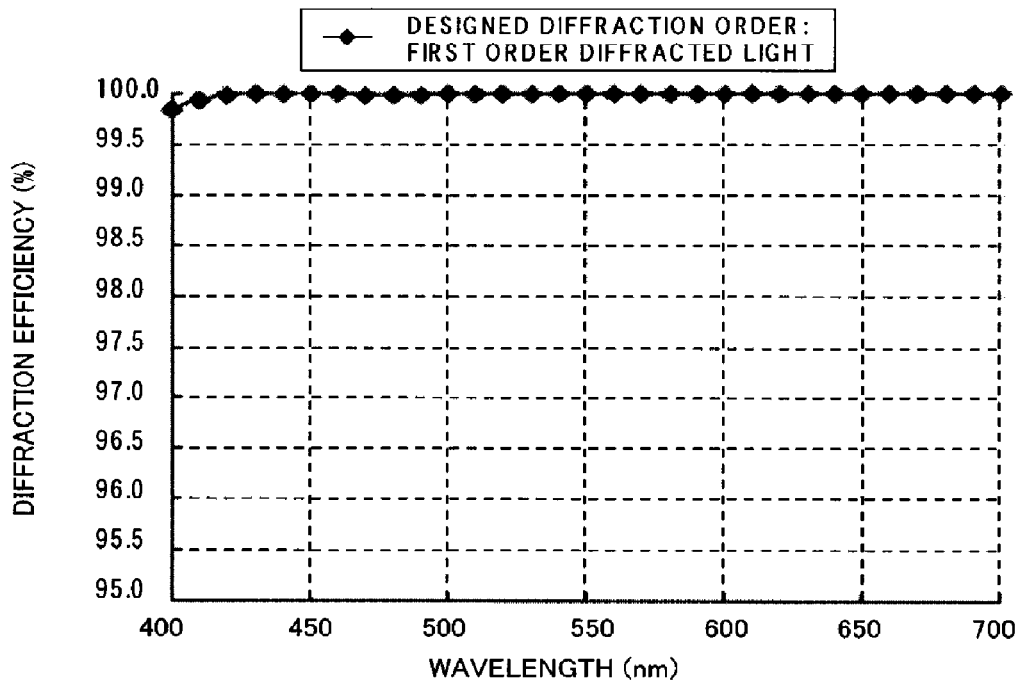
FIG. 15A is a graph showing the diffraction efficiency characteristic in the designed diffraction order of the diffractive optical element of Embodiment 6.
Figure 15B:
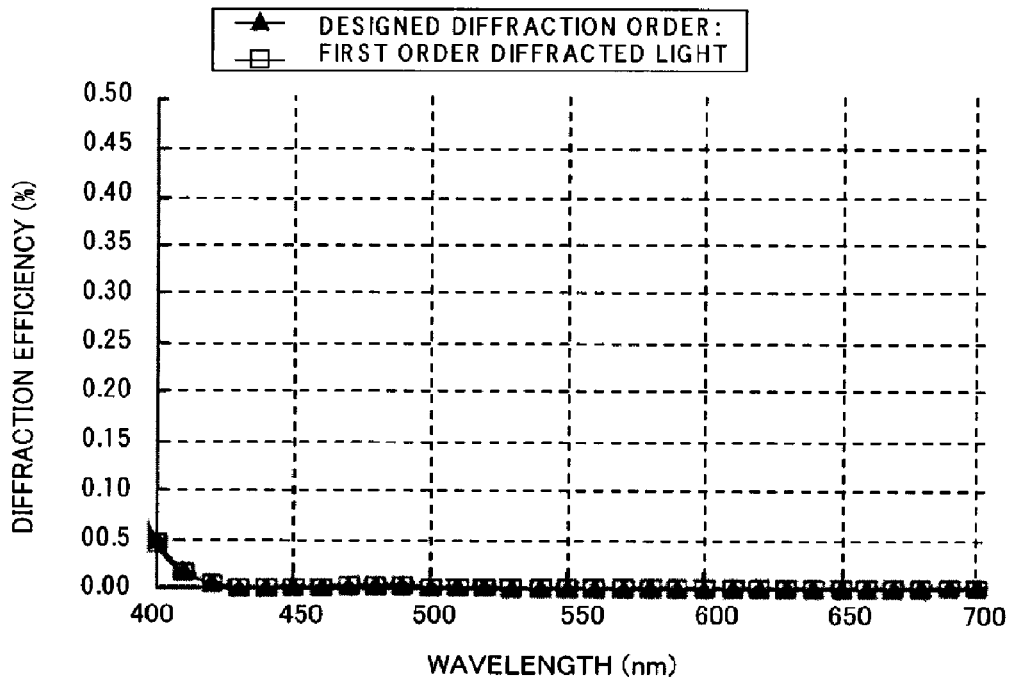
FIG. 15B is a graph showing the diffraction efficiency characteristics in the designed diffraction order±one diffraction orders of the diffractive optical element of Embodiment 6.

FIG. 15A shows the diffraction efficiency of the first order diffracted light in the diffractive optical element 50 of this embodiment. The designed diffraction order of the diffractive optical element 50 is the first order. FIG. 15B shows the diffraction efficiencies of the diffracted lights of the designed diffraction order±one diffraction orders (zeroth order and second order). Note here that in FIGS. 15A and 15B, the vertical axis represents diffraction efficiency (%), and the horizontal axis represents wavelength (nm). The same goes for the following embodiments.

As can be seen from these drawings, the diffractive optical element 50 of this embodiment shows an improved diffraction efficiency of the first order diffracted light as the designed order diffracted light as compared with those of the diffractive optical elements disclosed in the above Japanese Patent Laid-Open No. 9(1997)-127322, Japanese Patent Laid-Open No. 2000-98118 and Japanese Patent Laid-Open No. 2003-227913. Furthermore, according to the diffractive optical element 50 of this embodiment, the diffraction efficiencies of the zeroth order diffracted light and the second order diffracted light as the unnecessary order diffracted light are further reduced, so that less flare light is produced.

The diffractive optical element 50 of this embodiment has an overall grating thickness (the total sum of the thicknesses of the two diffraction gratings and an air layer in the stacked DOE) smaller than that of the conventional diffractive optical element disclosed in Japanese Patent Laid-Open No. 2004-78166.

Nevertheless, the diffractive optical element 50 achieves performances as well as or better than the conventional diffractive optical element for the designed order diffracted light (first order diffracted light) and the unnecessary order diffracted light (zeroth order diffracted light and second order diffracted light). Moreover, the diffractive optical element 50 of this embodiment achieves a diffraction efficiency of the first order diffracted light of 99.8% or higher over the entire visible wavelength range, and sufficiently suppresses the diffraction efficiency of the unnecessary order diffracted light (zeroth order diffracted light and second order diffracted light) to be 0.05% or lower.

In the above description, the diffraction efficiency of the unnecessary diffracted light is only evaluated for the zeroth order diffracted light and the second order diffracted light that are diffracted lights of the designed diffraction order±one diffraction orders. This is because as a diffraction order of the light is away from the designed diffraction order, the contribution of the light to the flare light will decrease. That is, a reduction in flare light due to the zeroth order and second order diffracted light accordingly brings a reduction in flare light due to the other order diffracted light. The reason is as follows.

In a diffractive optical element designed so that the diffracted light of the designed diffraction order is mainly diffracted, as a diffraction order of the light is away from the designed diffraction order, the diffraction efficiency of the light is decreased, and an image formed by the light of such a diffraction order blurs considerably on the image-forming plane, thus making it unnoticeable as flare.

Figure 16:
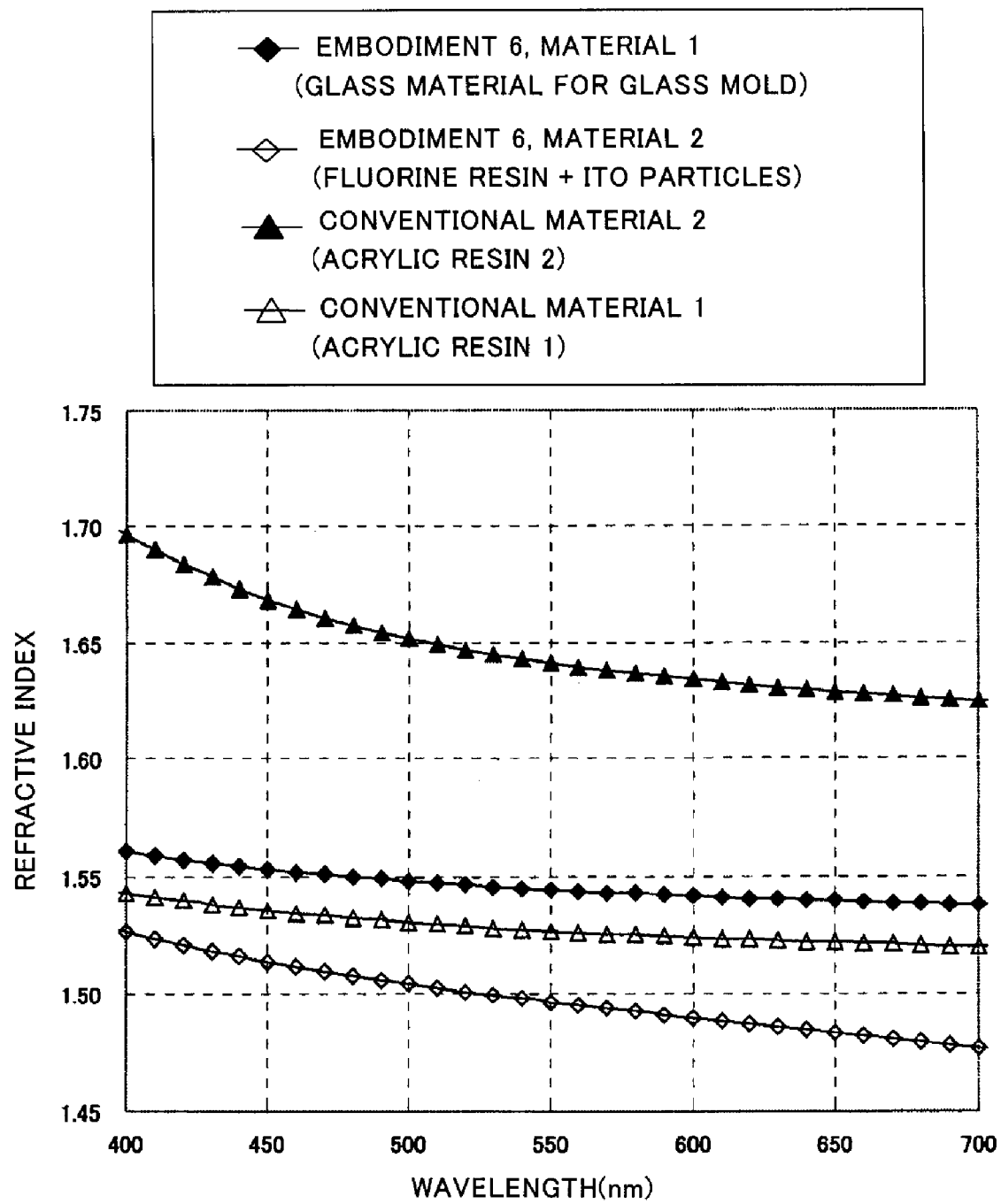
FIG. 16 is a graph showing the refractive index characteristics (n-λ characteristics) of materials making up the diffractive optical element of Embodiment 6.

Next, FIG. 16 shows the refractive index characteristics in the visible wavelength range of the materials used in this embodiment that is a glass material for glass molding (K-VC79, material 1) and a material (material 2) obtained by mixing fluorine resin with ITO particles as well as those of the materials disclosed in the above Japanese Patent Laid-Open No. 2000-98118. The materials disclosed in Japanese Patent Laid-Open No. 2000-98118 are acrylic resin 1 (nd=1.523, νd=51.1) and acrylic resin 2 (nd=1.636, νd=23.0).

In FIG. 16, the slopes of the refractive-index characteristic graphs appear to be different between material 1 and material 2 used in this embodiment. However, the refractive indexes of these materials change substantially constantly with respect to a change of the wavelength.

On the other hand, although the refractive index of acrylic resin 1 of Japanese Patent Laid-Open No. 2000-98118 changes substantially constantly with respect to a change of the wavelength, the rate of the change of acrylic resin 2 is larger in the shorter wavelength side.

This results from that Japanese Patent Laid-Open No. 2000-98118 merely refers to νd=(nd−1)/(nF−nC) as the material properties, where nF, nd and nC are the refractive indexes for F-line, d-line and C-line, respectively, and the Abbe number νd is a value merely defining the average slope of a change in refractive index near d-line. In the case of the stacked diffractive optical element, the Abbe number (νd) characteristic is an evaluation scale suitable for improving the diffraction efficiency compared to that of the single-layer DOE while maintaining a small grating thickness of the stacked diffractive optical element.

However, this embodiment is aimed to improve the diffraction efficiency further as compared with that of the diffractive optical element of Japanese Patent Laid-Open No. 2000-98118. Therefore, the Abbe number (νd) characteristic simply representing the average change in refractive index is insufficient as the evaluation scale.

Then, in the embodiments, a partial dispersion ratio θg,F for g-line and F-line as well as a partial dispersion ratio θg,d for g-line and d-line are employed as new evaluation scales. When nF, nC and ng are refractive indexes for F-line, C-line and g-line, respectively, the partial dispersion ratio θg,F can be represented as θg,F=(ng−nF)/(nF−nC).

When nF, nd, nC and ng are refractive indexes for F-line, d-line, C-line and g-line, respectively, the partial dispersion ratio θg,d can be represented as θg,d=(ng−nd)/(nF−nC). These expressions represent a ratio between a refractive index change in a short-wavelength side and a refractive index change in a long-wavelength side.

Material 1 of this embodiment has θg,F=0.54 and θg,d=1.24. Whereas, material 2 has θg,F=0.38, θg,d=1.00, which are smaller than those of material 1.

Meanwhile, acrylic resin 1 of Japanese Patent Laid-Open No. 2000-98118 has θg,F=0.58, θg,d=1.28, and acrylic resin 2 has θg,F=0.68, θg,d=1.40. Although θg,F and θg,d of acrylic resin 1 are not so much different from those of material 1 of this embodiment, θg,F and θg,d of acrylic resin 2 are greater than those of material 2 of this embodiment.

Therefore, it can be said that the combination of the materials of this embodiment keeps a change in refractive index of each material with respect to a change of wavelength more constant over the entire using wavelength range, and provides a higher diffraction efficiency.

In the case of the general combination of a glass material and a resin material proposed in the conventional diffractive optical element, when the diffraction grating has a thickness of about 6.65 μm, it is difficult to achieve a high diffraction efficiency of 99.8% or higher over the entire visible wavelength range.

The following describes internal transmittances of the first and second materials.

Figure 17:
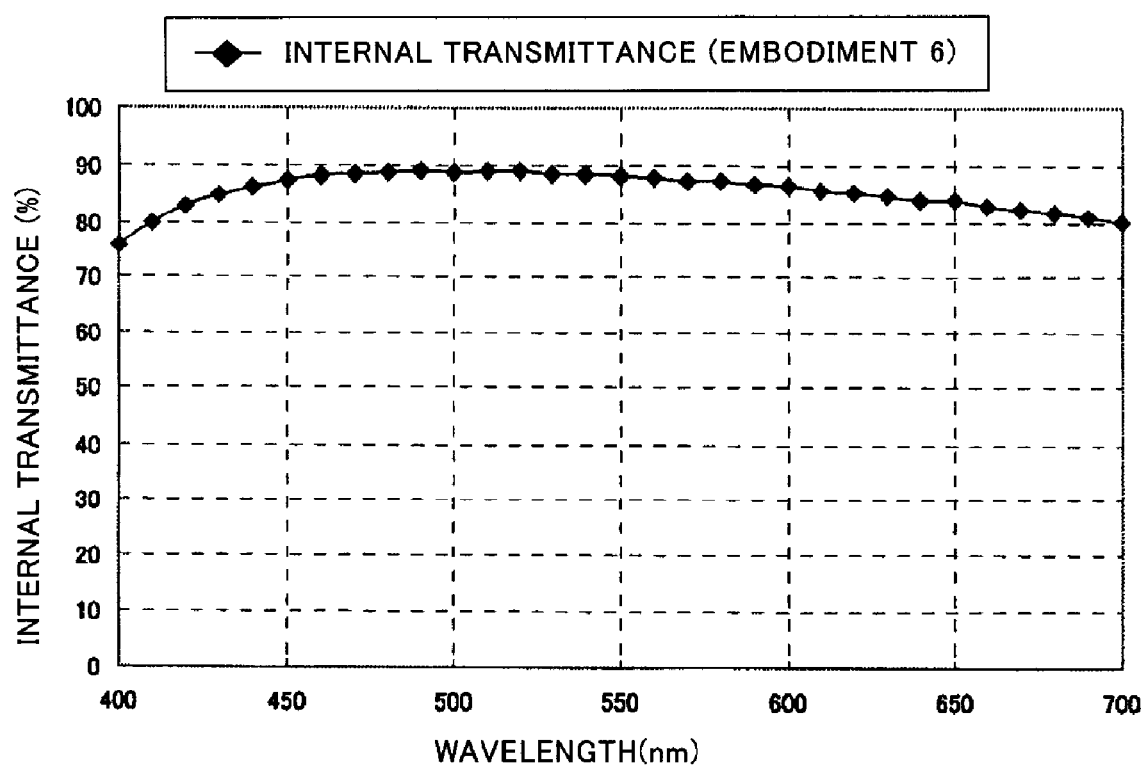
FIG. 17 is a graph showing the internal transmittance characteristic of the diffractive optical element of Embodiment 6.

FIG. 17 shows the internal transmittance in this embodiment. The internal transmittance herein is the result of the product of the actual internal transmittances and the diffraction efficiencies of the first and second materials (material 1 and material 2). The same goes for the following embodiments. In FIG. 17, the vertical axis represents internal transmittance (%), and the horizontal axis represents wavelength (nm)

In this embodiment, as the calculation conditions, the grating thickness d of the grating portions is 6.65 μm, the thickness h1 of the grating base portion of material 1 is 10 mm, and the thickness h2 of the grating base portion of material 2 is 5 μm.

As can be seen from FIG. 17, a good transmittance of about 75% or higher can be achieved over the entire visible wavelength range. Note here that the average internal transmittance of the wavelengths of 450 nm, 550 nm, and 650 nm in expression (44) also shows favorable value of about 86.6%.

Unlike the above Japanese Patent Laid-Open No. 9(1997)-127322, Japanese Patent Laid-Open No. 2000-98118, Japanese Patent Laid-Open No. 2004-78166 and Japanese Patent Laid-Open No. 2005-107298, and Japanese Patent Laid-Open No. 2003-227913, this embodiment employs the above-stated materials 1 and 2, thus realizing a contacting two-layer DOE in which the grating portions of the first and second diffraction gratings 56 and 57 having the same grating pattern are in contact with each other at their grating surfaces, while maintaining a high diffraction efficiency.

Thereby, there is no need to align the first and second diffraction gratings 56 and 57 with high accuracy, thus facilitating the manufacturing thereof.

The above-stated embodiment describes the diffractive optical element including the diffraction gratings 56 and 57 provided on flat plates as shown in FIGS. 13 and 14. However, instead of the flat plates, a diffraction grating may be provided on a curved surface of a lens such as a convex surface or a convex surface, from which similar effects to this embodiment can be obtained.

Although this embodiment describes the diffractive optical element where the designed diffraction order is the first order, the designed diffraction order is not limited to the first order. Even in the case of diffracted light in the second, the third order or the like other than the first order, similar effects to this embodiment can be obtained by setting a synthetic value of the optical-path-length differences of the diffraction gratings to be a desired designed wavelength in a desired designed diffraction order.

Embodiment 7

The following describes Embodiment 7. Basically, a diffraction optical element of this embodiment has the same shape in cross section as that of Embodiment 6.

That is, the diffractive optical element of this embodiment has the structure shown in FIGS. 13 and 14. Therefore, the same reference numerals will be assigned to the components common to those of Embodiment 6, their detailed explanations will be omitted and only differences will be focused on the following description.

In the diffractive optical element 50 of this embodiment, the first diffraction grating 56 of FIG. 14 is made of a glass material for glass molding (produced by Sumita Optical Glass, Inc., K-LaFK60 (nd=1.6325, vd=63.8). The second diffraction grating 57 is made of a mixed material (nd=1.5652, vd=19.7) of acrylic resin and ITO particles (particulate material). The grating portions 56c and 57c of the first and second diffraction gratings 56 and 57 have the same thickness d of 8.75 µm. This example also is designed so that the grating pitch P of the grating portions 56c and 57c of FIG. 14 is 200 µm and light impinges on the diffractive optical element 50 perpendicularly to the first grating base portion 54.

Figure 18A:
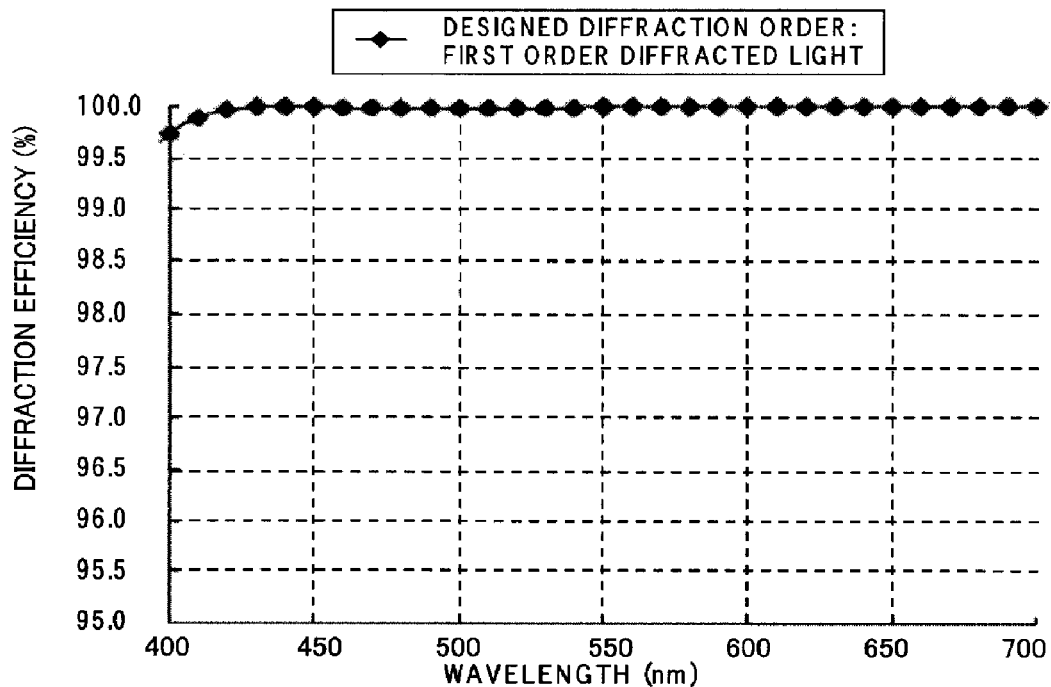
FIG. 18A is a graph showing the diffraction efficiency characteristic in the designed diffraction order of a diffractive optical element of Embodiment 7.
Figure 18B:
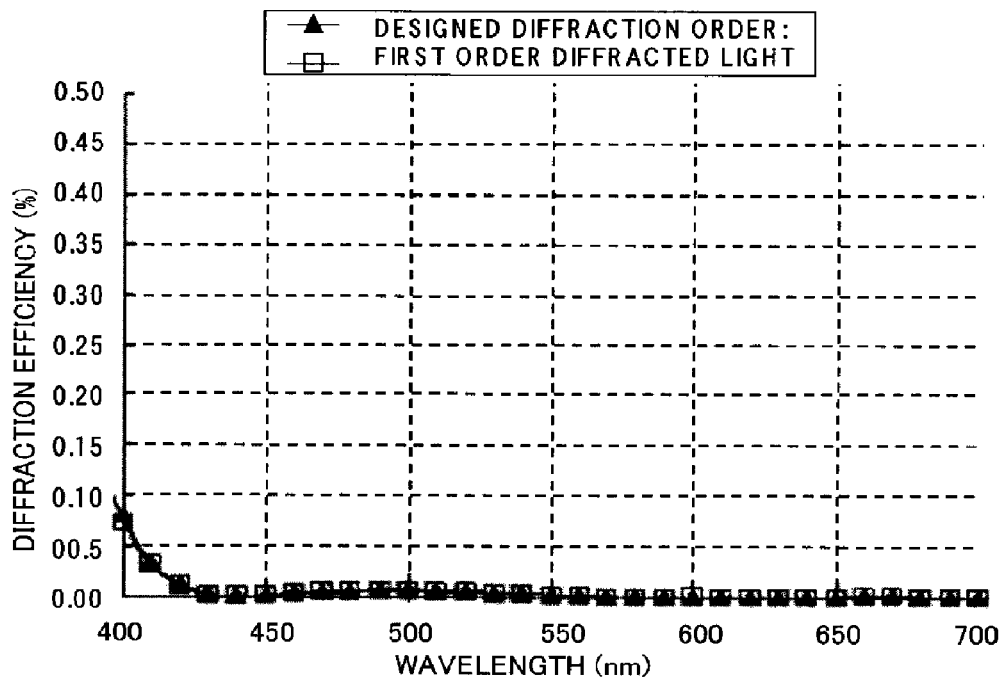
FIG. 18B is a graph showing the diffraction efficiency characteristics in the designed diffraction order±one diffraction orders of the diffractive optical element of Embodiment 7.

FIG. 18A shows the diffraction efficiency of the first order diffracted light in the diffractive optical element 50 of this embodiment. The designed diffraction order is the first order. FIG. 18B shows the diffraction efficiencies of the diffracted lights of the designed diffraction order±one diffraction orders (zeroth order and second order).

Similar to the diffractive optical element 50 of Embodiment 6, the diffractive optical element 50 of this embodiment shows an improved diffraction efficiency of the first order diffracted light as the designed order diffracted light, and reduces the diffraction efficiencies of the zeroth order diffracted light and the second order diffracted light as the unnecessary diffracted light, so that less flare light is produced.

More specifically, the diffraction efficiency of the first order diffracted light is 99.7% or higher over the entire visible wavelength range, and the diffraction efficiency of the unnecessary order diffracted light (zeroth order diffracted light and second order diffracted light) is sufficiently suppressed to be 0.09% or lower. When the general combination of a glass material and a resin material is used as in the conventional diffractive optical element, if the grating portion has a thickness of about 8.75 µm, it is difficult to achieve a high diffraction efficiency of 99.7% or higher over the entire visible wavelength range.

Figure 19:
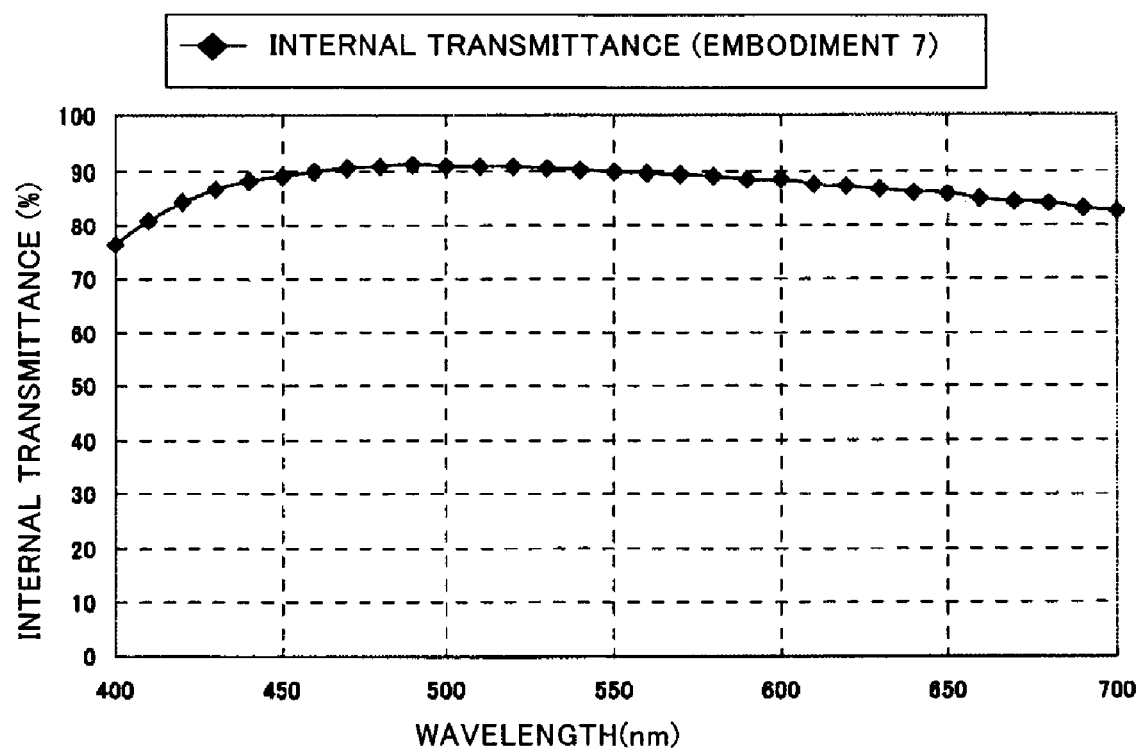
FIG. 19 is a graph showing the internal transmittance characteristic of the diffractive optical element of Embodiment 7.

FIG. 19 shows the internal transmittance in this embodiment. In this embodiment, as the calculation conditions, the grating thickness d of the grating portions is 8.75 µm, the thickness h1 of the grating base portion of material 1 is 10 mm, and the thickness h2 of the grating base portion of material 2 is 5 µm. As can be seen from FIG. 19, a good transmittance of about 75% or higher can be achieved over the entire visible wavelength range.

Note here that the average internal transmittance of the wavelengths of 450 nm, 550 nm, and 650 nm in expression (44) also shows favorable value of about 88.4%, which is better than that of Embodiment 6.

Embodiment 8

Next, the following describes Embodiment 8. Basically, a diffraction optical element of this embodiment has the same shape in cross section as those of Embodiments 6 and 7.

That is, the diffractive optical element of this embodiment has the structure shown in FIGS. 13 and 14. Therefore, the same reference numerals will be assigned to the components common to those of Embodiment 6, their detailed explanations will be omitted and only differences will be focused on the following description.

In the diffractive optical element 50 of this embodiment, the first diffraction grating 56 of FIG. 14 is made of a glass material for glass molding (produced by Sumita Optical Glass, Inc., K-VC78 (nd=1.6691, vd=55.4). The second diffraction grating 57 is made of a mixed material (nd=1.5836, vd=16.0) of acrylic resin and ITO particles (particulate material). The grating portions 56c and 57c of the first and second diffraction gratings 56 and 57 have the same thickness d of 6.86 µm. This example also is designed so that the grating pitch P of the grating portions 56c and 57c of FIG. 14 is 200 µm and light impinges on the diffractive optical element 50 perpendicularly to the first grating base portion 54.

Figure 20A:
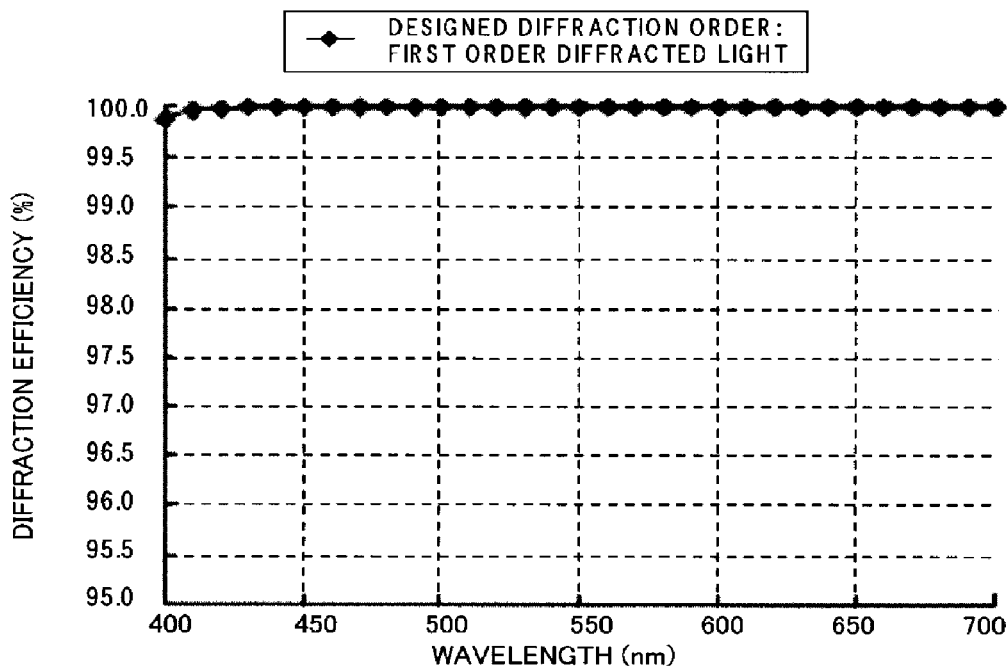
FIG. 20A is a graph showing the diffraction efficiency characteristic in the designed diffraction order of a diffractive optical element of Embodiment 8.
Figure 20B:
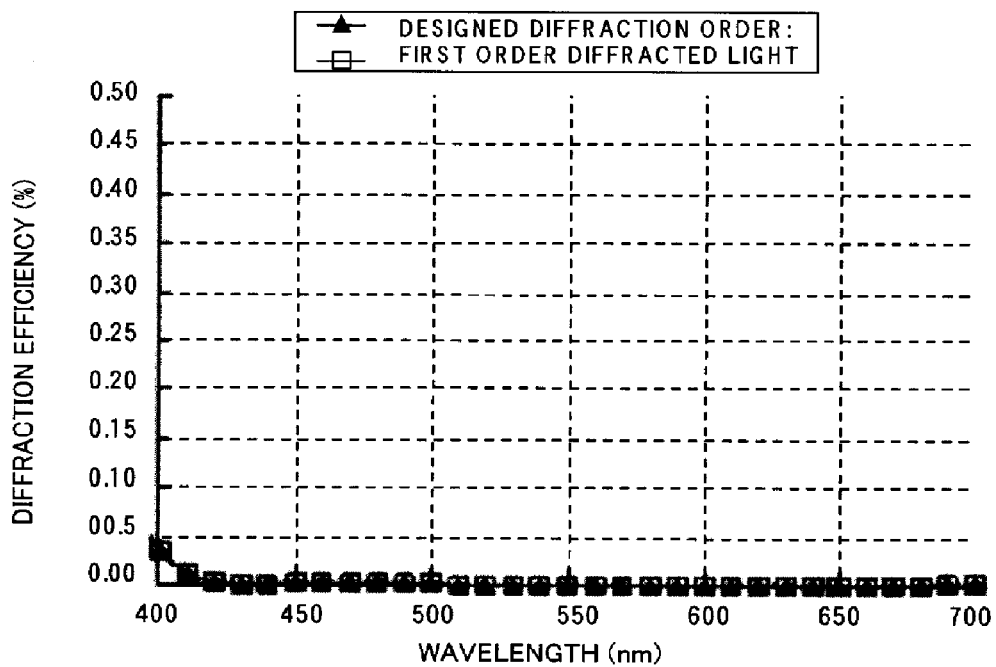
FIG. 20B is a graph showing the diffraction efficiency characteristics in the designed diffraction order±one diffraction orders of the diffractive optical element of Embodiment 8.

FIG. 20A shows the diffraction efficiency of the first order diffracted light in the diffractive optical element 50 of this embodiment. The designed diffraction order is the first order. FIG. 20B shows the diffraction efficiencies of the diffracted lights of the designed diffraction order±one diffraction orders (zeroth order and second order). Similar to the diffractive optical element 50 of Embodiment 6, the diffractive optical element 50 of this embodiment shows an improved diffraction efficiency of the first order diffracted light as the designed order diffracted light, and reduces the diffraction efficiencies of the zeroth order diffracted light and the second order diffracted light as the unnecessary diffracted light, so that less flare light is produced.

More specifically, the diffraction efficiency of the first order diffracted light is 99.8% or higher over the entire visible wavelength range, and the diffraction efficiency of the unnecessary order diffracted light (zeroth order diffracted light and second order diffracted light) is sufficiently suppressed to be 0.04% or lower. Incidentally, when the general combination of a glass material and a resin material is used as in the conventional diffractive optical element, if the grating portion has a thickness of about 6.86 μm, it is difficult to achieve a high diffraction efficiency of 99.8% or higher over the entire visible wavelength range.

Figure 21:
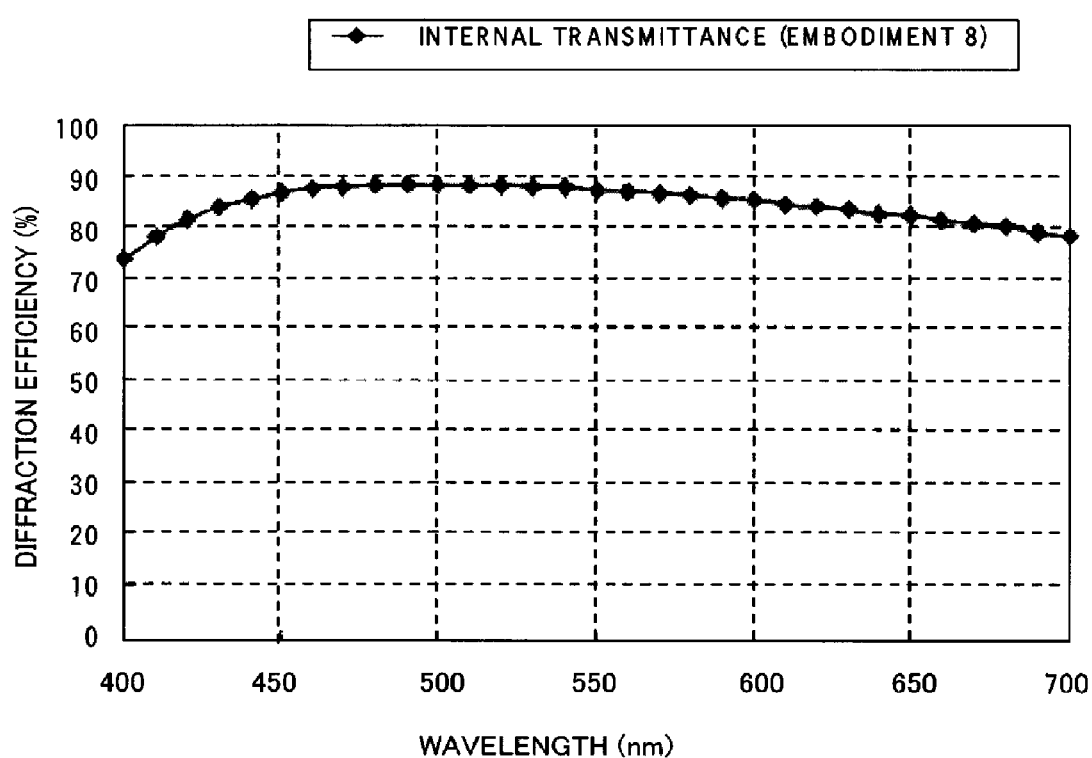
FIG. 21 is a graph showing the internal transmittance characteristic of the diffractive optical element of Embodiment 8.

FIG. 21 shows the internal transmittance in this embodiment. In this embodiment, as the calculation conditions, the grating thickness d of the grating portions is 6.86 μm, the thickness h1 of the grating base portion of material 1 is 10 mm, and the thickness h2 of the grating base portion of material 2 is 5 μm.

As can be seen from FIG. 21, a good transmittance of about 73% or higher can be achieved over the entire visible wavelength range. Note here that the average internal transmittance of the wavelengths of 450 nm, 550 nm, and 650 nm in expression (44) also shows favorable value of about 85.3%.

Embodiment 9

The following describes Embodiment 9. Basically, a diffraction optical element of this embodiment has the same shape in cross section as those of Embodiments 6 to 8.

That is, the diffractive optical element of this embodiment has the structure shown in FIGS. 13 and 14. Therefore, the same reference numerals will be assigned to the components common to those of Embodiment 6, their detailed explanations will be omitted and differences only will be focused on the following description.

In the diffractive optical element 50 of this embodiment, the first diffraction grating 56 of FIG. 14 is made of a glass material for glass molding (produced by Sumita Optical Glass, Inc., K-PFK80 (nd=1.4970, vd=81.5). The second diffraction grating 57 is made of a mixed material (nd=1.4591, vd=28.2) of acrylic resin and ITO particles (particulate material). The grating portions 56c and 57c of the first and second diffraction gratings 56 and 57 have the same thickness d of 15.6 μm. This example also is designed so that the grating pitch P of the grating portions 56c and 57c of FIG. 14 is 200 μm and light impinges on the diffractive optical element 50 perpendicularly to the first grating base portion 54.

Figure 33A:
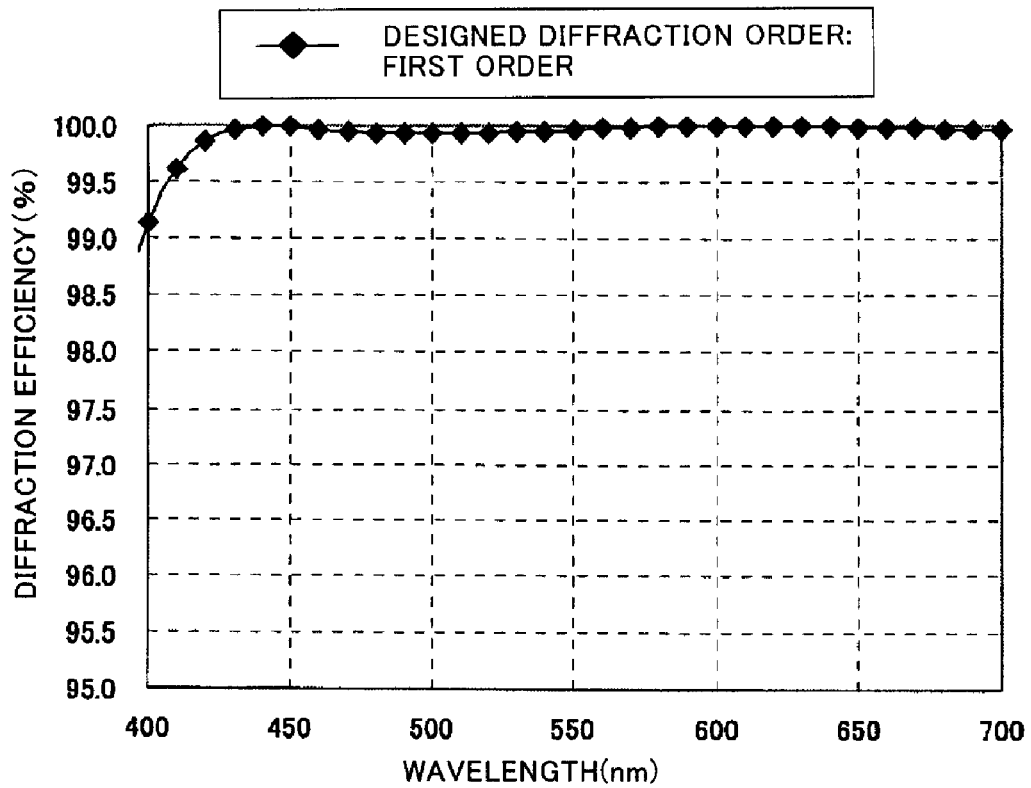
FIG. 33A is a graph showing the diffraction efficiency characteristic in the designed diffraction order of a diffractive optical element of Embodiment 9.

FIG. 33A shows the diffraction efficiency of the first order diffracted light in the diffractive optical element 50 of this embodiment. The designed diffraction order is the first order.

Figure 33B:
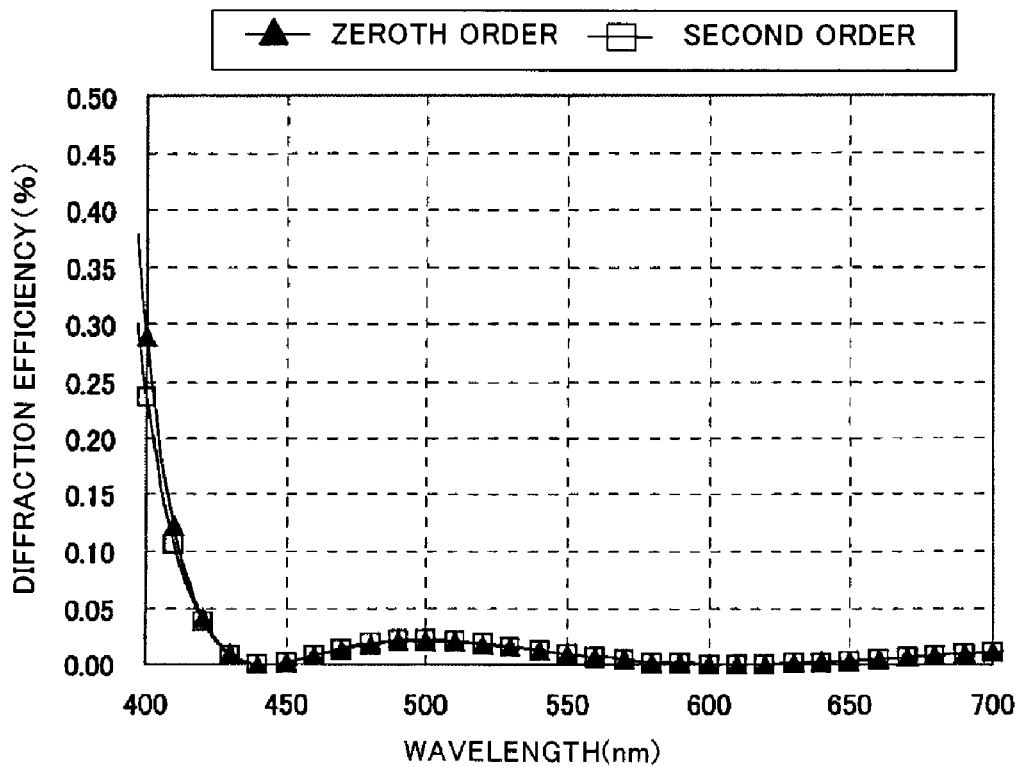
FIG. 33B is a graph showing the diffraction efficiency characteristics in the designed diffraction order±one diffraction orders of the diffractive optical element of Embodiment 9.

FIG. 33B shows the diffraction efficiencies of the diffracted lights of the designed diffraction order±one diffraction orders (zeroth order and second order).

Similar to the diffractive optical element 50 of Embodiment 6, the diffractive optical element 50 of this embodiment shows an improved diffraction efficiency of the first order diffracted light as the designed order diffracted light, and reduces the diffraction efficiencies of the zeroth order diffracted light and the second order diffracted light as the unnecessary diffracted light, so that less flare light is produced.

More specifically, the diffraction efficiency of the first order diffracted light is 99.1% or higher over the entire visible wavelength range, and the diffraction efficiency of the unnecessary order diffracted light (zeroth order diffracted light and second order diffracted light) is sufficiently suppressed to be 0.29% or lower. When the general combination of a glass material and a resin material is used as in the conventional diffractive optical element, if the grating portion has a thickness of about 15.6 μm, it is difficult to achieve a high diffraction efficiency of 99.1% or higher over the entire visible wavelength range.

Figure 34:
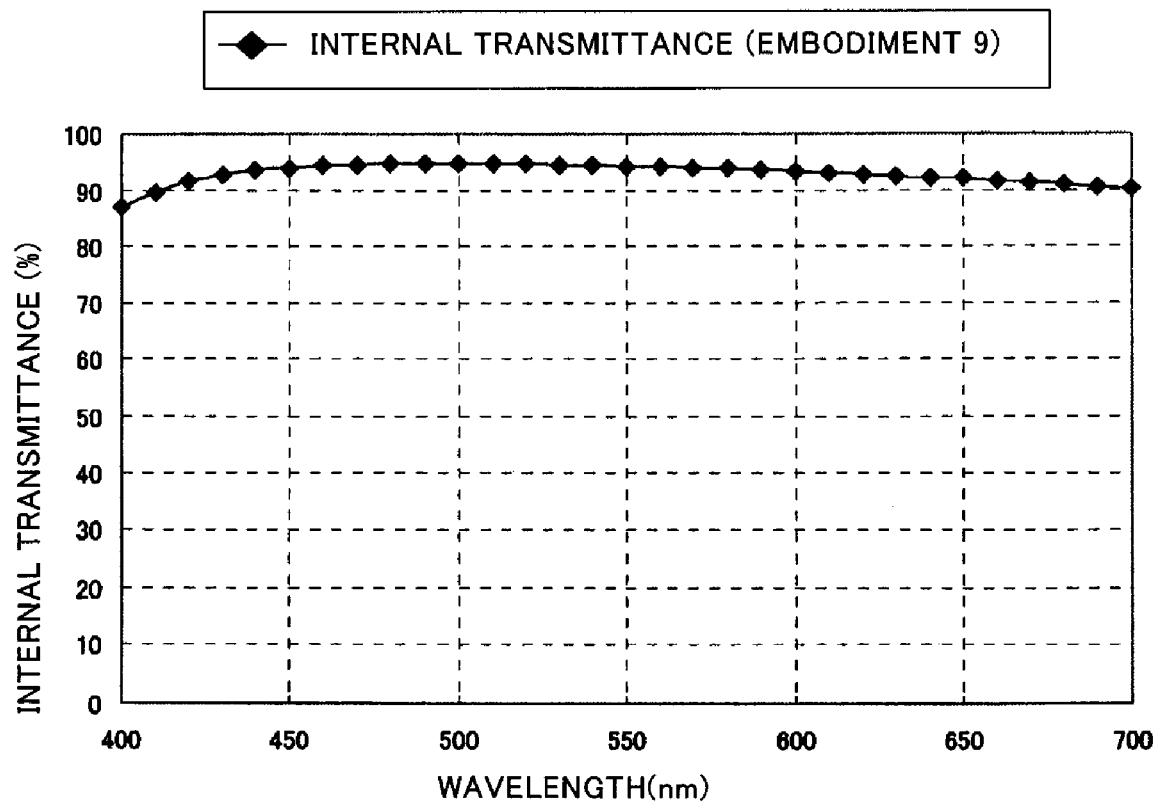
FIG. 34 is a graph showing the internal transmittance characteristic of the diffractive optical element of Embodiment 9.

FIG. 34 shows the internal transmittance in this embodiment. In this embodiment, as the calculation conditions, the grating thickness d of the grating portions is 15.9 μm, the thickness h1 of the grating base portion of material 1 is 10 mm, and the thickness h2 of the grating base portion of material 2 is 5 μm.

As can be seen from FIG. 34, a good transmittance of about 87% or higher can be achieved over the entire visible wavelength range. Note here that the average internal transmittance of the wavelengths of 450 nm, 550 nm, and 650 nm in expression (44) also shows favorable value of about 93.5%.

Table 2 shows numerical values of the above-stated conditional expressions (31) to (45) concerning the diffractive optical elements described in Embodiments 6 to 9.

As described above, in Embodiments 6 to 9, the partial dispersion ratio θg,F for g-line and F-line and the partial dispersion ratio θg,d for g-line and d-line of material 1 and material 2 are appropriately set, and such material 1 and material 2 are used to make up the contacting two-layer DOE.

Thereby, a diffractive optical element capable of keeping a high diffraction efficiency of the diffracted light of a specific diffraction order (designed diffraction order) over the entire wavelength range (using wavelength range) of incident light, while capable of sufficiently suppressing the unnecessary diffracted light causing flare light can be realized.

The internal transmittances thereof also can be improved as compared with a diffractive optical element having performances and a shape (grating thickness) of the same level. Moreover, owing to the configuration as the contacting two-layer DOE, an advantage of facilitating the manufacturing thereof can be obtained, for example.

It should be noted here that the shape of the diffractive optical element, especially the shape of the grating portion shown in FIGS. 13 and 14 are illustrative only, and other shapes can be employed as well.

The diffraction grating is not limited to two layers, and may include three or more layers.

In this case, a diffraction grating may be provided at least one of the grating base portions.

In the first and second element portions, a grating portion made up of another completely independent diffraction grating may be provided.

According to the above-stated embodiments, a diffractive optical element capable of keeping a high diffraction efficiency of the diffracted light of a specific diffraction order (designed diffraction order) over a wide wavelength range, while capable of sufficiently suppressing the unnecessary diffracted light can be realized. Moreover, owing to the configuration as the contacting two-layer DOE, the element can be manufactured easily. When such a diffractive optical element is used, an optical system and an optical apparatus of good optical performances with less flare light can be realized.

Embodiment 10

The diffractive optical elements described in Embodiments 1 to 9 can be used for the following purposes.

Figure 9A:
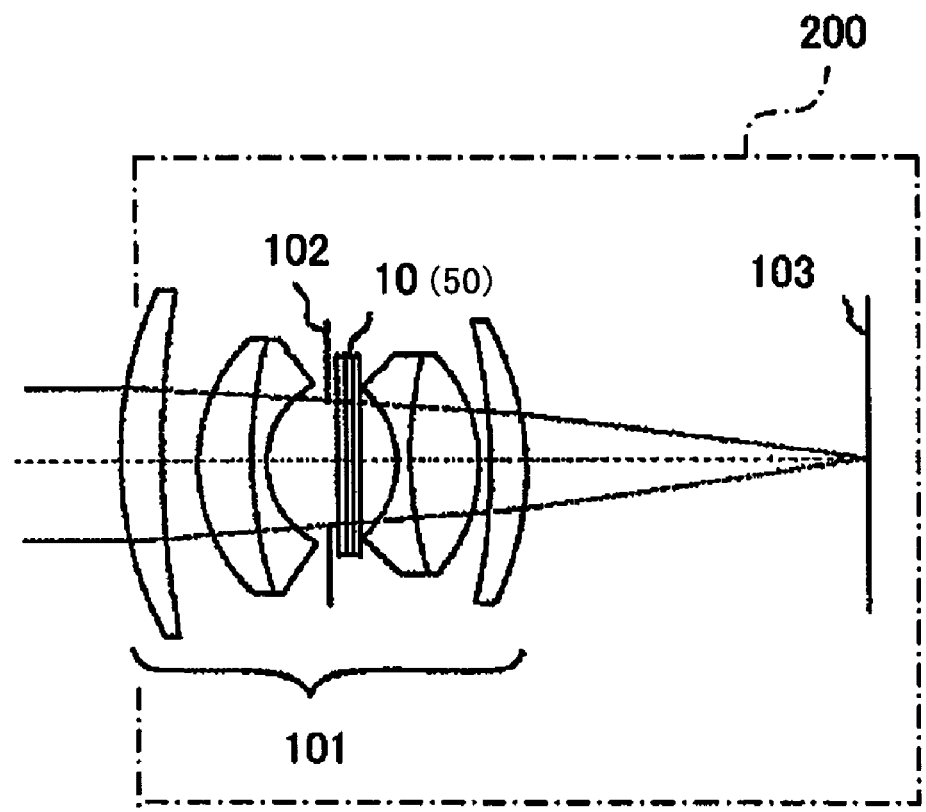
FIG. 9A shows the configuration of an image-pickup optical system using the diffractive optical element of Embodiments 1 to 9 and an image-pickup apparatus provided with the same.

FIG. 9A shows the configuration of an optical system used as an image-pickup optical system in an image-pickup apparatus (optical apparatus) 200 such as a still camera or a video camera, including the diffractive optical element of Embodiments 1 to 9.

In FIG. 9A, reference numeral 101 denotes an image-pickup optical system mainly constituted by refractive optical elements (e.g., normal lens elements). Inside the image-pickup optical system 101 is provided with an aperture stop 102 and the diffractive optical element 10 (or 50) described in Embodiments 1 to 9. Reference numeral 103 denotes a photosensitive member such as a film or an image pickup element disposed on an image-forming plane of the image-pickup optical system 101. The image-pickup element used includes a photoelectric conversion element such as a CCD sensor or a CMOS sensor.

As described above, the diffractive optical element 10 (50) functions as a lens, and corrects the chromatic aberration caused by the refractive optical elements in the image-pickup optical system 101. As described in Embodiments 1 to 9, the diffractive optical element 10 (50) has a significantly improved diffraction efficiency characteristic as compared with those of the conventional elements. Therefore, an image-pickup optical system and an image-pickup apparatus having good optical performances with less flare light and of a high resolving power at low frequencies can be achieved.

Since the diffractive optical element 10 (50) described in Embodiments 1 to 9 is the contacting two-layer DOE without an air layer, it can be manufactured easily, and the productivity of the image-pickup optical system can be effectively enhanced.

It should be noted that in FIG. 9A, the diffractive optical element 10 (50) is provided on a planar glass surface disposed near the aperture stop 102, but the location where the diffractive optical element 10 (50) can be provided is not limited to this. As has been explained before, it is also possible to dispose the diffractive optical element 10 (50) on a concave or convex surface of a lens element. It is also possible to provide a plurality of the diffractive optical elements 10 (50) inside the image-pickup optical system.

FIG. 9A shows the diffractive optical element 10 (50) of Embodiments 1 to 9, which is used for the image-pickup optical system of the image-pickup apparatus. However, the diffractive optical element 10 (50) may be used for an image-forming optical system that is used for a wide wavelength range, such as a reader lens of an image scanner or a digital copying machine of an office machine (optical apparatus). In this case also, an image-forming optical system and an office machine having good optical performances with less flare light and of a high resolving power at low frequencies can be achieved.

Embodiment 11

Figure 9B:
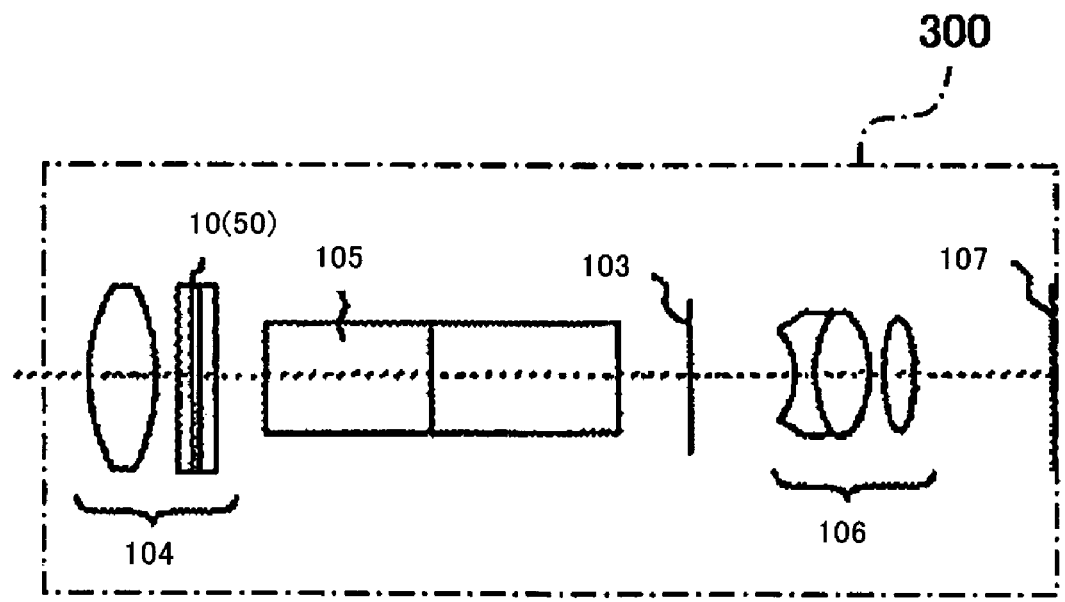
FIG. 9B shows the configuration of an observation optical system using the diffractive optical element of Embodiments 1 to 9 and an observation apparatus provided with the same.

FIG. 9B shows the structure of an observing optical system mounted to an observing apparatus (optical apparatus) 300 such as a binocular telescope, including the diffractive optical element described in Embodiments 1 to 9.

In FIG. 9B, reference numeral 104 denotes an objective lens, 105 denotes a prism for erecting an inverted image formed by the objective lens 104. Reference numeral 106 denotes an ocular lens, and 107 denotes an evaluation surface 107 (pupil surface). An observer can observe an object through the ocular lens 106 by placing his/her eyes on the evaluation surface.

The objective lens 104 includes the diffractive optical element 10 (50) described in Embodiments 1 to 9. The diffractive optical element 10 is provided for the purpose of correcting the chromatic aberration or other aberrations at an image-forming plane 103 of the objective lens 104.

As has been explained in Embodiments 1 to 9, the diffraction efficiency characteristic of the diffractive optical element 10 (50) is greatly improved as compared to the conventional diffractive optical elements. Therefore, an observing optical system and an observing apparatus with good optical performances of less flare light and of a high resolving power at low frequencies can be achieved.

Since the diffractive optical element 10 (50) described in Embodiments 1 to 9 is the contacting two-layer DOE without an air layer, it can be manufactured easily, and the productivity of the observing optical system can be effectively enhanced.

It should be noted that in FIG. 9B, the diffractive optical element 10 (50) is provided on a planar glass surface arranged near the lens element making up the objective lens 104, but the location where the diffractive optical element 10 (50) can be provided is not limited to this. As has been explained before, it is also possible to dispose the diffractive optical element 10 (50) on a concave or convex surface of a lens element. It is also possible to provide a plurality of the diffractive optical elements 10 (50) inside the observing optical system.

Moreover, FIG. 9B illustrates the case where the diffractive optical element 10 (50) is provided inside the objective lens 104, but it can also be provided on an optical surface of the prism 105 or inside the ocular lens 106, from which similar effects to the above can be attained.

However, providing the diffractive optical element 10 (50) closer to the object than the image-forming plane 103 provides an effect of reducing the chromatic aberration generated at the objective lens 104. Therefore, in the case of an observing optical system for unaided eyes, it is desirable that the diffractive optical element 10 (50) is provided at least in the objective lens 104.

Furthermore, in addition to the use in the observing optical system of the binocular telescope shown in FIG. 9B, the diffractive optical element 10 (50) described in Embodiments 1 to 9 may be provided also in observing optical systems such as a telescope or an optical finder of a camera. In this case also, similar effects to the above can be attained.

Furthermore, the present invention is not limited to these preferred embodiments and various variations and modifications may be made without departing from the scope of the present invention.

This application claims foreign priority benefits based on Japanese Patent Applications Nos. 2007-077600, filed on Mar. 23, 2007, and 2007-086843, filed on Mar. 29, 2007, each of which is hereby incorporated by reference herein in its entirety as if fully set forth herein.

TABLE 1

| CONDITIONAL EXPRESSION | EMBODIMENT 1 | EMBODIMENT 2 | EMBODIMENT 3 | EMBODIMENT 4 | EMBODIMENT 5 |
|---|---|---|---|---|---|
| ① | 1.5421 | 1.6110 | 1.5936 | 1.5661 | 1.5218 |
| ② | 53.2 | 45.4 | 57.9 | 55.4 | 51.3 |
| ③ | 0.55 | 0.54 | 0.57 | 0.56 | 0.54 |
| ④ | 1.25 | 1.27 | 1.27 | 1.26 | 1.23 |

TABLE 1-continued

| CONDITIONAL EXPRESSION | EMBODIMENT 1 | EMBODIMENT 2 | EMBODIMENT 3 | EMBODIMENT 4 | EMBODIMENT 5 |
|---|---|---|---|---|---|
| (5) | 1.4909 | 1.5673 | 1.5188 | 1.4688 | 1.4797 |
| (6) | 19.8 | 21.7 | 16.5 | 12.1 | 21.3 |
| (7) | 0.41 | 0.42 | 0.40 | 0.36 | 0.40 |
| (8) | 1.04 | 1.07 | 1.02 | 0.97 | 1.03 |
| (9) | 1.93 | 1.77 | 1.93 | 1.77 | 1.77 |
| (10) | 7.7 | 6.8 | 7.7 | 6.8 | 6.8 |
| (11) | 0.05 | 0.04 | 0.07 | 0.10 | 0.04 |
| (12) | 1.005 | 1.003 | 1.006 | 0.999 | 1.000 |
| (13) | 0.996 | 0.989 | 0.997 | 0.994 | 0.995 |
| (14) | 0.999 | 1.001 | 0.999 | 1.001 | 1.002 |
| (15) | 11.4 | 13.3 | 7.8 | 6.0 | 13.9 |
| (16) | 1.000 | 0.998 | 1.001 | 0.998 | 0.999 |
| (17) | 1.71 | 1.87 | 1.71 | 1.71 | 1.77 |
| (18) | 68.0 | 39.4 | 68.0 | 68.0 | 6.8 |
| (19) | 0.06 | 0.07 | 0.04 | 0.03 | 0.07 |

TABLE 2

| CONDITIONAL EXPRESSION | EMBODIMENT 6 | EMBODIMENT 7 | EMBODIMENT 8 | EMBODIMENT 9 |
|---|---|---|---|---|
| (31) | 1.6097 | 1.6325 | 1.6691 | 1.4970 |
| (32) | 57.8 | 63.8 | 55.4 | 81.5 |
| (33) | 0.54 | 0.54 | 0.55 | 0.54 |
| (34) | 1.24 | 1.24 | 1.24 | 1.23 |
| (35) | 1.5215 | 1.5652 | 1.5836 | 1.4591 |
| (36) | 14.6 | 19.7 | 16.0 | 28.2 |
| (37) | 0.38 | 0.41 | 0.39 | 0.43 |
| (38) | 1.00 | 1.04 | 1.01 | 1.08 |
| (39) | 0.09 | 0.07 | 0.09 | 0.04 |
| (40) | 1.77 | 1.77 | 1.77 | 1.77 |
| (41) | 6.8 | 6.8 | 6.8 | 6.8 |
| (42) | 6.65 | 8.75 | 6.86 | 15.56 |
| (43) | 1.001 | 1.002 | 1.001 | 1.004 |
| (44) | 0.866 | 0.884 | 0.853 | 0.935 |
| (45) | 0.03 | 0.04 | 0.03 | 0.08 |

What is claimed is:

1. A diffractive optical element, comprising:

two diffraction gratings made of a first material and a second material, respectively, the two diffraction gratings each having a grating surface and being in contact with each other at the grating surfaces, wherein the first and second materials satisfy all of the following conditions, and the second material is a material obtained by mixing a resin material with a first particulate material satisfying all of the following conditions:

$nd1 \geq 1.48$ $vd1 \geq 40$ $(-1.665E{-}07 \times vd1^3 + 5.213E{-}05 \times vd1^2 - 5.656E{-}03 \times vd1 + 0.675) \leq \theta g, F1 \leq (-1.665E{-}07 \times vd1^3 + 5.213E{-}05 \times vd1^2 - 5.656E{-}03 \times vd1 + 0.825)$ $(-1.687E{-}07 \times vd1^3 + 5.702E{-}05 \times vd1^2 - 6.603E{-}03 \times vd1 + 1.400) \leq \theta g, d1 \leq (-1.687E{-}07 \times vd1^3 + 5.702E{-}05 \times vd1^2 - 6.603E{-}03 \times vd1 + 1.580)$ $nd2 \leq 1.6$ $vd2 \leq 30$ $\theta g, F2 \leq (-1.665E{-}07 \times vd2^3 + 5.213E{-}05 \times vd2^2 - 5.656E{-}03 \times vd2 + 0.675)$ $\theta g, d2 \leq (-1.687E{-}07 \times vd2^3 + 5.702E{-}05 \times vd2^2 - 6.603E{-}03 \times vd2 + 1.400)$ $nd1 - nd2 > 0$ $ndb2 \geq 1.70$ $vdb2 \leq 20$ where ng1, nF1, nd1, and nC1 are refractive indexes of the first material for g-line, F-line, d-line, and C-line, respectively, ng2, nF2, nd2, and nC2 are refractive indexes of the second material for g-line, F-line, d-line, and C-line, respectively, and nFb2, ndb2, and nCb2 are refractive indexes of the first particulate material for F-line, D-line, and C-line, respectively, and $vd1 = (nd1 - 1)/(nF1 - nC1)$ $vd2 = (nd2 - 1)/(nF2 - nC2)$ $\theta g, F1 = (ng1 - nF1)/(nF1 - nC1)$ $\theta g, d1 = (ng1 - nd1)/(nF1 - nC1)$ $\theta g, F2 = (ng2 - nF2)/(nF2 - nC2)$ $\theta g, d2 = (ng2 - nd2)/(nF2 - nC2)$ $vdb2 = (ndb2 - 1)/(nFb2 - nCb2)$.

2. A diffractive optical element according to claim 1, wherein the first and second materials further satisfy all of the following conditions:

$m(\lambda F) = \{d \times (nF1 - nF2)\}/\lambda F$ $m(\lambda d) = \{d \times (nd1 - nd2)\}/\lambda d$ $m(\lambda C) = \{d \times (nC1 - nC2)\}/\lambda C$ $d \leq 20$ $0.92 \leq \{m(\lambda F) + m(\lambda d) + m(\lambda C)\}/3 \leq 1.08$ where λF, λd, and λC are wavelengths of F-line, d-line, and C-line, respectively, m(λF) is a value obtained by dividing a difference in optical path length between a convex portion and a concave portion of each diffraction grating for m-th order diffracted light as designed order diffracted light at the wavelength of F-line by the wavelength of F-line, m(λd) is a value obtained by dividing a difference in optical path length between the convex portion and the concave portion of each diffraction grating for the m-th order diffracted light at the wavelength of d-line by the wavelength of d-line, m(λC) is a value obtained by dividing a difference in optical path length between the convex portion and the concave portion of each diffraction grating for the m-th order diffracted light at the wavelength of C-line by the wavelength of C-line, and d(μm) is a grating thickness of the diffraction gratings.

3. A diffractive optical element according to claim 1, wherein the first material is a material obtained mixing a resin material with a second particulate material satisfying all of the following conditions:

$$ndb1 \geq 1.65$$

$$vdb1 \geq 35$$

where ndb1 is a refractive index of the second particulate material for d-line, and $$vdb1 = (ndb1-1)/(nFb1-nCb1)$$

where nFb1 and nCb1 are refractive indexes of the second particulate material for F-line and C-line, respectively.

4. A diffractive optical element according to claim 3, wherein both an average particle diameter of the first particulate material and an average particle diameter of the second particulate material are equal to or less than ¼ of a wavelength of light incident on the diffractive optical element.

5. A diffractive optical element according to claim 1, wherein the first material is a resin material without a second particulate material mixed therein, and wherein the second particulate material satisfies all of the following conditions:

$$ndb1 \geq 1.65$$

$$vdb1 \geq 35$$

where ndb1 is a refractive index of the second particulate material for d-line, and $$vdb1 = (ndb1-1)/(nFb1-nCb1)$$

where nFb1 and nCb1 are refractive indexes of the second particulate material for F-line and C-line, respectively.

6. A diffractive optical element according to claim 1, wherein the first material is a glass material.

7. A diffractive optical element according to claim 6, wherein the glass material has a deformation point of equal to or lower than 600° C.

8. A diffractive optical element according to claim 7, wherein the element further satisfies the following conditions:

$$(T1(\lambda 1) \times T2(\lambda 1) \times \eta(\lambda 1) T1(\lambda 2) \times T2(\lambda 2) \times \eta(\lambda 2) T1(\lambda 3) \times T2(\lambda 3) \times \eta(\lambda 3))/3 \geq 0.70$$

where λ1, λ2, and λ3 are wavelengths of 450 nm, 550 nm, and 650 nm, respectively, η(λ1), η(λ2), and η(λ3) are diffraction efficiencies at the wavelengths of λ1, λ2, and λ3, respectively, T1(λ1), T1(λ2), and T1(λ3) are internal transmittances of the first material at the wavelengths of λ1, λ2, and λ3, respectively, and T2(λ1), T2(λ2), and T2(λ3) are internal transmittances of the second material at the wavelengths of λ1, λ2, and λ3, respectively.

9. A diffractive optical element according to claim 1, wherein the element further satisfies the following condition:

$$d/P < 1/7$$

where P and d are a grating pitch and a grating thickness of the diffraction gratings, respectively.

10. An optical system comprising a diffractive optical element according to claim 1.

11. An optical apparatus comprising an optical system including a diffractive optical element according to claim 1.

* * * * *